(12) United States Patent
Hattori et al.

(10) Patent No.: US 10,055,814 B2
(45) Date of Patent: Aug. 21, 2018

(54) IMAGE PROCESSING DEVICE AND IMAGE PROCESSING METHOD

(71) Applicant: SONY CORPORATION, Tokyo (JP)

(72) Inventors: Shinobu Hattori, Tokyo (JP); Yoshitomo Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 8 days.

(21) Appl. No.: 15/429,390

(22) Filed: Feb. 10, 2017

(65) Prior Publication Data

US 2017/0154407 A1    Jun. 1, 2017

Related U.S. Application Data

(62) Division of application No. 13/982,384, filed as application No. PCT/JP2012/053677 on Feb. 16, 2012, now Pat. No. 9,661,301.

(30) Foreign Application Priority Data

Feb. 18, 2011    (JP) ................. 2011-033849

(51) Int. Cl.
*H04N 13/04*    (2006.01)
*H04N 13/00*    (2018.01)
(Continued)

(52) U.S. Cl.
CPC .............. *G06T 3/40* (2013.01); *G06T 3/0093* (2013.01); *G06T 7/11* (2017.01); *G06T 7/13* (2017.01);
(Continued)

(58) Field of Classification Search
CPC ......... G06T 15/205; G06T 2207/10028; G06T 7/0051; G06T 1/00; H04N 19/59;
(Continued)

(56) References Cited

U.S. PATENT DOCUMENTS 5,420,637 A    5/1995    Zeevi et al.
5,878,172 A    3/1999    Go
(Continued)

FOREIGN PATENT DOCUMENTS

JP    2000-308089 A    11/2000
JP    2008-182669 A    8/2008
JP    2010-508752 A    3/2010
JP    2010-157823 A    7/2010

OTHER PUBLICATIONS

International Search Report and Written Opinion of PCT Application No. PCT/JP2012/053677, dated Apr. 24, 2012, 05 pages of English Translation and 05 pages of ISRWO.

*Primary Examiner* — Nathanael Aynalem
(74) *Attorney, Agent, or Firm* — Chip Law Group

(57) ABSTRACT

The present technique relates to an image processing device and an image processing method for realizing accurate depth image warping operations on the receiving end when depth images with reduced resolutions are transmitted. A partial resolution converting unit reduces resolutions of parallax images of auxiliary images. A partial conversion information generating unit generates partial conversion information. The parallax images having the resolutions reduced by the partial resolution converting unit and the partial conversion information generated by the partial conversion information generating unit are transmitted to a decoding device. The present technique can be applied to encoding devices that encode glasses-free 3D images, for example.

10 Claims, 35 Drawing Sheets

(51) Int. Cl.
*H04N 19/597* (2014.01)
*H04N 19/33* (2014.01)
*G06T 3/40* (2006.01)
*G06T 7/13* (2017.01)
*G06T 7/11* (2017.01)
*G06T 7/70* (2017.01)
*H04N 19/44* (2014.01)
*G06T 3/00* (2006.01)
*G06T 15/20* (2011.01)

(52) U.S. Cl.
CPC .............. *G06T 7/70* (2017.01); *G06T 15/20* (2013.01); *H04N 13/0022* (2013.01); *H04N 13/0048* (2013.01); *H04N 13/0409* (2013.01); *H04N 19/44* (2014.11); *H04N 2013/0081* (2013.01)

(58) Field of Classification Search
CPC .. H04N 19/597; H04N 13/0029; H04N 19/33; H04N 2213/005; H04N 19/14
USPC ....... 382/154, 166, 232, 233, 235, 260, 275, 382/264, 268, 299, 285; 375/240.01–240.29
See application file for complete search history.

(56) References Cited

U.S. PATENT DOCUMENTS

| | | | |
|---|---|---|---|
| 6,104,434 A * | 8/2000 | Nakagawa | H04N 19/105 375/240.16 |
| 6,163,337 A | 12/2000 | Azuma et al. | |
| 6,173,013 B1 * | 1/2001 | Suzuki | H04N 19/563 375/240.16 |
| 2007/0159527 A1 | 7/2007 | Kim et al. | |
| 2007/0160153 A1 | 7/2007 | Sullivan | |
| 2008/0089428 A1 | 4/2008 | Nakamura et al. | |
| 2009/0103616 A1 | 4/2009 | Ho et al. | |
| 2009/0110073 A1 | 4/2009 | Wu et al. | |
| 2010/0128152 A1 | 5/2010 | Hayasaka et al. | |
| 2010/0238160 A1 | 9/2010 | Yea et al. | |
| 2010/0239180 A1 | 9/2010 | Yea et al. | |
| 2010/0239187 A1 | 9/2010 | Yea et al. | |
| 2011/0115886 A1 | 5/2011 | Nguyen et al. | |
| 2011/0317912 A1 * | 12/2011 | Oh | H04N 13/0037 382/166 |
| 2012/0008672 A1 * | 1/2012 | Gaddy | G06T 1/0028 375/240.01 |
| 2013/0307929 A1 | 11/2013 | Hattori et al. | |
| 2013/0315472 A1 | 11/2013 | Hattori et al. | |

\* cited by examiner

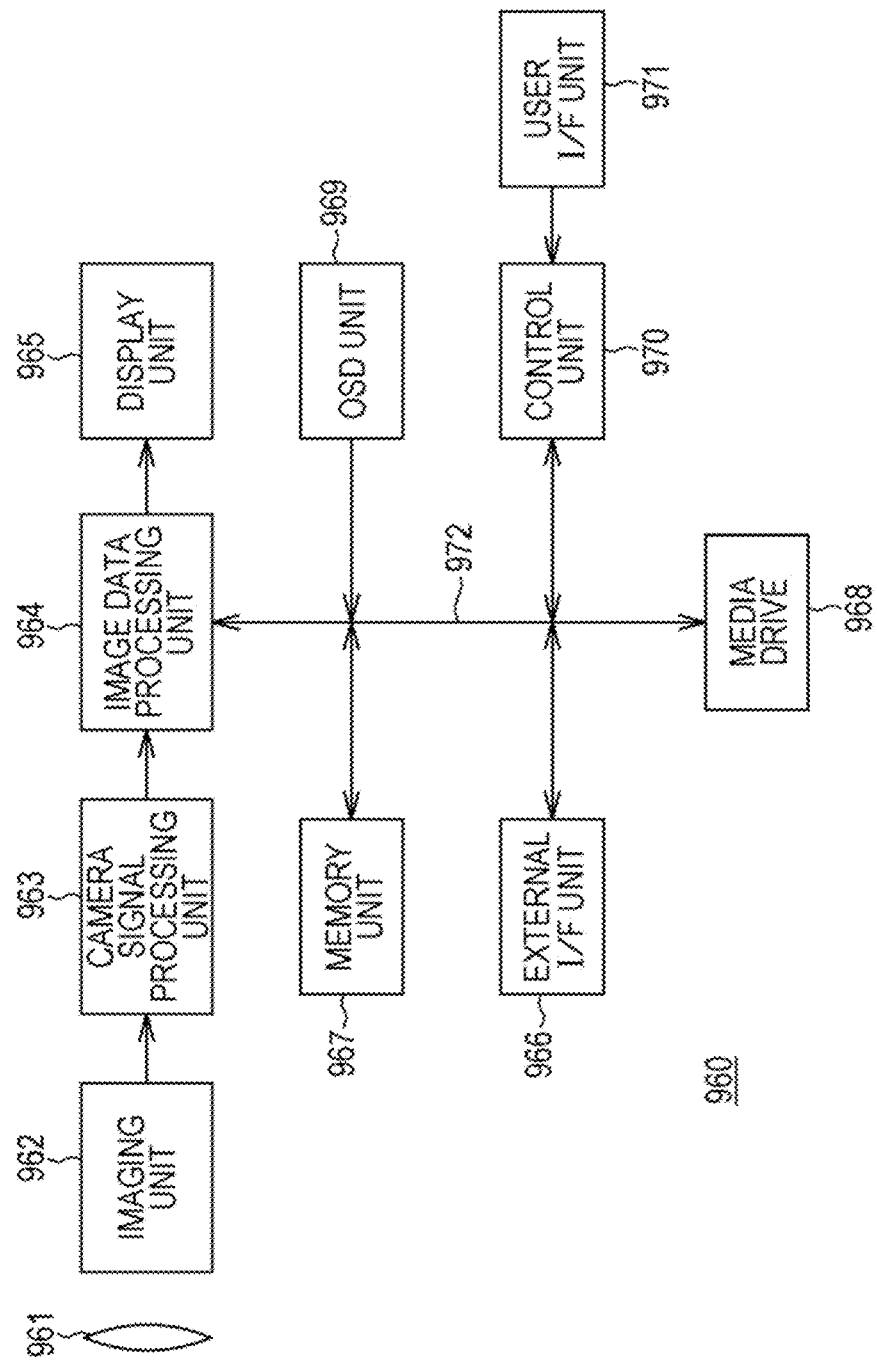

IMAGE PROCESSING DEVICE AND IMAGE PROCESSING METHOD

CROSS REFERENCE TO RELATED APPLICATIONS

The present application is a divisional application of U.S. patent application Ser. No. 13/982,384, filed Jul. 29, 2013, which is a national stage entry of PCT application PCT/JP2012/053677 filed Feb. 16, 2012 and which claims the benefit of Japanese Priority Patent Application 2011-033849 filed Feb. 18, 2011, the entire contents of which are incorporated herein by reference.

TECHNICAL FIELD

The present technique relates to image processing devices and image processing methods, and more particularly, to an image processing device and an image processing method for realizing accurate depth image warping operations at the receiving side when depth images with reduced resolutions are transmitted.

BACKGROUND ART

As a popular technique for viewing 3D images, there is currently a technique by which a viewer views images of two viewpoints that are alternately displayed. In viewing the images of two viewpoints, the viewer wears glasses that open the shutter for the left eye when one of the images of two viewpoints is displayed, and open the shutter for the right eye when the other one of the images is displayed (hereinafter referred to as the glasses-involving technique).

However, with such a glasses-involving technique, a viewer needs to purchase glasses as well as a 3D image display device, and this reduces the viewer's purchasing interest. Also, the need to wear glasses at the time of viewing is troublesome for a viewer. Therefore, there is an increasing demand for a viewing technique by which a viewer can view 3D images without glasses (hereinafter referred to as a glasses-free technique).

By the glasses-free technique, images of three or more viewpoints are displayed in such a manner that the viewable angle varies at the respective viewpoints, and the viewer can view a 3D image without glasses by seeing each image of any two viewpoints with the right and left eyes.

A decoding device that provides glasses-free viewing generates and displays images of three or more viewpoints from images of two viewpoints, for example (three or more viewpoints will be hereinafter referred to as "multi-view"). Specifically, an encoding device determines parallax (depth) values of images of two viewpoints, and transmits parallax images (depth images) representing the parallax values in the form of luminance values or the like to a decoding device. The decoding device generates multi-view parallax images by performing a warping operation on the received parallax images of the images of the two viewpoints. Using the multi-view parallax images, the decoding device generates multi-view images by performing a warping operation on the images of the two viewpoints, and combines the multi-view images for display.

It should be noted that a warping operation is an operation to change the parallax value (or pixel value) of each pixel in a parallax image (or image) of a predetermined viewpoint to the parallax value (or pixel value) of the pixel corresponding to the pixel in a parallax image (or an image) of a virtual viewpoint.

Examples of conventional image encoding techniques include AVC (Advanced Video Coding) and MVC (Multi-view Video Coding). Further, there is a suggested technique for encoding multi-view images (see Patent Document 1, for example).

CITATION LIST

Patent Document

Patent Document 1: Japanese Patent Application Laid-Open No. 2008-182669

SUMMARY OF THE INVENTION

Problems to be Solved by the Invention

In a case where an encoding device compatible with a decoding device that provides glasses-free viewing reduces the data amount of parallax images by reducing the resolutions of the parallax images, the decoding device needs to increase the resolutions of the received parallax images, to generate the parallax images having the resolution not yet reduced.

However, it is difficult to increase the resolutions of parallax images having resolutions once reduced, and generate the parallax images having the resolutions not yet reduced. Particularly, in a boundary position where parallax values greatly vary, there is a large difference between the parallax values prior to a resolution reduction and the parallax values after the resolution reduction. As a result, the decoding device cannot perform accurate parallax image warping operations.

The present technique has been made in view of those circumstances, and aims to realize accurate depth image warping operations at the receiving side when depth images with reduced resolutions are transmitted.

Solutions to Problems

An image processing device of a first aspect of the present technique is an image processing device that includes: a resolution reducing unit that reduces the resolution of a depth image; a generating unit that generates restoration information to be used for restoring the depth image having the resolution not yet reduced, from the depth image having the resolution reduced by the resolution reducing unit; and a transmitting unit that transmits the depth image having the resolution reduced by the resolution reducing unit, and the restoration information generated by the generating unit.

An image processing method of the first aspect of the present technique is compatible with the image processing device of the first aspect of the present technique.

In the first aspect of the present technique, the resolution of a depth image is reduced, restoration information to be used for restoring the depth image having the resolution not yet reduced from the depth image having the resolution reduced is generated, and the depth image having the resolution reduced and the restoration information are transmitted.

An image processing device of a second aspect of the present technique is an image processing device that includes: a receiving unit that receives a low-resolution depth image that is a depth image having its resolution reduced, and restoration information to be used for restoring the depth image having the resolution not yet reduced from the low-resolution depth image; and a resolution increasing unit that increases the resolution of the low-resolution depth image, based on the restoration information received by the receiving unit.

An image processing method of the second aspect of the present technique is compatible with the image processing device of the second aspect of the present technique.

In the second aspect of the present technique, a low-resolution depth image that is a depth image having its resolution reduced, and restoration information to be used for restoring the depth image having the resolution not yet reduced from the low-resolution depth image are received, and, based on the restoration information, the resolution of the low-resolution depth image is increased.

The image processing device of the first aspect and the image processing device of the second aspect can be realized by causing a computer to execute a program.

Also, to realize the image processing device of the first aspect and the image processing device of the second aspect, the program to be executed by a computer may be transmitted and provided via a transmission medium, or the program recorded on a recording medium may be provided.

Effects of the Invention

According to the first aspect of the present technique, depth images with reduced resolutions can be transmitted so that accurate depth image warping operations can be performed at the receiving side.

According to the second aspect of the present technique, accurate depth image warping operations can be performed when depth images with reduced resolutions are transmitted.

BRIEF DESCRIPTION OF DRAWINGS

FIG. 39 is a diagram schematically showing the structure of an imaging device to which the present technique is applied.

MODES FOR CARRYING OUT THE INVENTION

<Description of Depth Images (Parallax Images) in this Specification>

Figure 34:
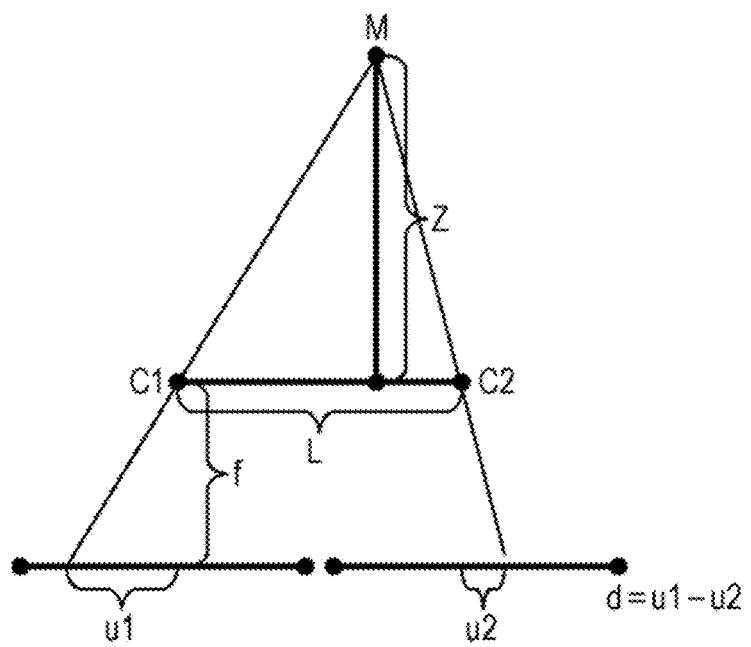
FIG. 34 is a diagram for explaining parallax and depth.

FIG. 34 is a diagram for explaining parallax and depth.

As shown in FIG. 34, when a color image of an object M is captured by a camera c1 located in a position C1 and a camera c2 located in a position C2, the object M has depth Z, which is the distance from the camera c1 (the camera c2) in the depth direction, and is defined by the following equation (a).

$$Z = (L/d) \times f \quad (a)$$

Here, L represents the horizontal distance between the position C1 and the position C2 (hereinafter referred to as the inter-camera distance). Meanwhile, d represents the value obtained by subtracting the horizontal distance u2 between the position of the object M in the image captured by the camera c2 and the center of the captured image, from the horizontal distance u1 between the position of the object M in the image captured by the camera c1 and the center of the captured image. That is, d represents the parallax. Further, f represents the focal length of the camera c1, and, in the equation (a), the focal lengths of the camera c1 and the camera c2 are the same.

As shown in the equation (a), the parallax d and the depth Z can be uniquely converted. Therefore, in this specification, the image representing the parallax d and the image representing the depth Z of the color image of two viewpoints captured by the camera c1 and the camera c2 are collectively referred to as depth images (parallax images).

A depth image (a parallax image) is an image representing the parallax d or the depth Z, and a pixel value in a depth image (a parallax image) is not the parallax d or the depth Z but may be a value obtained by normalizing the parallax d, a value obtained by normalizing the reciprocal 1/Z of the depth Z, or the like.

A value I obtained by normalizing the parallax d with 8 bits (0 through 255) can be calculated according to the equation (b) shown below. Here, the number of normalization bits of the parallax d is not limited to 8, and may be some other number, such as 10 or 12.

[Mathematical Formula 3]

$$I = \frac{255 \times (d - D_{min})}{D_{max} - D_{min}} \quad (b)$$

In the equation (b), Dmax represents the maximum value of the parallax d, and Dmin represents the minimum value of the parallax d. The maximum value Dmax and the minimum value Dmin may be set for each one screen, or may be set once every few screens.

A value y obtained by normalizing the reciprocal 1/Z of the depth Z with 8 bits (0 through 255) can be determined according to the equation (c) shown below. Here, the number of normalization bits of the reciprocal 1/Z of the depth Z is not limited to 8, and may be some other number, such as 10 or 12.

[Mathematical Formula 4]

$$y = 255 \times \frac{\frac{1}{Z} - \frac{1}{Z_{far}}}{\frac{1}{Z_{near}} - \frac{1}{Z_{far}}} \quad (c)$$

In the equation (c), Zfar represents the maximum value of the depth Z, and Znear represents the minimum value of the depth Z. The maximum value Zfar and the minimum value Znear may be set for each one screen, or may be set once every few screens.

As described above, in this specification, an image having a pixel value I obtained by normalizing the parallax d, and an image having a pixel value y obtained by normalizing the reciprocal 1/Z of the depth Z are collectively referred to as depth images (parallax images), as the parallax d and the depth Z can be uniquely converted. The color format of the depth images (parallax images) is YUV420 or YUV400 format, but may be some other color format.

When attention is focused on the value I or the value y as information, instead of a pixel value in a depth image (a parallax image), the value I or the value y is set as depth information (parallax information). Further, a map formed by mapping the value I or the value y is set as a depth map (a parallax map).

First Embodiment

[Example Structure of a First Embodiment of an Encoding Device]

Figure 1:
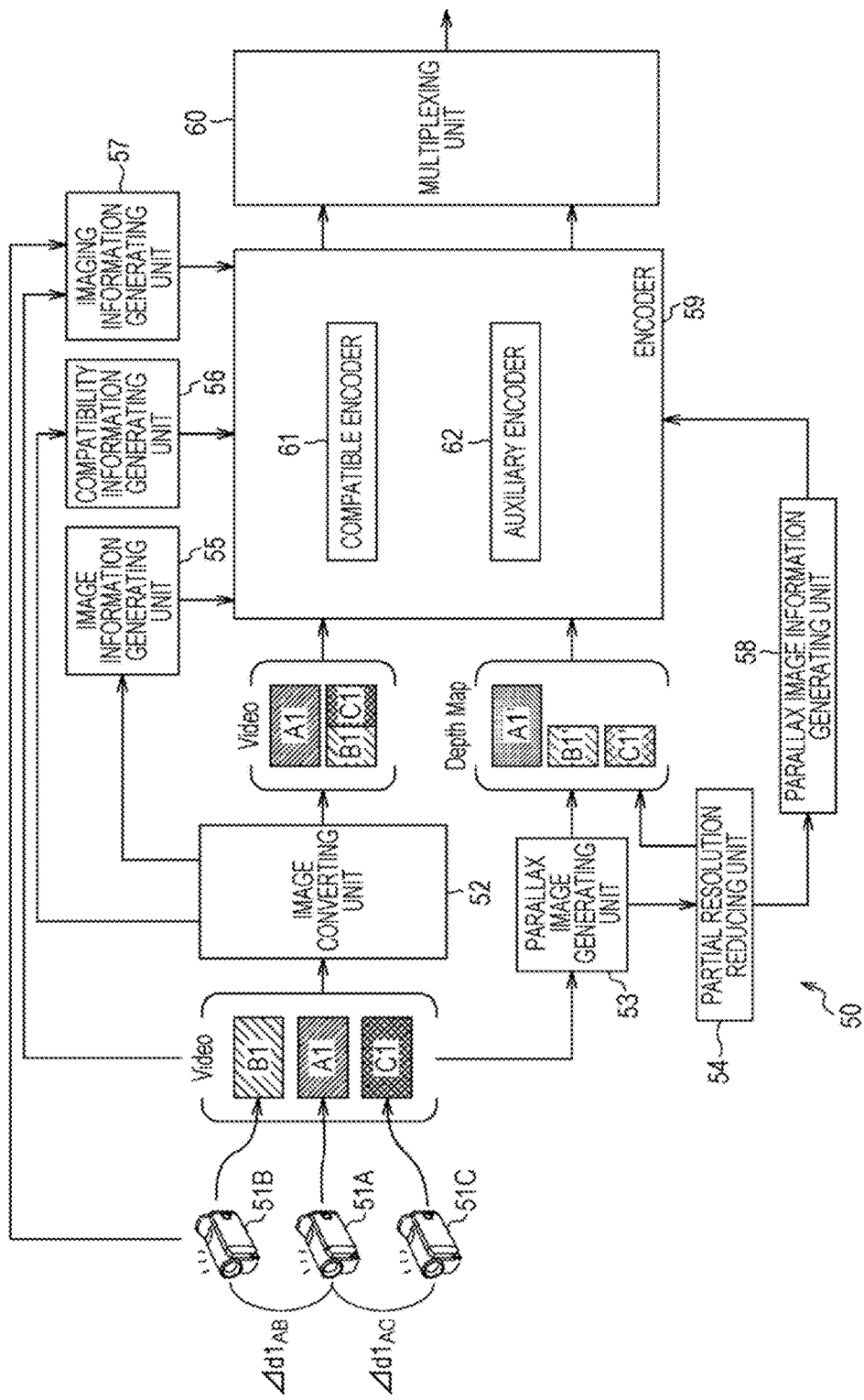
FIG. 1 is a block diagram showing an example structure of a first embodiment of an encoding device to which the present technique is applied.

FIG. 1 is a block diagram showing an example structure of a first embodiment of an encoding device as an image processing device to which the present technique is applied.

The encoding device 50 shown in FIG. 1 includes imaging units 51A through 51C, an image converting unit 52, a parallax image generating unit 53, a partial resolution reducing unit 54, an image information generating unit 55, a compatibility information generating unit 56, an imaging information generating unit 57, a parallax image information generating unit 58, an encoder 59, and a multiplexing unit 60.

The encoding device 50 reduces the resolution of the regions other than those adjacent to a boundary position where the parallax value of a parallax image greatly varies, and adds and transmits partial conversion information (is_original) indicating the pixels having resolutions not to be reduced.

Specifically, in the encoding device 50, the imaging unit 51A captures a HD (High Definition) image of a predetermined viewpoint as a viewpoint image A1, and supplies the viewpoint image A1 to the image converting unit 52, the parallax image generating unit 53, and the imaging information generating unit 57. In a position at a distance Δd1AB from the imaging unit 51A in a horizontal direction, the imaging unit 51B captures an HD image, as a viewpoint image B1, of a different viewpoint from that of the viewpoint image A1, and supplies the viewpoint image B1 to the image converting unit 52, the parallax image generating unit 53, and the imaging information generating unit 57. In a position at a distance Δd1AC from the imaging unit 51A in the opposite horizontal direction from the imaging unit 51A, the imaging unit 51C captures an HD image, as a viewpoint image C1, of a different viewpoint from those of the viewpoint image A1 and the viewpoint image B1, and supplies the viewpoint image C1 to the image converting unit 52, the parallax image generating unit 53, and the imaging information generating unit 57.

The viewpoints corresponding to the viewpoint image B1 and the viewpoint image C1 are the outer viewpoints among the viewpoints of the image that can be perceived as a 3D image. Accordingly, using the viewpoint images A1 through C1, the decoding device compatible with the encoding device 50 can generate multi-view images by interpolating an image of a viewpoint that is located further inside compared with the viewpoints of the viewpoint image B1 and the viewpoint image C1. As a result, multi-view images can be generated with higher precision than in a case where an image of an outer viewpoint is interpolated with the use of images of inner viewpoints. The distance $\Delta d1AB$ and the distance $\Delta d1AC$ may be constant, or may vary with time.

The image converting unit 52 determines the viewpoint image A1 to be a compatible image, as the viewpoint image A1 is supplied from the innermost imaging unit 51A of the imaging units 51A through 51C in the horizontal direction. Of multi-view images, the compatible image is an image that is encoded by a conventional encoding technique so as to ensure compatibility with conventional encoding devices. The image converting unit 52 supplies information designating the viewpoint image A1 as the compatible image to the compatibility information generating unit 56, and supplies the viewpoint image A1 as the compatible image directly to the encoder 59.

The image converting unit 52 also determines the viewpoint image B1 and the viewpoint image C1, which are the viewpoint images other than the viewpoint image A1, to be auxiliary images. The auxiliary images are images for generating, by using the compatible image, an image of a larger number of viewpoints than the compatible image. According to a predetermined multiplexing technique, the image converting unit 52 reduces the resolutions of the viewpoint image B1 and the viewpoint image C1, which are the auxiliary images, and thus multiplexes those viewpoint images. Specifically, where the multiplexing technique is the Side By Side technique, for example, the image converting unit 52 halves the resolutions of the viewpoint image B1 and the viewpoint image C1. The image converting unit 52 then multiplexes the viewpoint image B1 having its resolution halved (hereinafter referred to as the ½ resolution viewpoint image B1) and the viewpoint image C1 having its resolution halved (hereinafter referred to the ½ resolution viewpoint image C1), so that the ½ resolution viewpoint image B1 turns into the image in the left half of the screen and the ½ resolution viewpoint image C1 turns into the image in the right half of the screen. The image converting unit 52 supplies the multiplexed image obtained as a result of the multiplexing to the encoder 59, and supplies information indicating the multiplexing technique used for multiplexing the auxiliary images to the image information generating unit 55.

Using the viewpoint images A1 through C1 supplied from the imaging units 51A through 51C, the parallax image generating unit 53 detects the parallax values of the respective pixels of the viewpoint images A1 through C1. The parallax image generating unit 53 generates a parallax image A1' indicating the parallax value of each pixel of the viewpoint image A1 as the compatible image, and supplies the parallax image A1' to the encoder 59.

The parallax image generating unit 53 also generates a parallax image B1' indicating the parallax value of each pixel of the viewpoint image B1 as an auxiliary image, and a parallax image C1' indicating the parallax value of each pixel of the viewpoint image C1 as an auxiliary image, and supplies those parallax images to the partial resolution reducing unit 54.

The partial resolution reducing unit 54 detects a boundary position from each of the parallax images B1' and C1' supplied from the parallax image generating unit 53, on a pixel basis or macroblock basis. Based on the detected boundary position, the partial resolution reducing unit 54 generates boundary information (is_depth_edge) indicating whether the target pixel is a pixel adjacent to the boundary position, on a pixel basis or macroblock basis. It should be noted that a "macroblock" is a unit for encoding.

Based on the boundary information, the partial resolution reducing unit 54 also horizontally performs a partial resolution reducing operation to reduce the resolution of the regions other than the regions adjacent to the boundary position in the parallax images B1' and C1'. The partial resolution reducing unit 54 supplies the parallax images B1' and C1' subjected to the partial resolution reducing operation, to the encoder 59. The partial resolution reducing unit 54 also generates partial conversion information about the parallax images B1' and the C1', and supplies the partial conversion information to the parallax image information generating unit 58.

Based on the information supplied from the image converting unit 52, the image information generating unit 55 generates information indicating the multiplexing technique for the auxiliary images and the like as image information about the compatible image and the auxiliary images, and supplies the image information to the encoder 59.

Based on the information supplied from the image converting unit 52, the compatibility information generating unit 56 generates information designating the compatible image and a compatible mode as compatibility information about compatibility, and supplies the compatibility information to the encoder 59.

It should be noted that the compatible mode is the mode indicating the encoding method for the compatible image. For example, the compatible mode may be a mono mode indicating an encoding method for encoding a compatible image of a single viewpoint by the AVC technique, a frame packing mode indicating an encoding method for multiplexing compatible images of two viewpoints and encoding the multiplexed image by the AVC technique, a stereo mode indicating an encoding method for encoding compatible images of two viewpoints by the MVC technique, or the like.

Using the viewpoint images A1 through C1 supplied from the imaging units 51A through 51C, the imaging information generating unit 57 detects the distance between the viewpoints of two viewpoint images among the viewpoint images A1 through C1 (hereinafter referred to as the inter-viewpoint distance). Specifically, the imaging information generating unit 57 detects inter-viewpoint distances that are the distance $\Delta d1AB$ between the imaging unit 51A and the imaging unit 51B in the horizontal direction, and the distance $\Delta d1AC$ between the imaging unit 51A and the imaging unit 51C in the horizontal direction.

The imaging information generating unit 57 obtains, from the imaging units 51A through 51C, internal parameters of the imaging units 51A through 51C and a rotation matrix for warping operations. The internal parameters include focal length, the position of the principal point (the optical center of the lens) that is the center of the image, and distortion coefficient in the radial direction. The imaging information generating unit 57 generates imaging information that is the information about the inter-viewpoint distances, the internal parameters, and the rotation matrix for warping operations, and supplies the imaging information to the encoder 59.

The parallax image information generating unit 58 generates parallax image information that is the information about the parallax images, such as the partial conversion information supplied from the partial resolution reducing unit 54, and supplies the parallax image information to the encoder 59.

The encoder 59 is formed with a compatible encoder 61 and an auxiliary encoder 62. The compatible encoder 61 encodes the multiplexed image of the compatible image supplied from the image converting unit 52 by the conventional AVC technique, and adds various kinds of information to the encoded image. The resultant encoded stream is supplied as a compatible stream to the multiplexing unit 60.

The auxiliary encoder 62 functions as an encoding unit, and encodes the multiplexed image of the auxiliary images from the image converting unit 52, the parallax image A1' of the compatible image from the parallax image generating unit 53, and the parallax images of the auxiliary images that have their resolutions partially reduced and are supplied from the partial resolution reducing unit 54. The encoding technique used by the auxiliary encoder 62 may be the AVC technique, the MVC technique, the MPEG2 (Moving Picture Experts Group phase 2) technique, or the like.

The auxiliary encoder 62 adds the image information from the image information generating unit 55, the compatibility information from the compatibility information generating unit 56, the imaging information from the imaging information generating unit 57, the parallax image information from the parallax image information generating unit 58, and the like, to the encoded images obtained as a result of the encoding. The auxiliary encoder 62 supplies the resultant encoded stream as an auxiliary stream to the multiplexing unit 60.

The multiplexing unit 60 generates TSs (Transport Streams) from the compatible stream supplied from the compatible encoder 61 and the auxiliary stream supplied from the auxiliary encoder 62, and multiplexes the TSs. The multiplexing unit 60 functions as a transmitting unit, and transmits the multiplexed stream obtained as a result of the multiplexing.

[Example Structure of the Partial Resolution Reducing Unit]

Figure 2:
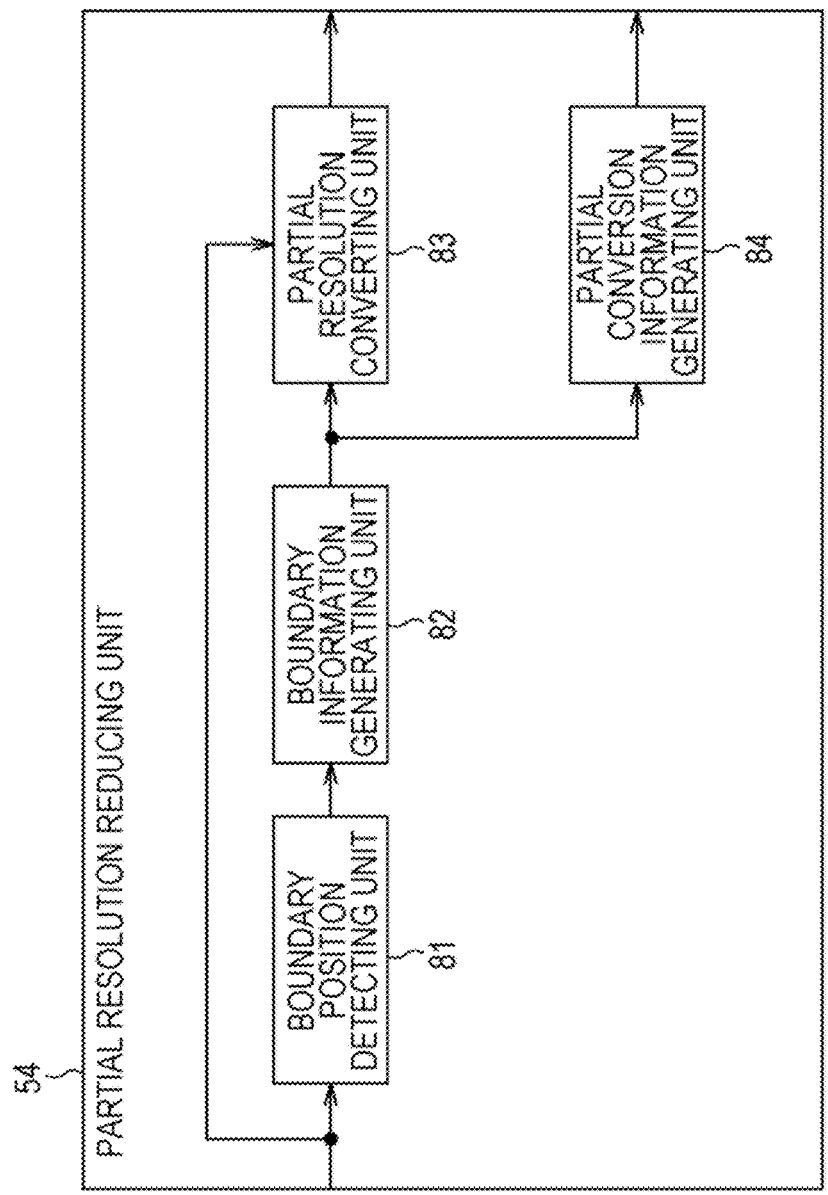
FIG. 2 is a block diagram showing a specific example structure of the partial resolution reducing unit shown in FIG. 1.

FIG. 2 is a block diagram showing a specific example structure of the partial resolution reducing unit 54 shown in FIG. 1.

The partial resolution reducing unit 54 shown in FIG. 2 includes a boundary position detecting unit 81, a boundary information generating unit 82, a partial resolution converting unit 83, and a partial conversion information generating unit 84.

The boundary position detecting unit 81 of the partial resolution reducing unit 54 detects a boundary position from each of the parallax images B1' and C1' supplied from the parallax image generating unit 53 shown in FIG. 1, and supplies the detection result to the boundary information generating unit 82.

Based on the detection result supplied from the boundary position detecting unit 81, the boundary information generating unit 82 generates boundary information on a pixel basis or macroblock basis, and supplies the boundary information to the partial resolution converting unit 83 and the partial conversion information generating unit 84.

The partial resolution converting unit 83 functions as a resolution reducing unit, and, based on the boundary information supplied from the boundary information generating unit 82, performs a horizontal resolution reduction on the parallax images B1' and C1' supplied from the parallax image generating unit 53 shown in FIG. 1. The partial resolution converting unit 83 supplies the parallax images B1' and C1' having their resolutions reduced, to the encoder 59 shown in FIG. 1.

The partial conversion information generating unit 84 functions as a generating unit, and, based on the boundary information supplied from the boundary information generating unit 82, generates the partial conversion information, and supplies the partial conversion information to the parallax image information generating unit 58 shown in FIG. 1.

[Example of the Boundary Information]

Figure 3:
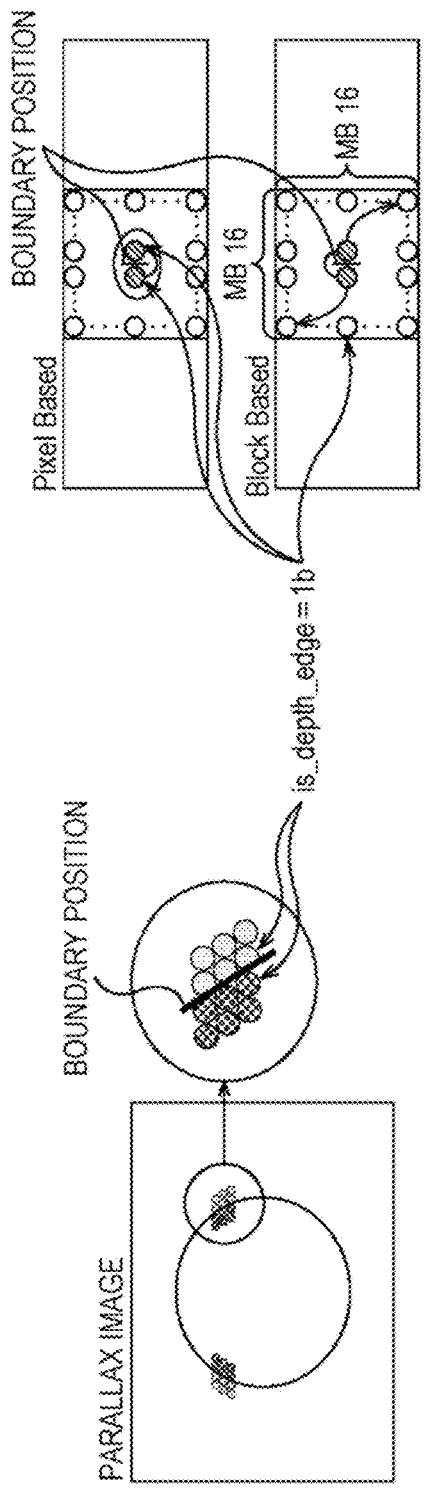
FIG. 3 is a diagram showing an example of boundary information.

FIG. 3 is a diagram showing an example of the boundary information.

In FIG. 3, the small circles represent pixels, and the patterns in the circles represent parallax values. The same applies to FIGS. 4 and 5, which will be described later.

In the parallax image in the example shown in FIG. 3, the parallax value in the circular region located at the center of the screen greatly differs from the parallax value in the region other than the circular region, as shown in the left-side portion of FIG. 3. Accordingly, there is a boundary position on the boundary between the circular region existing at the center of the screen and the region other than the circular region.

In a case where the boundary information is generated on a pixel basis, the boundary information about two pixels adjacent to the boundary position is 1, which indicates that the subject pixel is adjacent to the boundary position, for example, as shown in the upper right portion of FIG. 3. The boundary information about the pixels other than the two adjacent ones is 0, which indicates that the pixel is not adjacent to the boundary position.

In a case where the boundary information is generated on a macroblock basis, the boundary information about a macroblock (MB) containing two pixels adjacent to the boundary position is 1, which indicates that the subject pixel is adjacent to the boundary position, for example, as shown in the lower right portion of FIG. 3. The boundary information about the macroblocks other than the above described macroblock is 0, which indicates that the subject pixel is not adjacent to the boundary position.

[Description of the Partial Resolution Reducing Operation]

Figure 4:
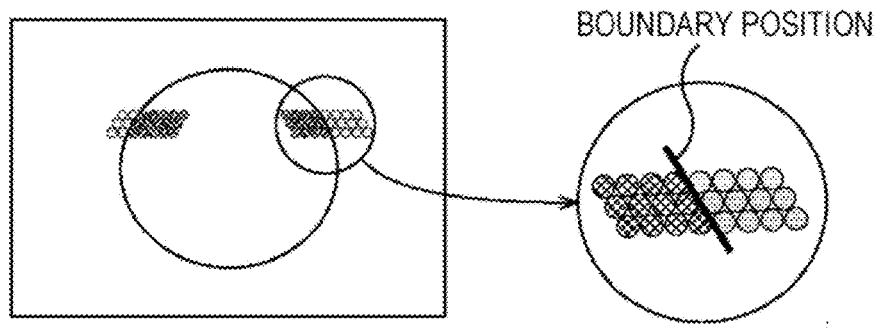
FIG. 4 is a diagram showing an example of a parallax image of an auxiliary image.
Figure 5:
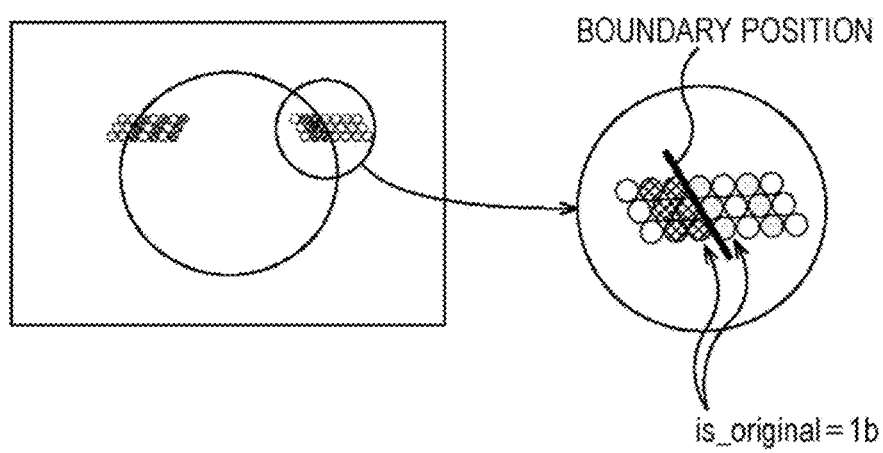
FIG. 5 is a diagram showing an example of a parallax image of an auxiliary image subjected to a partial resolution reducing operation.

FIGS. 4 and 5 are diagrams for explaining the partial resolution reducing operation performed by the partial resolution reducing unit 54 shown in FIG. 2.

FIG. 4 shows a parallax image of an auxiliary image generated by the parallax image generating unit 53, and FIG. 5 shows the parallax image of the auxiliary image subjected to the partial resolution reducing operation.

As shown in FIG. 4, when the parallax image of the auxiliary image is an image in which the parallax value in a circular region located in the center of the screen greatly differs from the parallax value in the region other than the circular region, the boundary position exists on the boundary between the circular region located in the center of the screen and the region other than the circular region.

After the partial resolution reducing operation is performed on such a parallax image, only the resolutions in the regions other than the regions adjacent to the boundary position have been reduced in the parallax image subjected to the resolution reduction as shown in FIG. 5.

Specifically, in the example shown in FIG. 5, the resolution reduction is performed by the bilinear method. By the bilinear method, one of the parallax values of two pixels adjacent to each other in the horizontal direction in the parallax image having its resolution not yet reduced is set as the average value between the parallax values of the two pixels, and the other one of the parallax values is removed. Therefore, when a resolution reduction is performed on all the pixels, the average parallax value between a left-side pixel adjacent to the boundary position and a right-side pixel adjacent to the boundary position is set as the parallax value of the pixels, and the left-side pixel adjacent to the boundary position is removed, for example. In the partial resolution reducing operation, however, a resolution reduction is not performed on the regions adjacent to the boundary position. Accordingly, the parallax values of the right-side pixels adjacent to the boundary position remain, as shown in FIG. 5.

For ease of explanation, in FIG. 5, the pixels having their reductions not yet reduced are represented by circles, and the pixels to be removed by the resolution reduction are represented by the circles that are not shaded.

In the example shown in FIG. 5, the boundary information is generated on a pixel basis, and regions in which a resolution reduction is not to be performed in the partial resolution reducing operation are set on a pixel basis. Accordingly, for each of the pixels in the parallax images not subjected to the partial resolution reducing operation, the partial conversion information is generated on a pixel basis. Specifically, the partial conversion information about a pixel adjacent to the boundary position, which has 1 as the boundary information, is 1, which indicates a pixel having a resolution not to be reduced. The partial boundary information about the other pixels is 0, which indicates pixels having their resolutions not yet reduced.

[Description of an Operation of the Encoding Device]

Figure 6:
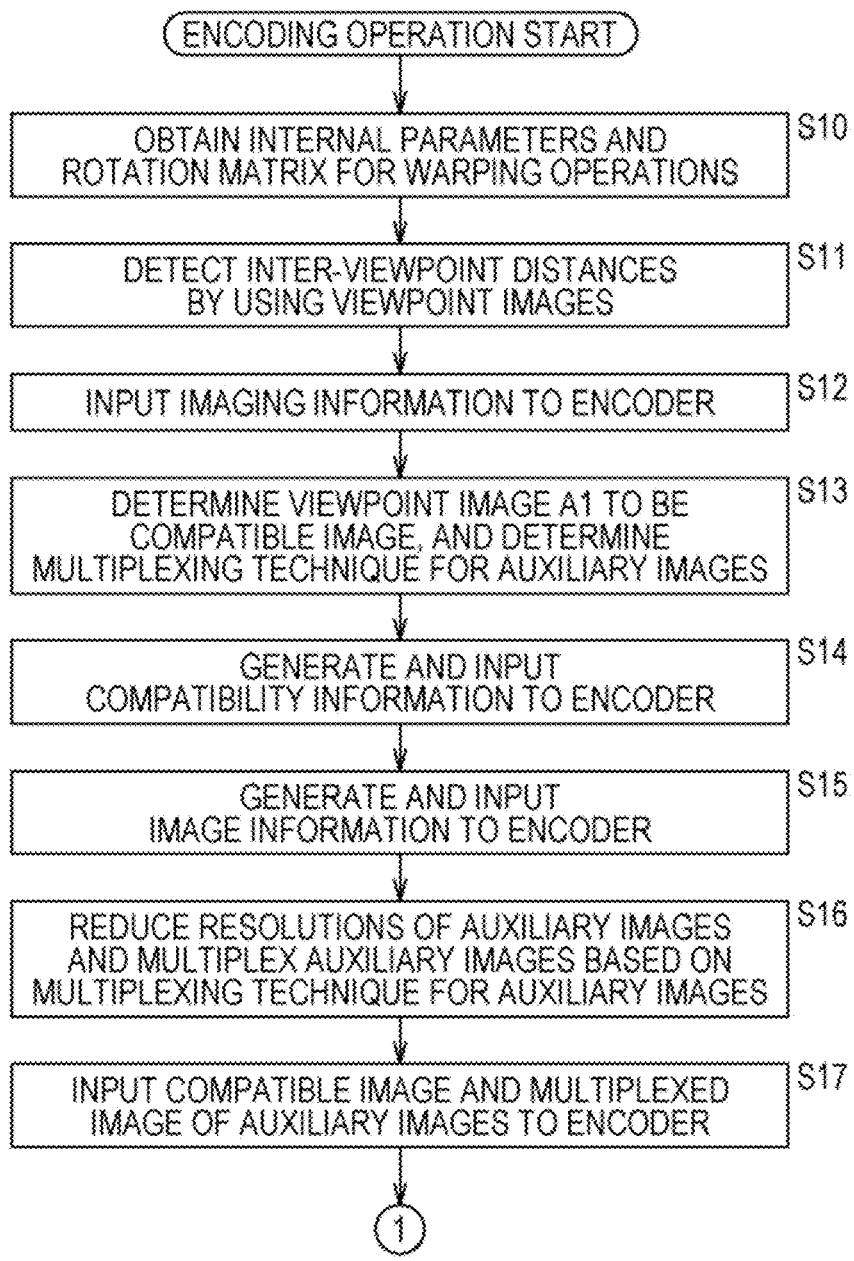
FIG. 6 is a flowchart for explaining an encoding operation by the encoding device shown in FIG. 1.
Figure 7:
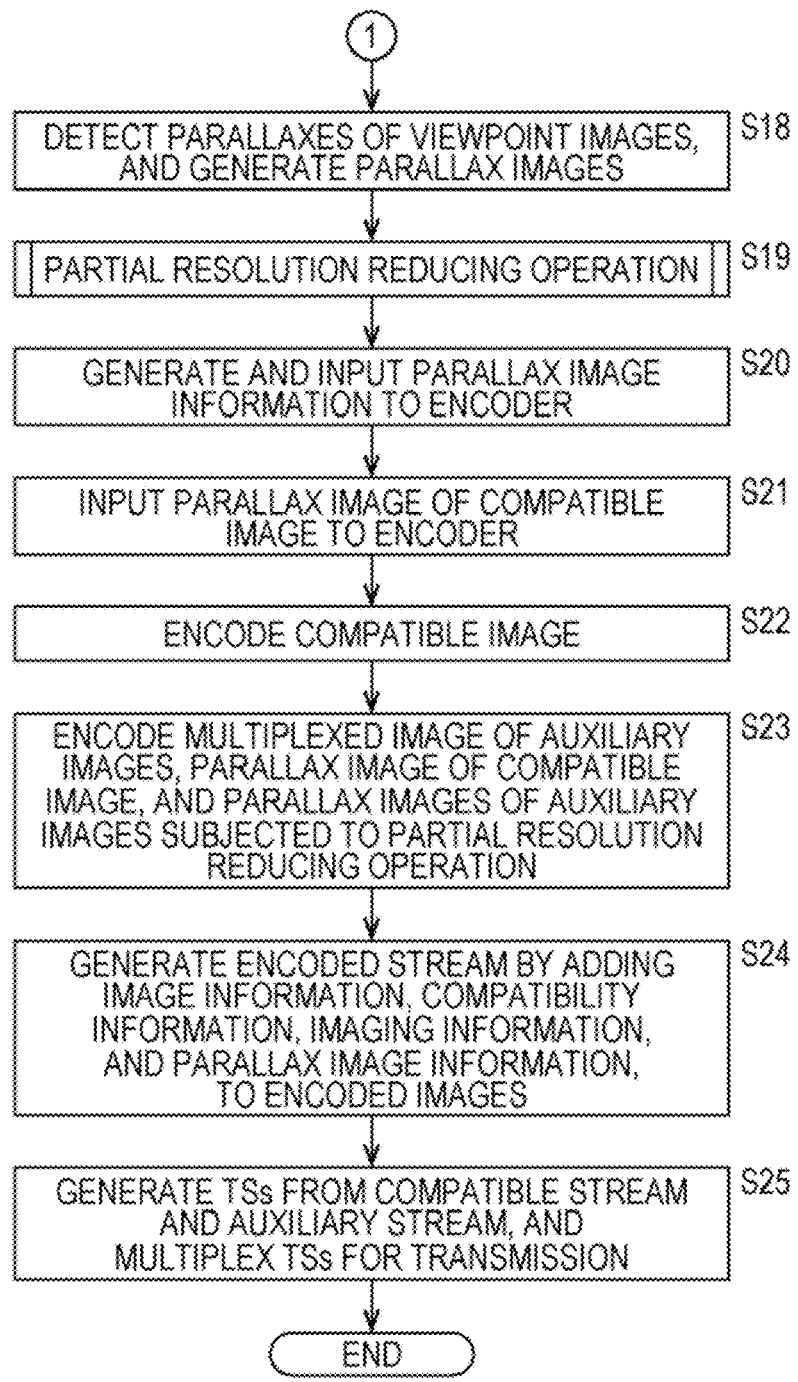
FIG. 7 is a flowchart for explaining the encoding operation by the encoding device shown in FIG. 1.

FIGS. 6 and 7 are flowcharts for explaining an encoding operation by the encoding device 50 shown in FIG. 1. This encoding operation is started when the viewpoint images A1 through C1 are output from the imaging units 51A through 51C, for example.

In step S10 of FIG. 6, the imaging information generating unit 57 obtains, from the imaging units 51A through 51C, the internal parameters of the imaging units 51A through 51C and the rotation matrix for warping operations.

In step S11, using the viewpoint images A1 through C1 supplied from the imaging units 51A through 51C, the imaging information generating unit 57 detects the inter-viewpoint distance between each two viewpoint images among the viewpoint images A1 through C1.

In step S12, the imaging information generating unit 57 generates the imaging information that is the information about the inter-viewpoint distances, the internal parameters, and the rotation matrix for warping operations, and supplies the imaging information to the encoder 59.

In step S13, the image converting unit 52 determines the viewpoint image A1 to be the compatible image, the viewpoint image A1 being supplied from the innermost imaging unit 51A of the imaging units 51A through 51C in the horizontal direction, and determines the multiplexing technique for the auxiliary images. The image converting unit 52 supplies the information designating the viewpoint image A1 as the compatible image to the compatibility information generating unit 56, and supplies the multiplexing technique for the auxiliary images to the image information generating unit 55.

In step S14, based on the information supplied from the image converting unit 52, the compatibility information generating unit 56 generates the compatibility information that is the information designating the viewpoint image A1 as the compatible image and a compatible mode such as the mono mode, and supplies the compatibility information to the encoder 59.

In step S15, based on the information supplied from the image converting unit 52, the image information generating unit 55 generates the information indicating the multiplexing technique for the auxiliary images and the like as the image information, and supplies the image information to the encoder 59.

In step S16, the image converting unit 52 determines the auxiliary images to be the viewpoint image B1 and the viewpoint image C1, which are the viewpoint images other than the viewpoint image A1. Based on the auxiliary image multiplexing technique determined in step S13, the resolutions of the auxiliary images are then reduced, and the auxiliary images are multiplexed. The multiplexed image of the auxiliary images is thus formed.

In step S17, the image converting unit 52 inputs the viewpoint image A1 as the compatible image and the multiplexed image of the auxiliary images to the encoder 59.

In step S18 of FIG. 7, using the viewpoint images A1 through C1 supplied from the imaging units 51A through 51C, the parallax image generating unit 53 detects the parallax values of the respective pixels of the viewpoint images A1 through C1, and generates the parallax images A1' through C1'. The parallax image generating unit 53 then supplies the parallax images B1' and C1' to the partial resolution reducing unit 54.

In step S19, the partial resolution reducing unit 54 performs a partial resolution reducing operation on the parallax images B1' and C1' supplied from the parallax image generating unit 53. This partial resolution reducing operation will be described later in detail, with reference to FIG. 8.

In step S20, the parallax image information generating unit 58 generates parallax image information such as the partial conversion information supplied from the partial resolution reducing unit 54, and inputs the parallax image information to the encoder 59.

In step S21, the parallax image generating unit 53 inputs the parallax image A1' of the compatible image to the encoder 59.

In step S22, the compatible encoder 61 of the encoder 59 encodes the viewpoint image A1 as the compatible image supplied from the image converting unit 52 by the conventional AVC technique, and supplies the resultant encoded stream as a compatible stream to the multiplexing unit 60.

In step S23, the auxiliary encoder 62 encodes the multiplexed image of the auxiliary images from the image converting unit 52, the parallax image A1' of the compatible image from the parallax image generating unit 53, and the parallax images of the auxiliary images that have their resolutions partially reduced and are supplied from the partial resolution reducing unit 54.

In step S24, the auxiliary encoder 62 adds the image information, the compatibility information, the imaging information, the parallax image information, and the like to the encoded images obtained as a result of the encoding carried out in step S23, and thus generates an encoded stream. The auxiliary encoder 62 supplies the encoded stream as an auxiliary stream to the multiplexing unit 60.

In step S25, the multiplexing unit 60 generates TSs (Transport Streams) from the compatible stream supplied from the compatible encoder 61 and the auxiliary stream supplied from the auxiliary encoder 62, and multiplexes the TSs for transmission. The operation then comes to an end.

Figure 8:
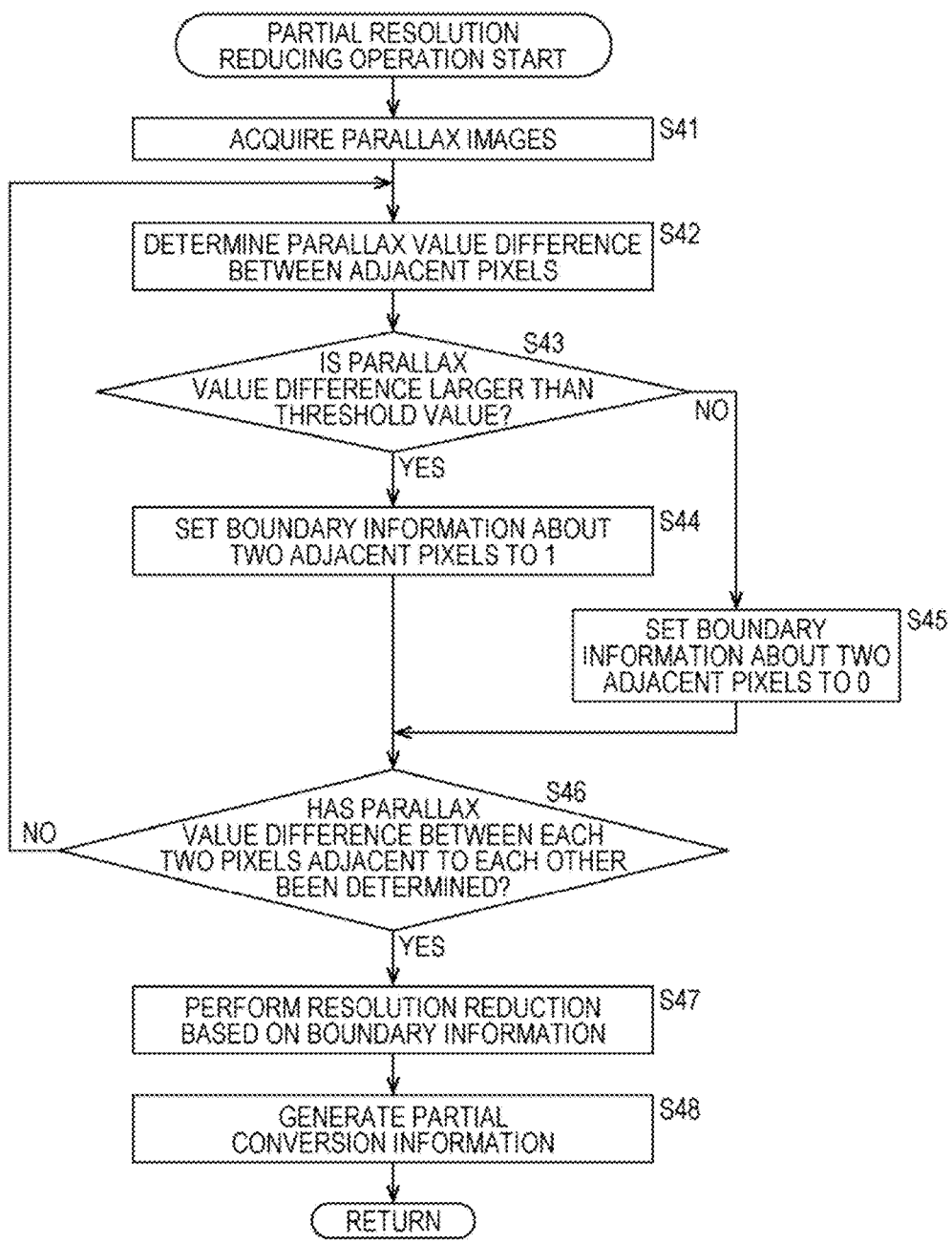
FIG. 8 is a flowchart for explaining in detail the partial resolution reducing operation shown in FIG. 7.

FIG. 8 is a flowchart for explaining in detail the partial resolution reducing operation of step S19 shown in FIG. 7.

In FIG. 8, the partial resolution reducing operation to be performed to generate the boundary information on a pixel basis is described. The partial resolution reducing operation shown in FIG. 8 is performed for each parallax image.

In step S41 of FIG. 8, the boundary position detecting unit 81 and the partial resolution converting unit 83 (FIG. 2) of the partial resolution reducing unit 54 acquires a parallax image supplied from the parallax image generating unit 53 shown in FIG. 1.

In step S42, the boundary position detecting unit 81 determines the parallax value difference between pixels that are adjacent to each other and have not been subjected to the procedure of step S42, among the pixels adjacent to each other in the horizontal direction in the parallax image.

In step S43, the boundary position detecting unit 81 determines whether the parallax value difference determined in step S42 is larger than a predetermined threshold value.

If the parallax value difference is determined to be larger than the predetermined threshold value in step S43, the boundary position detecting unit 81 supplies a detection result to the boundary information generating unit 82, the detecting result indicting that a position between the two adjacent pixels subjected to the procedure of step S42 is detected as the boundary position. In step S44, the boundary information generating unit 82 sets the boundary information about the two adjacent pixels subjected to the procedure of step S42 to 1.

If the parallax value difference is determined not to be larger than the predetermined threshold value in step S43, on the other hand, the boundary position detecting unit 81 supplies a detection result to the boundary information generating unit 82, the detecting result indicting that a position between the two adjacent pixels subjected to the procedure of step S42 is not detected as the boundary position. In step S45, the boundary information generating unit 82 sets the boundary information, which has not been set to 1, to 0, in the boundary information about the two adjacent pixels subjected to the procedure of step S42.

After the procedure of step S44 or step S45, the boundary information generating unit 82, in step S46, determines whether the parallax value difference between each two pixels adjacent to each other in the horizontal direction in the parallax image has been determined.

If it is determined in step S46 that the parallax value difference between each two pixels adjacent to each other in the horizontal direction in the parallax image has not been determined, the operation returns to step S42, and the procedures of steps S42 through S46 are repeated until the parallax value difference between each two pixels adjacent to each other in the horizontal direction in the parallax image is determined.

If it is determined in step S46 that the parallax value difference between each two pixels adjacent to each other in the horizontal direction in the parallax image has been determined, on the other hand, the boundary information generating unit 82 supplies the boundary information to the partial resolution converting unit 83 and the partial conversion information generating unit 84.

In step S47, based on the boundary information supplied from the boundary information generating unit 82, the partial resolution converting unit 83 reduces the resolution of the parallax image acquired in step S41. Specifically, in the parallax image, the partial resolution converting unit 83 reduces the resolution of the region formed with the pixels other than the pixels having 1 as the boundary information.

The partial resolution converting unit 83 then supplies the parallax image subjected to the resolution reduction, to the encoder 59.

In step S48, the partial conversion information generating unit 84 generates the partial conversion information, based on the boundary information supplied from the boundary information generating unit 82. Specifically, the partial conversion information generating unit 84 generates 1 as the partial conversion information about the pixels having 1 as the boundary information, and generates 0 as the partial conversion information about the other pixels. The partial conversion information generating unit 84 then supplies the generated partial conversion information to the parallax image information generating unit 58 shown in FIG. 1. The operation returns to step S19 of FIG. 7, and then moves on to step S20.

In a case where the boundary information is generated on a macroblock basis, the partial resolution reducing unit 54 carries out the procedures of steps S42 through S48 on a macroblock basis in the partial resolution reducing operation shown in FIG. 8.

Specifically, the boundary position detecting unit 81, in step S42, determines the parallax value difference between pixels adjacent to each other in the horizontal direction in a predetermined macroblock in the parallax image, and, in step S43, determines whether at least one of the parallax value differences is larger than a predetermined threshold value. If at least one parallax value difference is determined to be larger than the predetermined threshold value, the boundary information generating unit 82, in step S44, sets the boundary information about the macroblock corresponding to the difference, to 1. If all the parallax value differences are determined to be equal to or smaller than the predetermined threshold value, on the other hand, the boundary information generating unit 82, in step S45, sets the boundary information not having set to 1 among the boundary information about the macroblocks corresponding to the differences, to 0.

In step S47, the partial resolution converting unit 83 reduces the resolutions of the regions other than the macroblocks having 1 as the boundary information in the parallax image. In step S48, the partial conversion information generating unit 84 sets the partial conversion information about the macroblocks having 1 as the boundary information, to 1.

As described above, the encoding device 50 performs the partial resolution reducing operation on the parallax images of auxiliary images, and transmits the resultant parallax images and partial conversion information. Accordingly, the later described decoding device increases the resolutions of the parallax images subjected to the partial resolution reducing operation, based on the partial conversion information. As a result, parallax images that are more similar to the parallax images not yet subjected to the partial resolution reducing operation can be obtained. Thus, the decoding device can perform warping operations on parallax images that are more similar to the parallax images not yet subjected to the partial resolution reducing operation. As a result, the decoding device can perform accurate parallax image warping operations.

Also, the encoding device 50 reduces the resolutions of the auxiliary images and the parallax images of the auxiliary images. Accordingly, the amount of information to be encoded can be made smaller, and the processing costs for the encoding operation and the decoding operation can be made lower than in a case where encoding is performed without a resolution reduction. As a result, decoding operations by the decoding device can be prevented from greatly affecting the image quality of multi-view images.

Further, the encoding device 50 determines a compatible image to be a single-view image among multi-view images, and performs encoding by a conventional encoding technique. Accordingly, compatibility with conventional encoding devices that encode 2D images can be ensured.

Also, the encoding device 50 generates parallax images, and transmits an encoded stream containing the parallax images. Accordingly, the decoding device compatible with the encoding device 50 does not need to generate parallax images for generating multi-view images, and the processing load on the decoding device can be reduced. As a result, the costs of the decoding device can be lowered. Also, parallax detecting operations by the decoding device can be prevented from greatly affecting the image quality of multi-view images.

[Example Structure of the Decoding Device]

Figure 9:
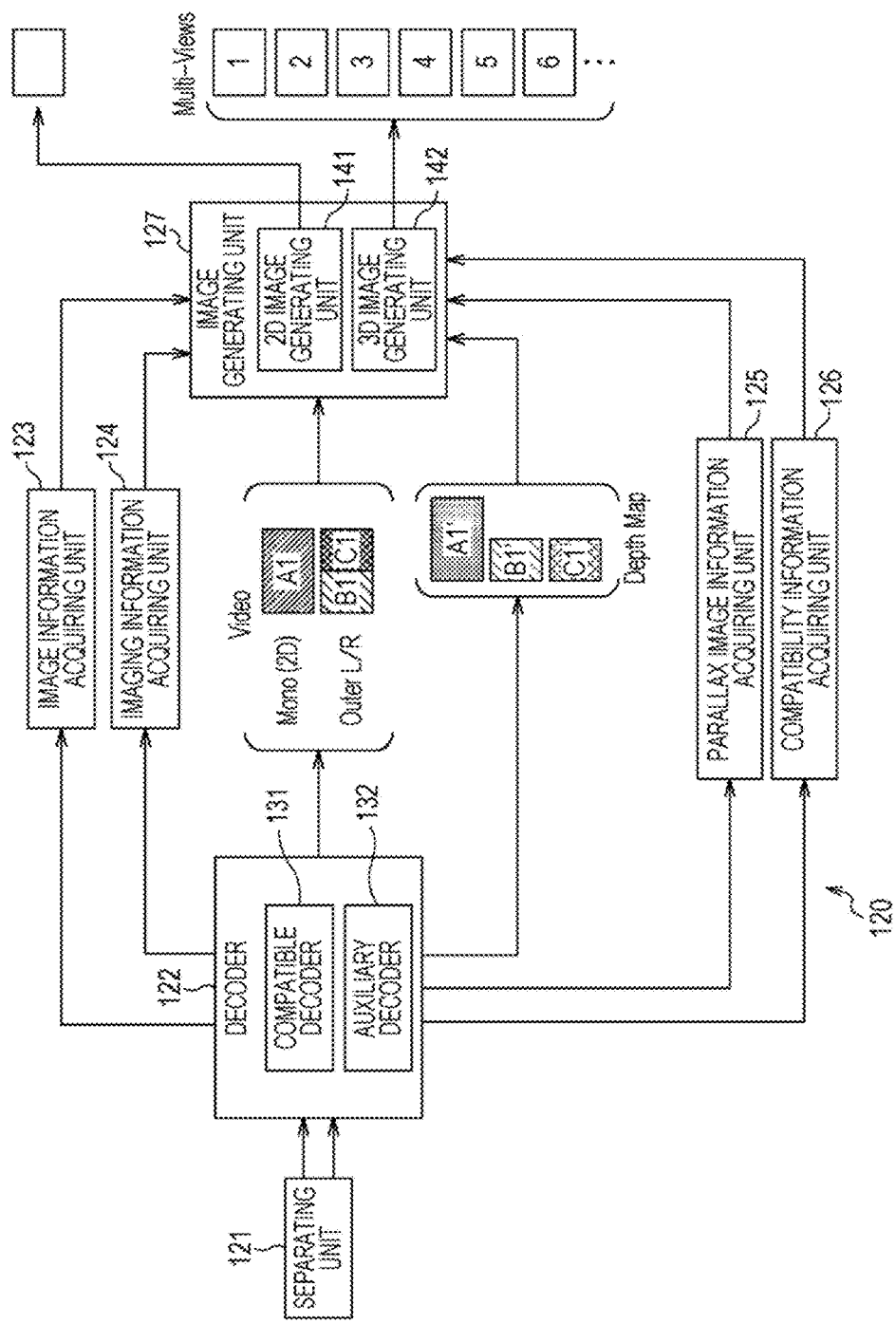
FIG. 9 is a diagram showing an example structure of a decoding device compatible with the encoding device shown in FIG. 1.

FIG. 9 is a diagram showing an example structure of the decoding device that decodes the multiplexed stream transmitted from the encoding device 50 shown in FIG. 1, the decoding device being an image processing device to which the present technique is applied.

The decoding device 120 shown in FIG. 9 includes a separating unit 121, a decoder 122, an image information acquiring unit 123, an imaging information acquiring unit 124, a parallax image information acquiring unit 125, a compatibility information acquiring unit 126, and an image generating unit 127. The decoding device 120 decodes the multiplexed stream transmitted from the encoding device 50, and increases the resolutions of the parallax images of the auxiliary images, based on the partial conversion information. The decoding device 120 then performs warping operations, to generate multi-view images.

Specifically, the separating unit 121 of the decoding device 120 functions as a receiving unit, receiving the multiplexed stream transmitted from the encoding device 50, and separating the TSs from one another. The separating unit 121 extracts the compatible stream and the auxiliary stream from the separated TSs, and supplies the extracted streams to the decoder 122.

The decoder 122 is formed with a compatible decoder 131 and an auxiliary decoder 132. Based on compatibility information that is supplied from the auxiliary decoder 132, the compatible decoder 131 of the decoder 122 identifies the compatible stream from the compatible and auxiliary streams supplied from the separating unit 121. Based on the compatibility information, the compatible decoder 131 decodes the encoded compatible image contained in the compatible stream by a technique compatible with the AVC technique. The compatible decoder 131 supplies the viewpoint image A1 obtained as a result of the decoding to the image generating unit 127.

The auxiliary decoder 132 supplies the compatibility information contained in the auxiliary stream supplied from the separating unit 121, to the compatible decoder 131. Based on the compatibility information, the auxiliary decoder 132 identifies the auxiliary stream from the compatible and auxiliary streams supplied from the separating unit 121. The auxiliary decoder 132 functions as a decoding unit, and decodes, by a technique compatible with the auxiliary encoder 62 shown in FIG. 1, the multiplexed image of the auxiliary images, the parallax image of the compatible image, and the parallax images of the auxiliary images subjected to the partial resolution reducing operation, those image being encoded and being contained in the auxiliary stream.

The auxiliary decoder 132 supplies the images obtained as a result of the decoding, which are the multiplexed image of the auxiliary images, the parallax image of the compatible image, and the parallax images of the auxiliary images subjected to the partial resolution reducing operation, to the image generating unit 127. Also, the auxiliary decoder 132 supplies the image information contained in the auxiliary stream to the image information acquiring unit 123, and supplies the imaging information to the imaging information acquiring unit 124. Further, the auxiliary decoder 132 supplies the parallax image information contained in the auxiliary stream to the parallax image information acquiring unit 125, and supplies the compatibility information to the compatibility information acquiring unit 126.

The image information acquiring unit 123 acquires the image information supplied from the auxiliary decoder 132, and supplies the image information to the image generating unit 127. The imaging information acquiring unit 124 acquires the imaging information supplied from the auxiliary decoder 132, and supplies the imaging information to the image generating unit 127.

The parallax image information acquiring unit 125 acquires the parallax image information supplied from the auxiliary decoder 132, and supplies the parallax image information to the image generating unit 127. The compatibility information acquiring unit 126 acquires the compatibility information supplied from the auxiliary decoder 132, and supplies the compatibility information to the image generating unit 127.

The image generating unit 127 is formed with a 2D image generating unit 141 and a 3D image generating unit 142. In accordance with a 2D image display instruction from a viewer, the 2D image generating unit 141 of the image generating unit 127 outputs the viewpoint image A1, which is the compatible image supplied from the compatible decoder 131, and causes a display device (not shown) to display the image. This enables the viewer to view a 2D image.

Using the viewpoint image A1, the multiplexed image of the auxiliary images, the parallax image A1' of the compatible image, and the parallax images of the auxiliary images subjected to the partial resolution reducing operation, which are supplied from the decoder 122, the 3D image generating unit 142 generates images that are of three or more viewpoints compatible with the display device (not shown) and have the same resolution as the compatible image, based on the image information, the imaging information, the parallax image information, the compatibility information, and the like. The 3D image generating unit 142 then converts the resolution of the generated multi-view images to the resolution calculated by dividing the resolution of the compatible image and the auxiliary images by the number of viewpoints, and combines the generated images. The resultant image is displayed on the display device (not shown).

At this point, the combined multi-view image is displayed, with viewable angle varying at the respective viewpoints. The viewer can view a 3D image without wearing glasses by seeing the images of any two viewpoints with the right and left eyes.

[Specific Example Structure of the 3D Image Generating Unit]

Figure 10:
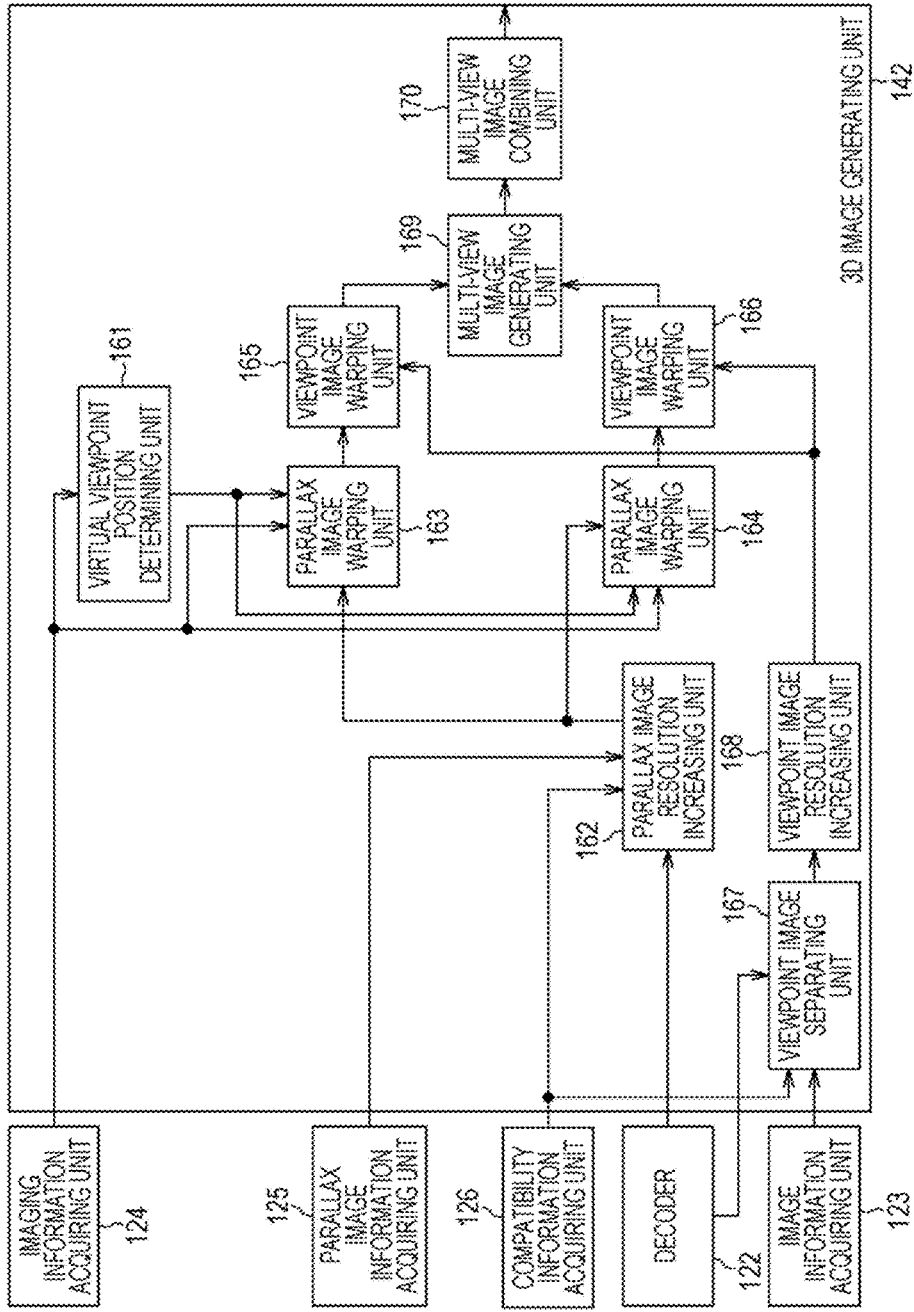
FIG. 10 is a block diagram showing a specific example structure of the 3D image generating unit shown in FIG. 9.

FIG. 10 is a block diagram showing a specific example structure of the 3D image generating unit 142 shown in FIG. 9.

As shown in FIG. 10, the 3D image generating unit 142 includes a virtual viewpoint position determining unit 161, a parallax image resolution increasing unit 162, a parallax image warping unit 163, a parallax image warping unit 164, a viewpoint image warping unit 165, a viewpoint image warping unit 166, a viewpoint image separating unit 167, a viewpoint image resolution increasing unit 168, a multi-view image generating unit 169, and a multi-view image combining unit 170.

Based on the inter-viewpoint distances contained in the imaging information supplied from the imaging information acquiring unit 124 and the number of viewpoints compatible with the display device (not shown), the virtual viewpoint position determining unit 161 of the 3D image generating unit 142 determines the positions of virtual viewpoints to be the positions of the viewpoints of the multi-view images being generated. Based on the positions of the respective virtual viewpoints, the virtual viewpoint position determining unit 161 generates parallax image identifying information for each of the parallax image warping unit 163 and the parallax image warping unit 164. The parallax image identifying information is to be used in generating images of the virtual viewpoints, and is for identifying parallax images of viewpoints located on the outer side of the virtual viewpoints. For each of the virtual viewpoints, the parallax image identifying information to be supplied to the parallax image warping unit 163 differs from the parallax image identifying information to be supplied to the parallax image warping unit 164.

The virtual viewpoint position determining unit 161 also supplies the positions of the respective virtual viewpoints and the corresponding parallax image identifying information to the parallax image warping unit 163 and the parallax image warping unit 164.

Based on the compatibility information supplied from the compatibility information acquiring unit 126, the parallax image resolution increasing unit 162 supplies the parallax image A1' of the compatible image supplied from the decoder 122, directly to the parallax image warping unit 163 and the parallax image warping unit 164.

The parallax image resolution increasing unit 162 also functions as a resolution increasing unit, and, based on the partial conversion information contained in the parallax image information supplied from the parallax image information acquiring unit 125, increases the resolutions of the parallax images of the auxiliary images that are supplied from the decoder 122 and have been subjected to the partial resolution reducing operation. As a result, the parallax image resolution increasing unit 162 obtains the parallax images of the viewpoint image B1 and the viewpoint image C1 with the same resolution as that of the compatible image. The parallax image resolution increasing unit 162 then supplies the obtained parallax images of the viewpoint image B1 and the viewpoint image C1 to the parallax image warping unit 163 and the parallax image warping unit 164.

The parallax image warping unit 163 functions as a parallax image warping unit. Specifically, based on the parallax image identifying information supplied from the virtual viewpoint position determining unit 161, the parallax image warping unit 163 selects, for each virtual viewpoint, one image from the parallax images of the viewpoint image B1 and the viewpoint image C1 and the parallax image A1', which are supplied from the parallax image resolution increasing unit 162. Based on the imaging information from the imaging information acquiring unit 124 and the positions of the virtual viewpoints from the virtual viewpoint position determining unit 161, the parallax image warping unit 163 performs a warping operation on the selected parallax image for each virtual viewpoint. The parallax image warping unit 163 supplies the parallax image of each virtual viewpoint generated through the warping operation to the viewpoint image warping unit 165.

The parallax image warping unit 164 functions as a parallax image warping unit, performing the same operations as those of the parallax image warping unit 163, and supplying the resultant parallax images of the respective virtual viewpoints to the viewpoint image warping unit 166.

The viewpoint image warping unit 165 functions as a viewpoint image warping unit. Specifically, based on the parallax image of each virtual viewpoint supplied from the parallax image warping unit 163, the viewpoint image warping unit 165 performs, for each virtual viewpoint, a warping operation on the viewpoint image supplied from the viewpoint image resolution increasing unit 168, the viewpoint image corresponding to the parallax image. As a result, an image of each virtual viewpoint including an occlusion region (described later in detail) is generated. The viewpoint image warping unit 165 supplies the image of each virtual viewpoint including an occlusion region to the multi-view image generating unit 169.

An occlusion region is a region that is formed due to a difference between a virtual viewpoint and the viewpoint of an actually formed viewpoint image. Such an occlusion region exists in an image of a virtual viewpoint, but does not exist in the viewpoint image corresponding to the parallax image used in generating the parallax image of the virtual viewpoint.

The viewpoint image warping unit 166 functions as a viewpoint image warping unit, and performs the same operations as those of the viewpoint image warping unit 165, based on the parallax images of the respective virtual viewpoints supplied from the parallax image warping unit 164.

Based on the compatibility information supplied from the compatibility information acquiring unit 126, the viewpoint image separating unit 167 supplies the viewpoint image A1 as the compatible image supplied from the decoder 122, directly to the viewpoint image resolution increasing unit 168. Based on the image information supplied from the image information acquiring unit 123, the viewpoint image separating unit 167 divides the multiplexed image of the auxiliary images supplied from the decoder 122. The viewpoint image separating unit 167 supplies the resultant viewpoint image B1 and the viewpoint image C1 each having a resolution that is half the resolution of the compatible image, to the viewpoint image resolution increasing unit 168.

The viewpoint image resolution increasing unit 168 increases the resolutions by performing an interpolating operation on each of the viewpoint image B1 and the viewpoint image C1 having the resolution that is half the resolution of the compatible image supplied from the viewpoint image separating unit 167. By doing so, the viewpoint image resolution increasing unit 168 obtains the viewpoint image B1 and the viewpoint image C1 having the same resolution as the compatible image. The viewpoint image resolution increasing unit 168 then supplies the parallax images of the obtained viewpoint image B1 and viewpoint image C1, and the viewpoint image A1 supplied from the viewpoint image separating unit 167, to the viewpoint image warping unit 165 and the viewpoint image warping unit 166.

For each virtual viewpoint, the multi-view image generating unit 169 interpolates the occlusion region of the virtual viewpoint image supplied from one of the viewpoint image warping units 165 and 166 with the virtual viewpoint image supplied from the other one of the viewpoint image warping units 165 and 166. The multi-view image generating unit 169 supplies the respective resultant virtual viewpoint images as multi-view images to the multi-view image combining unit 170.

The multi-view image combining unit 170 converts the resolution of the multi-view images supplied from the multi-view image generating unit 169 into the resolution calculated by dividing the resolution of the compatible image and the auxiliary images by the number of the virtual viewpoints, and combines the resultant multi-view images to be displayed on the display device (not shown).

[Description of a Resolution Increase]

Figure 11:
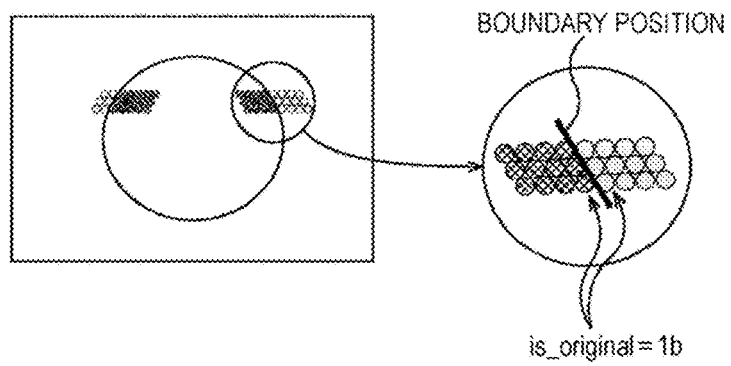
FIG. 11 is a diagram showing an example parallax image having its resolution increased by the parallax image resolution increasing unit.

FIG. 11 is a diagram for explaining the resolution increasing to be performed by the parallax image resolution increasing unit 162 shown in FIG. 10.

When the parallax image subjected to the partial resolution reducing operation shown in FIG. 5 is supplied, the parallax image resolution increasing unit 162 leaves the pixels having 1 as the partial conversion information, as shown in FIG. 11. The parallax image resolution increasing unit 162 increases resolutions by performing linear interpolation on the parallax values of pixels having 0 as the partial conversion information in the parallax image having the resolution increased, by using the parallax values of the corresponding two pixels adjacent to each other in the horizontal direction in the parallax image subjected to the partial resolution reducing operation. As a result, the parallax value of the parallax image after the resolution increase becomes closer to the parallax value of the parallax image shown in FIG. 4, which has the resolution not yet reduced.

Figure 12:
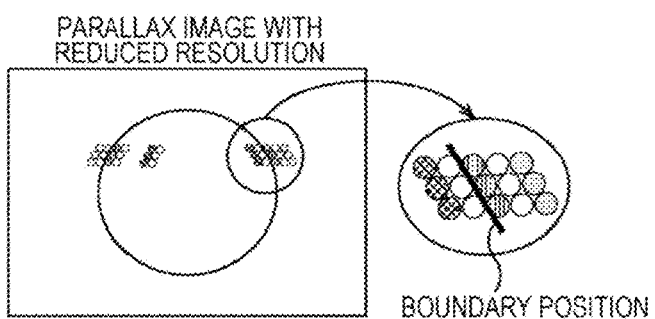
FIG. 12 is a diagram showing an example parallax image having its resolution reduced in the entire area.

On the other hand, when the entire area of the parallax image shown in FIG. 4 is subjected to a resolution reduction by the bilinear method, the parallax image having the resolution reduced is as shown in FIG. 12. In FIG. 12, the parallax values of the pixels represented by the circles shaded with vertical lines is the average value between the parallax values of the pixels represented by the circles shaded with grid-like patterns and the parallax values of the pixels represented by the circles in gray. For ease of explanation, in FIG. 12, the pixels having their reductions not yet reduced are represented by circles, and the pixels to be removed by the resolution reduction are represented by the circles that are not shaded.

Figure 13:
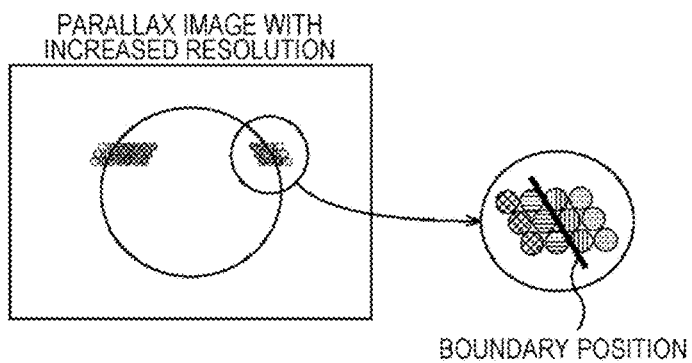
FIG. 13 is a diagram showing an example parallax image obtained by increasing the resolution of the parallax image shown in FIG. 12.

When a resolution increasing operation using the same linear interpolation as that in the case shown in FIG. 11 is performed on all the pixels in the parallax image with the reduced resolution shown in FIG. 12, the parallax image with the increased resolution is as shown in FIG. 13, and the parallax values of the pixels adjacent to the boundary position differ from those in the parallax image shown in FIG. 4. In FIG. 12, the parallax values of the pixels represented by the circles shaded with horizontal lines are values within the range of the parallax values of the pixels represented by the circles shaded with grid-like patterns and the parallax values of the pixels represented by the circles shaded with vertical lines.

As described above, in the partial resolution reducing operation, a resolution reduction is not performed on the parallax values that differ from those having the resolutions not yet reduced after a resolution increase due to the resolution reduction, and are located in the regions adjacent to the boundary position. Accordingly, the resolution of a parallax image subjected to the partial resolution reducing operation is increased based on the partial conversion information, so that the parallax image after the resolution increase can be made similar to the parallax image not yet subjected to the partial resolution reducing operation. In view of this, the partial conversion information can be regarded as the information for restoring the parallax image not yet subjected to the partial resolution reducing operation, from the parallax image subjected to the partial resolution reducing operation.

[Description of Generation of Virtual Viewpoint Images]

Figure 14:
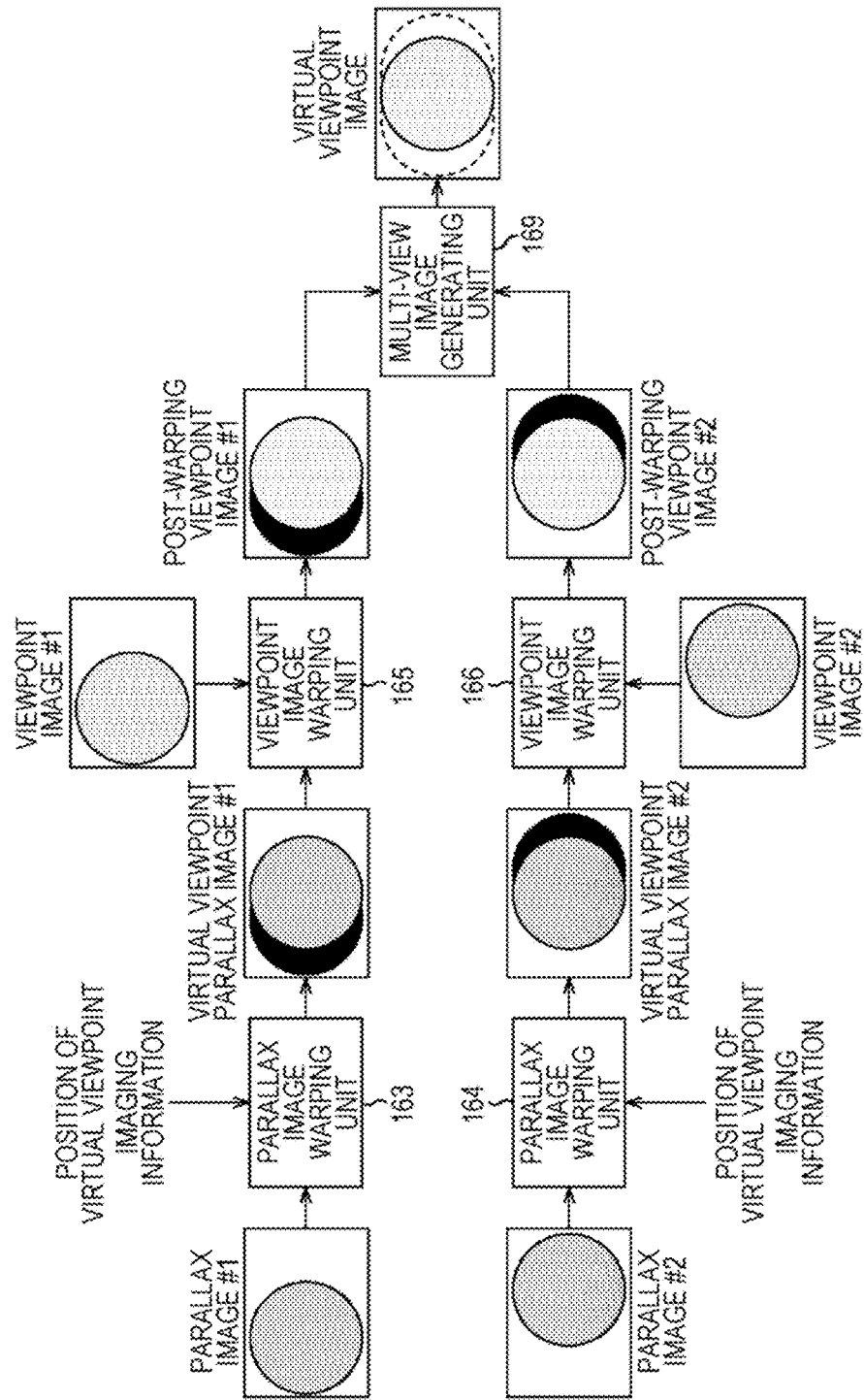
FIG. 14 is a diagram for explaining generation of an image of a virtual viewpoint.

FIG. 14 is a diagram for explaining generation of an image of a virtual viewpoint by the 3D image generating unit 142 shown in FIG. 10.

As shown in FIG. 14, the parallax image warping unit 163 and the parallax image warping unit 164 selects different parallax images from each other, based on the parallax image identifying information. In the example shown in FIG. 14, the parallax image warping unit 163 selects a parallax image that is formed with a circular region that is located in a left-side portion of the screen and has a predetermined parallax value other than 0, and a region that is other than the circular region and has a parallax value of 0 (hereinafter referred to as the parallax image #1). Meanwhile, the parallax image warping unit 164 selects a parallax image that is formed with a circular region that is located in a right-side portion of the screen and has a predetermined parallax value other than 0, and a region that is other than the circular region and has a parallax value of 0 (hereinafter referred to as the parallax image #2).

Based on the position of the virtual viewpoint and the imaging information, each of the parallax image warping units 163 and 164 performs a warping operation on the selected parallax image. As a result, the circular region in the parallax image #1 moves rightward, for example, and a virtual viewpoint parallax image #1 in which an occlusion region shown as a black region in the drawing is formed on the left side of the circular region is generated, as shown in FIG. 14. Meanwhile, the circular region in the parallax image #2 moves leftward, and a virtual viewpoint parallax image #2 in which an occlusion region shown as a black region in the drawing is formed on the right side of the circular region is generated. It should be noted that the position of the circular region in the virtual viewpoint parallax image #1 coincides with the position of the circular region in the virtual viewpoint parallax image #2. Each occlusion region is represented by a black region, for example.

Based on the virtual viewpoint parallax image #1, the viewpoint image warping unit 165 performs a warping operation on the viewpoint image #1 corresponding to the parallax image #1. In the example shown in FIG. 14, the circular region having the predetermined parallax value other than 0 in the viewpoint image #1 is a region in a different color from the other region having the parallax value of 0. Therefore, in the post-warping viewpoint image #1, the circular region in a different color from the surrounding region has moved rightward from the position of the circular region in the pre-warping viewpoint image #1, and an occlusion region exists on the left side of the circular region.

Meanwhile, based on the virtual viewpoint parallax image #2, the viewpoint image warping unit 166 performs a warping operation on the viewpoint image #2 corresponding to the parallax image #2. In the example shown in FIG. 14, the circular region having the predetermined parallax value other than 0 in the viewpoint image #2 is a region in a different color from the other region having the parallax value of 0. Therefore, in the post-warping viewpoint image #2, the circular region in a different color from the surrounding region has moved leftward from the position of the circular region in the pre-warping viewpoint image #2, and an occlusion region exists on the right side of the circular region.

The multi-view image generating unit 169 interpolates the occlusion region of one of the post-warping viewpoint images #1 and #2 with the other one of the viewpoint images. Specifically, since the parallax image identifying information is the information for identifying the viewpoint images of viewpoints on the outer side of the virtual viewpoint, the image of the occlusion region existing in one of the post-warping viewpoint images #1 and #2 exists in the other one of the viewpoint images. Therefore, the multi-view image generating unit 169 interpolates the image of the occlusion region existing in one of the post-warping viewpoint images #1 and #2 with the image of the occlusion region existing in the other one of the viewpoint images. As a result, a virtual viewpoint image in which any occlusion region does not exist is generated, as shown in FIG. 14.

[Description of a Parallax Image Warping Operation]

Figure 15:
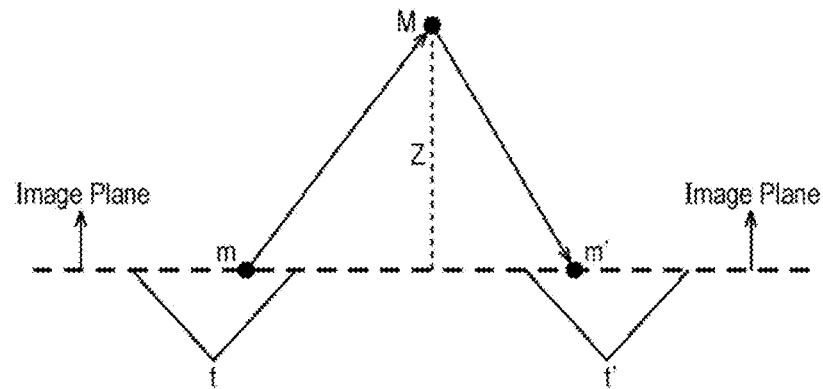
FIG. 15 is a diagram for explaining a parallax image warping operation.

FIG. 15 is a diagram for explaining a parallax image warping operation.

In a parallax image warping operation, the position m (x, y, z) of each pixel in a parallax image of a viewpoint in a selected position t (tx, ty, tz) is first associated with a position m' (x', y', z') in a parallax image of a virtual viewpoint in a position t' (t'x, t'y, t'z) via a three-dimensional space, as shown in FIG. 15.

Specifically, according to the equations (1) shown below, the position M (X, Y, Z) in the three-dimensional space corresponding to the position m (x, y, z) of a pixel of a parallax value Z in the parallax image of the viewpoint in the position t (tx, ty, tz) is determined, and the position m' (x', y', z') corresponding to the position M (X, Y, Z) in the parallax image of the virtual viewpoint in the position t' (t'x, t'y, t'z) is determined.

$$(X,Y,Z)T = RA^{-1}(x,y,1)TZ + (tx,ty,tz)T$$

$$s(x',y',1)T = A'R'^{-1}[(X,Y,Z)T - (t'x,t'y,t'z)T] \quad (1)$$

In the equations (1), R represents the rotation matrix for warping operations of the imaging units 51A through 51C that capture parallax images, and is expressed by the following equation (2):

[Mathematical Formula 1]

$$R = \begin{bmatrix} r\_11 & r\_12 & r\_13 \\ r\_21 & r\_22 & r\_23 \\ r\_31 & r\_32 & r\_33 \end{bmatrix} \quad (2)$$

In the equation (2), r_11 through r_13, r_21 through r_23, and r_31 through r_33 are predetermined values.

In the equations (1), A represents a matrix containing the internal parameters of the imaging units 51A through 51C that capture parallax images, and is expressed by the following equation (3):

[Mathematical Formula 2]

$$A = \begin{bmatrix} \text{focal\_length\_x} & \text{radial\_distortion} & \text{principal\_point\_x} \\ 0.0 & \text{focal\_length\_y} & \text{principal\_point\_y} \\ 0.0 & 0.0 & 1.0 \end{bmatrix} \quad (3)$$

In the equation (3), "focal_length_x" and "focal_length_y" represent the x-direction focal length and the y-direction focal length included in the internal parameters, respectively. "principal_point_x" and "principal_point_y" represent the x-direction position and the y-direction position of the principal point included in the internal parameters, respectively. "radial_distortion" represents the radial distortion coefficient included in the internal parameters.

Further, in the equations (1), R' is expressed in the same manner as R, and represents the rotation matrix for warping operations of a virtual imaging unit that captures virtual viewpoint parallax images. A' is expressed in the same manner as A, and represents a matrix containing the internal parameters of a virtual imaging unit that captures virtual viewpoint parallax images. Also, in the equations (1), s represents scaling factor.

After association is conducted in the above described manner, the pixels corresponding to the respective pixels in the selected parallax image are determined in the virtual viewpoint parallax image, based on the position m' (x', y', z') corresponding to the position m (x, y, z) of each pixel. In a case where two or more pixels are associated with a predetermined pixel in a virtual viewpoint parallax image, the pixel with the largest parallax value among the two or more pixels, or the pixel corresponding to the object on the front side, is set as the pixel corresponding to the predetermined pixel in the virtual viewpoint parallax image. The parallax value of each pixel in the selected parallax image is set as the parallax value of the pixel corresponding to the pixel in the virtual viewpoint parallax image, and, as a result, the virtual viewpoint parallax image is generated.

Figure 16:
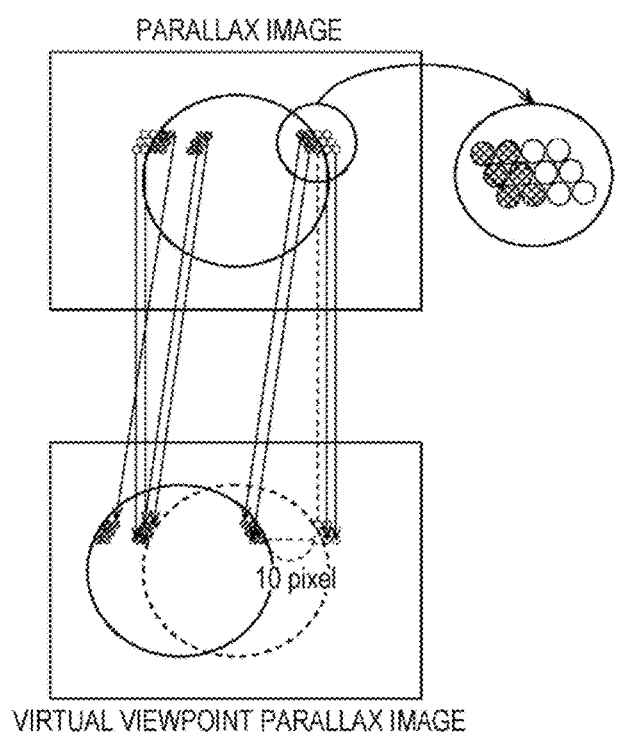
FIG. 16 is a diagram showing a parallax image having its resolution not yet reduced, and the result of a warping operation performed on the parallax image.
Figure 17:
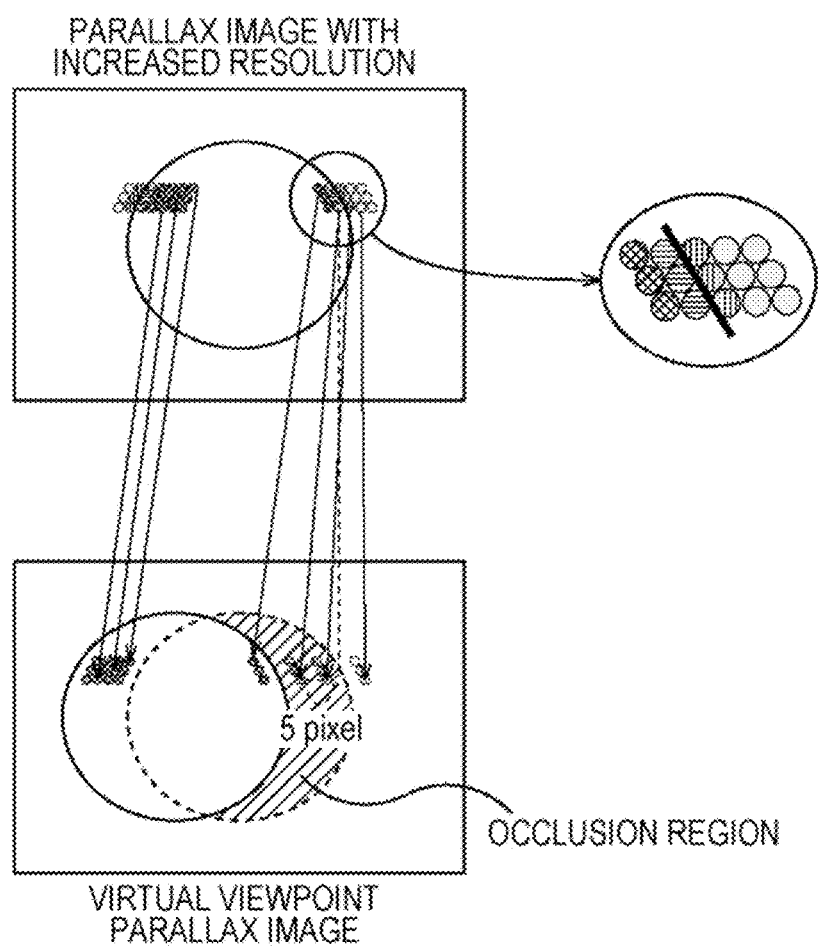
FIG. 17 is a diagram showing the parallax image shown in FIG. 13, and the result of a warping operation performed on the parallax image.

FIGS. 16 and 17 are diagrams for explaining parallax image warping operations to be performed by the parallax image warping unit 163 and the parallax image warping unit 164 shown in FIG. 10. In FIGS. 16 and 17, the small circles represent pixels, and the patterns in the circles represent parallax values.

FIG. 16 is a diagram showing a parallax image that has its resolution not yet reduced by the parallax image generating unit 53 of the encoding device 50, and the result of the warping operation performed on the parallax image.

In the example shown in FIG. 16, the parallax image that has its resolution not yet reduced is the parallax image shown in FIG. 4. In this case, when a warping operation is performed on the parallax image having its resolution not yet reduced, the circular region moves leftward by the distance equivalent to 10 pixels, for example, in the virtual viewpoint parallax image obtained as a result of the warping operation, as shown in FIG. 16.

Also, as shown in FIG. 11, the parallax value of the parallax image having its resolution increased by the parallax image resolution increasing unit 162 is close to the parallax value of the parallax image shown in FIG. 4. Accordingly, the parallax image of the virtual viewpoint obtained as a result of the warping operation performed on the parallax image of FIG. 11, which has its resolution increased, becomes similar to the parallax image shown in FIG. 16. It is safe to say that an accurate parallax image warping operation has been performed.

On the other hand, as shown in FIG. 17, in a case where a warping operation is performed on the parallax image of FIG. 13, which has its resolution increased, parallax values are associated with an occlusion region in the virtual viewpoint parallax image obtained as a result of the warping operation, as shown in FIG. 17.

Specifically, the pixels represented by the circles shaded with horizontal lines need to move leftward by the distance equivalent to 10 pixels as shown in FIG. 16, but move leftward by the distance equivalent only to 5 pixels as shown in FIG. 17, for example. That is, an accurate warping operation is not performed. As a result, the occlusion region that is supposed to be associated with no parallax values is associated with parallax values, and an appropriate virtual viewpoint image is not obtained.

[Description of an Operation of the Decoding Device]

Figure 18:
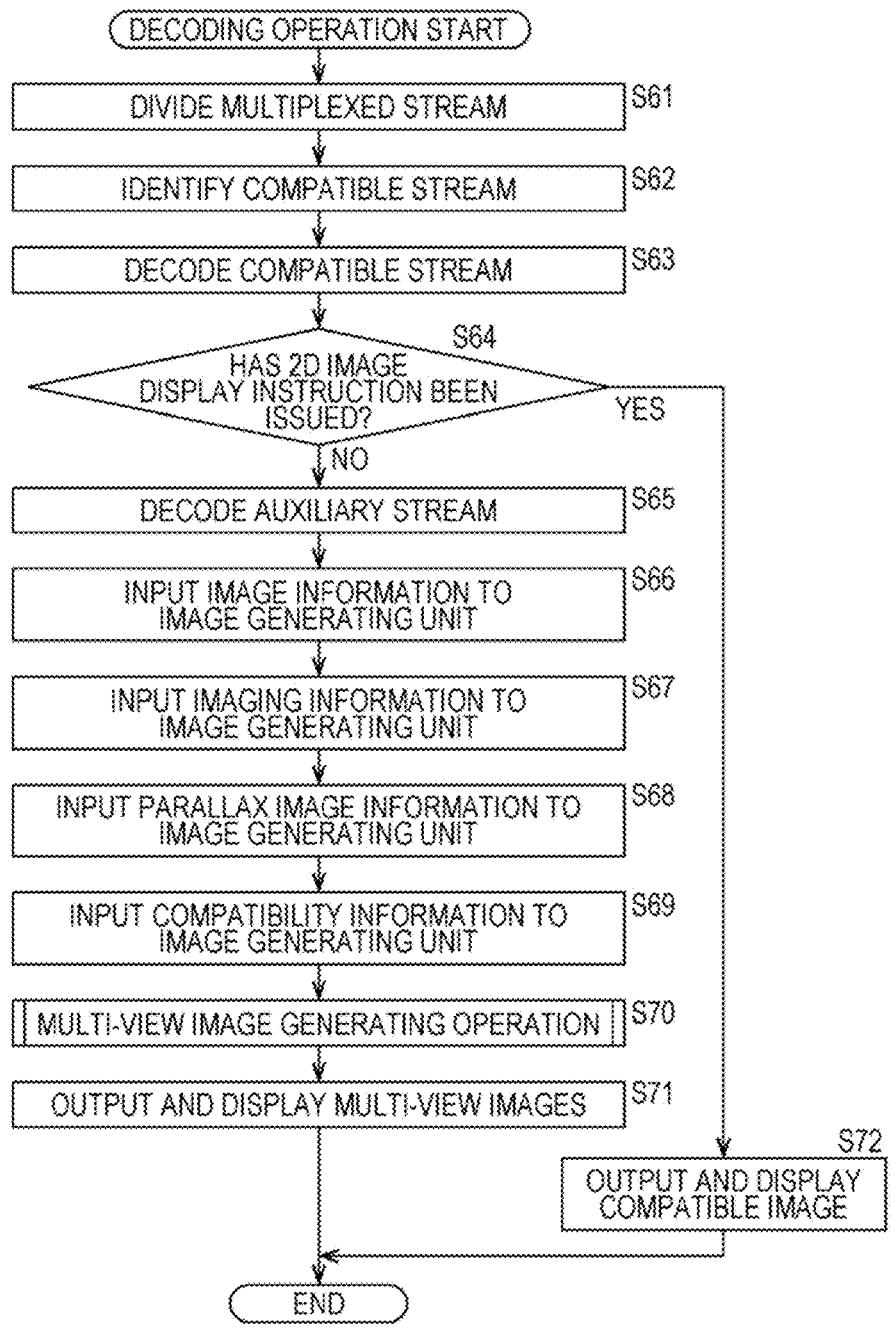
FIG. 18 is a flowchart for explaining a decoding operation by the decoding device shown in FIG. 9.

FIG. 18 is a flowchart for explaining a decoding operation by the decoding device 120 shown in FIG. 9. This decoding operation is started when the multiplexed stream transmitted from the encoding device 50 shown in FIG. 1 is input to the decoding device 120, for example.

In step S61 of FIG. 18, the separating unit 121 of the decoding device 120 receives the multiplexed stream transmitted from the encoding device 50, and separates the TSs from one another. The separating unit 121 extracts the compatible stream and the auxiliary stream from the separated TSs, and supplies the extracted streams to the decoder 122. The auxiliary decoder 132 of the decoder 122 supplies the compatibility information contained in the auxiliary stream supplied from the separating unit 121, to the compatible decoder 131.

In step S62, based on compatibility information that is supplied from the auxiliary decoder 132, the compatible decoder 131 identifies the compatible stream from the compatible and auxiliary streams supplied from the separating unit 121.

In step S63, based on the compatibility information, the compatible decoder 131 decodes the compatible image contained in the compatible stream by a technique compatible with the AVC technique, and supplies the resultant viewpoint image A1 to the image generating unit 127.

In step S64, the image generating unit 127 determines whether a 2D image display instruction has been issued from a viewer. If it is determined in step S64 that a 2D image display instruction has not been issued from a viewer, or if a glasses-free 3D image display instruction has been issued from a viewer, the auxiliary decoder 132 identifies the auxiliary stream from the compatible and auxiliary streams supplied from the separating unit 121, based on the compatibility information.

In step S65, the auxiliary decoder 132 decodes, by a technique compatible with the auxiliary encoder 62 shown in FIG. 1, the multiplexed image of the auxiliary images, the parallax image A1' of the compatible image, and the parallax images of the auxiliary images subjected to the partial resolution reducing operation, those images being encoded and being contained in the auxiliary stream. The auxiliary decoder 132 supplies the images obtained as a result of the decoding, which are the multiplexed image of the auxiliary images, the parallax image A1' of the compatible image, and the parallax images of the auxiliary images subjected to the partial resolution reducing operation, to the image generating unit 127. Also, the auxiliary decoder 132 supplies the image information contained in the auxiliary stream to the image information acquiring unit 123, and supplies the imaging information to the imaging information acquiring unit 124. Further, the auxiliary decoder 132 supplies the parallax image information contained in the auxiliary stream to the parallax image information acquiring unit 125, and supplies the compatibility information to the compatibility information acquiring unit 126.

In step S66, the image information acquiring unit 123 acquires the image information supplied from the auxiliary decoder 132, and inputs the image information to the image generating unit 127. In step S67, the imaging information acquiring unit 124 acquires the imaging information supplied from the auxiliary decoder 132, and inputs the imaging information to the image generating unit 127.

In step S68, the parallax image information acquiring unit 125 acquires the parallax image information supplied from the auxiliary decoder 132, and inputs the parallax image information to the image generating unit 127. In step S69, the compatibility information acquiring unit 126 acquires the compatibility information supplied from the auxiliary decoder 132, and inputs the compatibility information to the image generating unit 127.

In step S70, the 3D image generating unit 142 of the image generating unit 127 performs a multi-view image generating operation to generate a combined image of multi-view images. This multi-view image generating operation will be described later in detail, with reference to FIG. 19.

In step S71, the multi-view image combining unit 170 of the 3D image generating unit 142 outputs the combined image of multi-view images generated through the procedure of step S70 to the display device (not shown), and causes the display device to display the combined image so that the viewable angle varies at the respective viewpoints. The operation then comes to an end.

If it is determined in step S64 that a 2D image display instruction has been issued from a viewer, on the other hand, the 2D image generating unit 141 of the image generating unit 127, in step S72, outputs the viewpoint image A1 as the compatible image supplied from the compatible decoder 131 to the display device (not shown), and causes the display device to display the viewpoint image A1. The operation then comes to an end.

Figure 19:
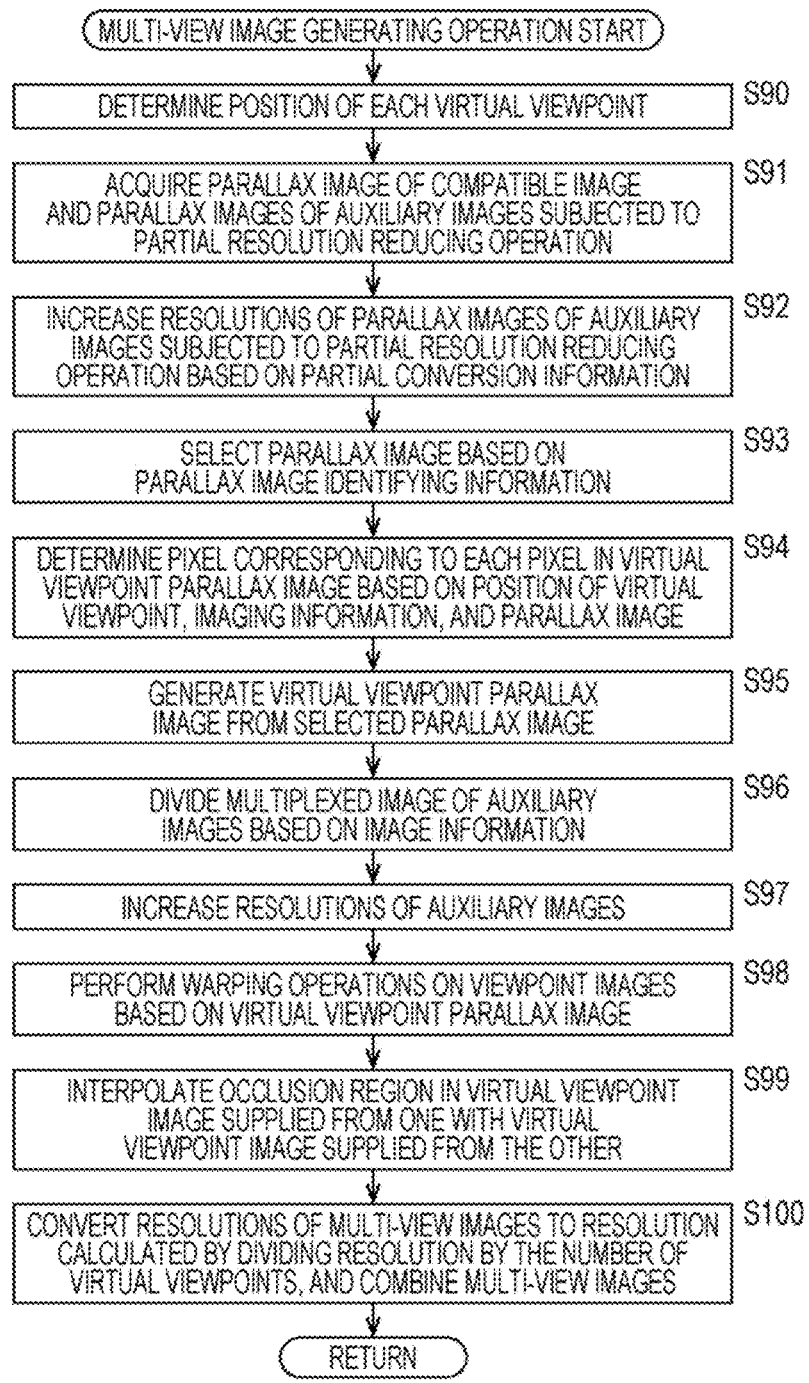
FIG. 19 is a flowchart for explaining in detail the multi-view image generating operation shown in FIG. 18.

FIG. 19 is a flowchart for explaining in detail the multi-view image generating operation of step S70 shown in FIG. 18.

In step S90 of FIG. 19, based on the inter-viewpoint distances contained in the imaging information supplied from the imaging information acquiring unit 124 and the number of viewpoints compatible with the display device (not shown), the virtual viewpoint position determining unit 161 (FIG. 10) of the 3D image generating unit 142 determines the positions of respective virtual viewpoints. Based on the positions of the respective virtual viewpoints, the virtual viewpoint position determining unit 161 generates parallax image identifying information for each of the parallax image warping unit 163 and the parallax image warping unit 164. The virtual viewpoint position determining unit 161 also supplies the positions of the respective virtual viewpoints and the corresponding parallax image identifying information to the parallax image warping unit 163 and the parallax image warping unit 164.

In step S91, the parallax image resolution increasing unit 162 acquires the parallax image A1' of the compatible image and the parallax images of the auxiliary images subjected to the partial resolution reducing operation, from the auxiliary decoder 132.

In step S92, based on the partial conversion information contained in the parallax image supplied from the parallax image information acquiring unit 125, the parallax image resolution increasing unit 162 increases the resolutions of the parallax images of the auxiliary images that have been subjected to the partial resolution reducing operation and have been acquired in step S91. As a result, the parallax image resolution increasing unit 162 obtains the parallax images of the viewpoint image B1 and the viewpoint image C1 with the same resolution as that of the compatible image. The parallax image resolution increasing unit 162 then supplies the obtained parallax images of the viewpoint image B1 and the viewpoint image C1, and the parallax image A1' supplied from the auxiliary decoder 132, to the parallax image warping unit 163 and the parallax image warping unit 164.

In step S93, based on the parallax image identifying information supplied from the virtual viewpoint position determining unit 161, the parallax image warping unit 163 selects, for each virtual viewpoint, one image from the parallax images of the viewpoint image B1 and the viewpoint image C1 and the parallax image A1', which are supplied from the parallax image resolution increasing unit 162. The parallax image warping unit 164 performs the same operations as those of the parallax image warping unit 163.

In steps S94 and S95, the parallax image warping units 163 and 164 each perform a warping operation on the selected parallax image.

Specifically, in step S94, for each virtual viewpoint, the parallax image warping unit 163 (164) determines the pixel corresponding to each pixel in the virtual viewpoint parallax image according to the above described equations (1), based on the position of the virtual viewpoint, the imaging information, and the selected parallax image.

In step S95, based on the pixel determined in step S94, the parallax image warping unit 163 (164) generates a virtual viewpoint parallax image from the selected parallax image, for each virtual viewpoint. Specifically, for each virtual viewpoint, the parallax image warping unit 163 (164) sets the parallax value of each pixel in the selected parallax image as the parallax value of the pixel determined in step S94 in the virtual viewpoint parallax image. The parallax image warping unit 163 (164) then supplies each resultant virtual viewpoint parallax image to the viewpoint image warping unit 165 (166).

In step S96, based on the image information supplied from the image information acquiring unit 123, the viewpoint image separating unit 167 divides the multiplexed image of the auxiliary images supplied from the auxiliary decoder 132. The viewpoint image separating unit 167 then supplies the resultant viewpoint images B1 and C1 having a resolution that is half the resolution of the compatible image, to the parallax image resolution increasing unit 162. Based on the compatibility information supplied from the compatibility information acquiring unit 126, the viewpoint image separating unit 167 supplies the viewpoint image A1 as the compatible image supplied from the compatible decoder 131, directly to the viewpoint image resolution increasing unit 168.

In step S97, the viewpoint image resolution increasing unit 168 increases the resolutions of the viewpoint image B1 and the viewpoint image C1 that are the auxiliary images and have the resolution that is half the resolution of the compatible image supplied from the viewpoint image separating unit 167. By doing so, the viewpoint image resolution increasing unit 168 obtains the viewpoint image B1 and the viewpoint image C1 having the same resolution as the compatible image. The viewpoint image resolution increasing unit 168 then supplies the obtained viewpoint image B1 and viewpoint image C1, and the viewpoint image A1 supplied from the viewpoint image separating unit 167, to the viewpoint image warping unit 165 and the viewpoint image warping unit 166.

In step S98, based on the parallax image of each virtual viewpoint supplied from the parallax image warping unit 163, the viewpoint image warping unit 165 performs, for each virtual viewpoint, a warping operation on the viewpoint image supplied from the viewpoint image resolution increasing unit 168, the viewpoint image corresponding to the parallax image. As a result, an image of each virtual viewpoint including an occlusion region is generated. The viewpoint image warping unit 165 supplies the image of each virtual viewpoint including an occlusion region to the multi-view image generating unit 169. The viewpoint image warping unit 166 performs the same operations as those of the viewpoint image warping unit 165, based on the parallax images of the respective virtual viewpoints supplied from the parallax image warping unit 164.

In step S99, for each virtual viewpoint, the multi-view image generating unit 169 interpolates the occlusion region of the virtual viewpoint image supplied from one of the viewpoint image warping units 165 and 166 with the virtual viewpoint image supplied from the other one of the viewpoint image warping units 165 and 166. The multi-view image generating unit 169 supplies the respective resultant virtual viewpoint images as multi-view images to the multi-view image combining unit 170.

In step S100, the multi-view image combining unit 170 converts the resolution of the multi-view images supplied from the multi-view image generating unit 169 into the resolution calculated by dividing the resolution of the compatible image and the auxiliary images by the number of the virtual viewpoints, and combines the resultant multi-view images, to generate a combined image of the multi-view images. The operation returns to step S70 of FIG. 18, and then moves on to step S71.

As described above, based on the partial conversion information, the decoding device 120 increases the resolutions of the parallax images that have been subjected to the partial resolution reducing operation and have been transmitted from the encoding device 50, and then subjects those parallax images to warping operations. Accordingly, by the decoding device 120, the parallax images subjected to the warping operations can be made similar to the parallax images not yet subjected to the partial resolution reducing operation. As a result, accurate warping operations can be performed on parallax images.

Second Embodiment

[Example Structure of a Second Embodiment of an Encoding Device]

Figure 20:
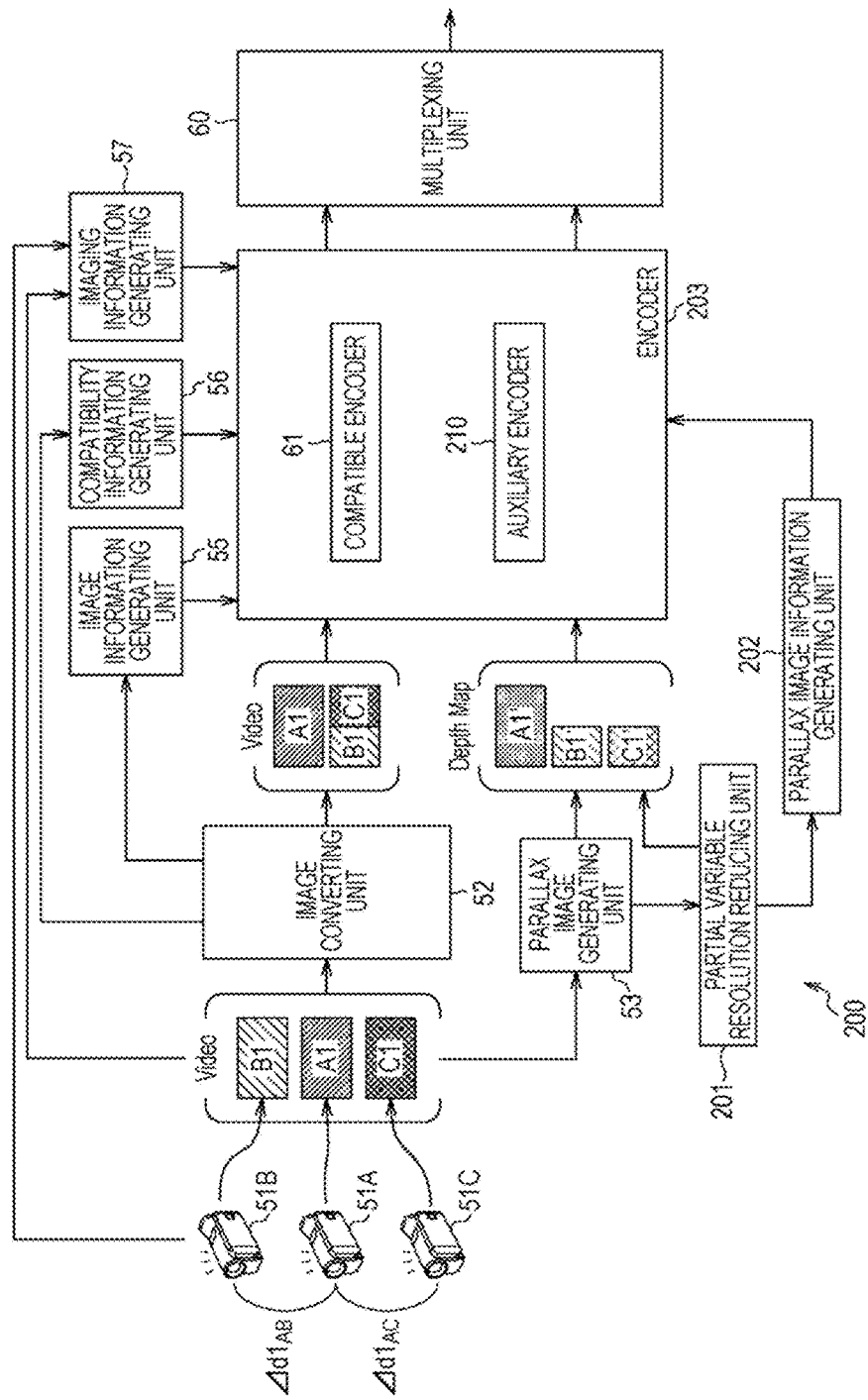
FIG. 20 is a block diagram showing an example structure of a second embodiment of an encoding device to which the present technique is applied.

FIG. 20 is a block diagram showing an example structure of a second embodiment of an encoding device as an image processing device to which the present technique is applied.

In the structure illustrated in FIG. 20, the same components as those in FIG. 1 are denoted by the same reference numerals as those in FIG. 1. The explanations that have already been made will not be repeated.

The structure of the encoding device 200 shown in FIG. 20 differs from the structure shown in FIG. 1, mainly in that the partial resolution reducing unit 54, the parallax image information generating unit 58, and the encoder 59 are replaced with a partial variable resolution reducing unit 201, a parallax image information generating unit 202, and an encoder 203.

The encoding device 200 does not reduce the resolution in the regions adjacent to the boundary position in a parallax image, but reduces the horizontal resolution in the other regions (hereinafter referred to as the extra-boundary region) to a variable resolution. In this manner, a partial variable resolution reducing operation is performed. The encoding device 200 also adds resolution information to the parallax image subjected to the partial variable resolution reducing operation, and transmits the parallax image, the resolution information indicating the horizontal resolution after the partial variable resolution reducing operation.

Specifically, the partial variable resolution reducing unit 201 of the encoding device 200 detects a boundary position from each of parallax images B1' and C1' supplied from the parallax image generating unit 53, on a macroblock basis. Based on the boundary position detected on a macroblock basis, the partial variable resolution reducing unit 201 generates boundary information on a macroblock basis.

For the parallax image B1', the partial variable resolution reducing unit 201 also generates a base sampling factor as base resolution information indicating the ratio of the base resolution to the horizontal resolution of the parallax image not yet subjected to the partial variable resolution reducing operation. Based on the parallax image B1' and the boundary information, the partial variable resolution reducing unit 201 also generates, for each macroblock, a sub-sampling factor as ratio information indicating the ratio of the horizontal resolution of the parallax image subjected to the partial variable resolution reducing operation to the base resolution. The partial variable resolution reducing unit 201 further generates, for each macroblock, a sub-sampling flag as resolution identification information indicating whether the horizontal resolution obtained after the partial variable resolution reducing operation is the base resolution. Likewise, the partial variable resolution reducing unit 201 generates the base sampling factor, the sub-sampling factors, and the sub-sampling flags for the parallax image C1'.

Based on the corresponding base sampling factor and sub-sampling factor, the partial variable resolution reducing unit 201 performs the partial variable resolution reducing operation on each of the parallax image B1' and the parallax image C1'. The partial variable resolution reducing unit 201 supplies the parallax images B1' and C1' subjected to the partial variable resolution reducing operation, to the encoder 203.

The partial variable resolution reducing unit 201 selects the sub-sampling factor indicating that the horizontal resolution after the partial variable resolution reducing operation is not the base resolution, or the sub-sampling factor having a value other than 1, from the sub-sampling factors of the parallax image B1' and the parallax image C1'. The partial variable resolution reducing unit 201 then supplies the base sampling factors of the parallax image B1' and the parallax image C1', the selected sub-sampling factor, and the sub-sampling flags, as the resolution information, to the parallax image information generating unit 202.

As described above, the partial variable resolution reducing unit 201 does not use the resolution obtained after the partial variable resolution reducing operation as the resolution information, but use the base sampling factors, the sub-sampling factor that is not 1, and the sub-sampling flags, as the resolution information. Accordingly, when the horizontal resolution obtained through the partial variable resolution reducing operation is the base resolution, the information generated as the resolution information on a macroblock basis is only a 1-bit sub-sampling flag. Thus, the amount of information as the resolution information can be reduced.

The parallax image information generating unit 202 generates parallax image information that is the information about the parallax images, such as the resolution information supplied from the partial variable resolution reducing unit 201, and then supplies the parallax image information to the encoder 203.

The encoder 203 is formed with a compatible encoder 61 and an auxiliary encoder 210. The auxiliary encoder 210 functions as an encoding unit, and encodes, by a predetermined technique, the multiplexed image of the auxiliary images from the image converting unit 52, the parallax image A1' from the parallax image generating unit 53, and the parallax images of the auxiliary images subjected to the partial variable resolution reducing operation from the partial variable resolution reducing unit 201. The encoding technique used by the auxiliary encoder 210 may be the AVC technique, the MVC technique, the MPEG2 technique, or the like.

The auxiliary encoder 210 adds the image information from the image information generating unit 55, the compatibility information from the compatibility information generating unit 56, the imaging information from the imaging information generating unit 57, the parallax image information from the parallax image information generating unit 58, and the like, to the encoded images obtained as a result of the encoding. At this point, the auxiliary encoder 210 divides the resolution information before adding.

Specifically, the auxiliary encoder 210 writes the base sampling factor into the slice layer of an encoded image. The auxiliary encoder 210 also writes the sub-sampling factors into a layer higher than the slice layer of the encoded image. The auxiliary encoder 210 further writes the sub-sampling flags into the macroblock layer.

The auxiliary encoder 210 supplies an encoded stream formed with encoded images accompanied by image information, compatibility information, imaging information, parallax image information, and the like, as an auxiliary stream to the multiplexing unit 60.

[Specific Example Structure of the Partial Variable Resolution Reducing Unit]

Figure 21:
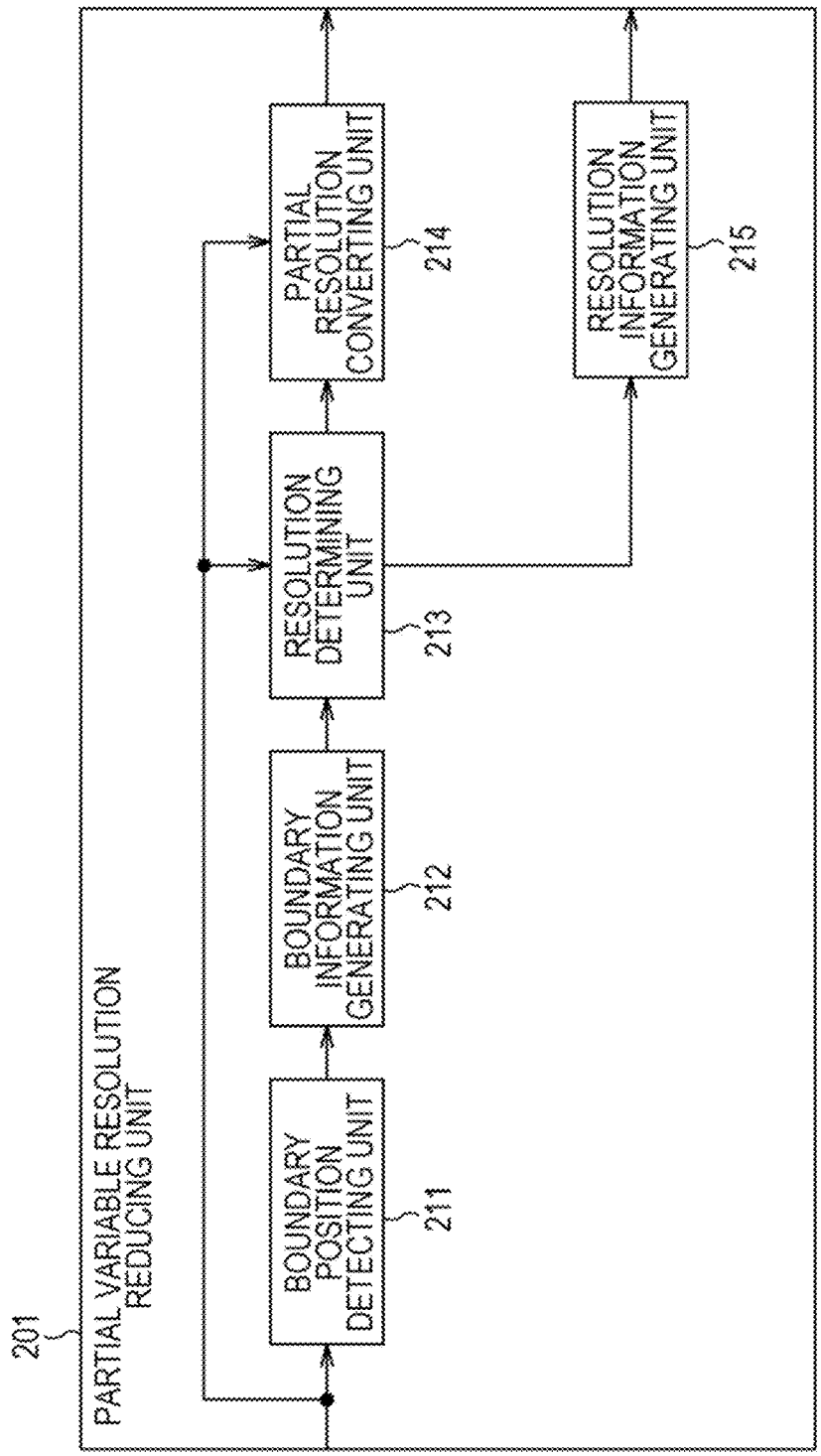
FIG. 21 is a block diagram showing a specific example structure of the partial variable resolution reducing unit shown in FIG. 20.

FIG. 21 is a block diagram showing a specific example structure of the partial variable resolution reducing unit 201 shown in FIG. 20.

The partial variable resolution reducing unit 201 shown in FIG. 21 includes a boundary position detecting unit 211, a boundary information generating unit 212, a resolution determining unit 213, a partial resolution converting unit 214, and a resolution information generating unit 215.

The boundary position detecting unit 211 of the partial variable resolution reducing unit 201 detects, on a macroblock basis, a boundary position from each of the parallax images B1' and C1' supplied from the parallax image generating unit 53 shown in FIG. 20, and supplies the detection result to the boundary information generating unit 212.

Based on the detection result supplied from the boundary position detecting unit 211, the boundary information generating unit 212 generates the boundary information on a macroblock basis, and supplies the boundary information to the resolution determining unit 213 and the resolution information generating unit 215.

The resolution determining unit 213 generates the base sampling factors of the parallax image B1' and the parallax image C1'. Based on the parallax image B1' and the corresponding boundary information and base sampling factor, the resolution determining unit 213 also generates the sub-sampling factors and the sub-sampling flags on a macroblock basis. Likewise, based on the parallax image C1' and the corresponding boundary information and base sampling factor, the resolution determining unit 213 also generates the sub-sampling factors and the sub-sampling flags on a macroblock basis.

The resolution determining unit 213 then supplies the generated base sampling factors and sub-sampling factors of the parallax image B1' and the parallax image C1' to the partial resolution converting unit 214. The resolution determining unit 213 also supplies the generated base sampling factors, and sub-sampling factors, and sub-sampling flags of the parallax image B1' and the parallax image C1' to the resolution information generating unit 215.

The partial resolution converting unit 214 functions as a resolution reducing unit, and reduces the horizontal resolution of each of the parallax image B1' and the parallax image C1', based on the base sampling factors and the sub-sampling factors supplied from the resolution determining unit 213. Specifically, the partial resolution converting unit 214 does not reduce the resolution in the regions adjacent to the boundary positions in the parallax image B1' and the parallax image C1', but reduces the horizontal resolution in the extra-boundary region to a resolution calculated by multiplying the horizontal resolution by the product of the base sampling factor and the sub-sampling factor. The partial resolution converting unit 214 then supplies the parallax images B1' and C1' having their resolutions reduced, to the encoder 203 shown in FIG. 20.

The resolution information generating unit 215 functions as a generating unit. Specifically, the resolution information generating unit 215 selects the sub-sampling factor having a value other than 1 from the sub-sampling factors of the parallax image B1' and the parallax image C1' supplied from the resolution determining unit 213. The resolution information generating unit 215 then supplies the base sampling factors of the parallax image B1' and the parallax image C1', the sub-sampling factor having a value other than 1, and the sub-sampling flags, as the resolution information, to the parallax image information generating unit 202 shown in FIG. 20.

[Description of the Partial Variable Resolution Reducing Operation]

Figure 22:
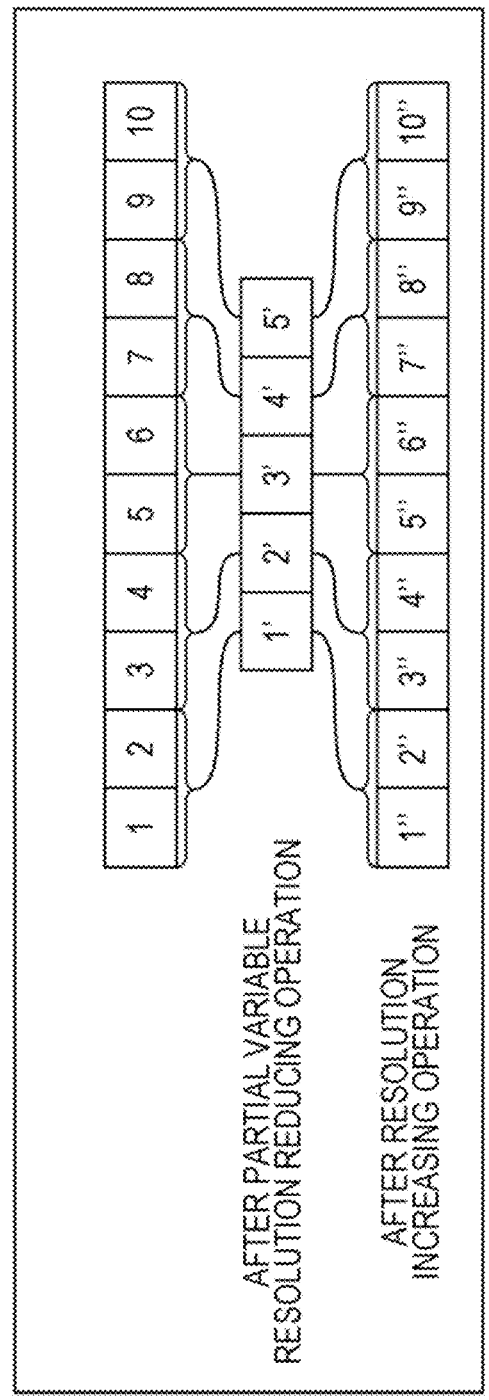
FIG. 22 is a diagram for explaining a partial variable resolution reducing operation.
Figure 23:
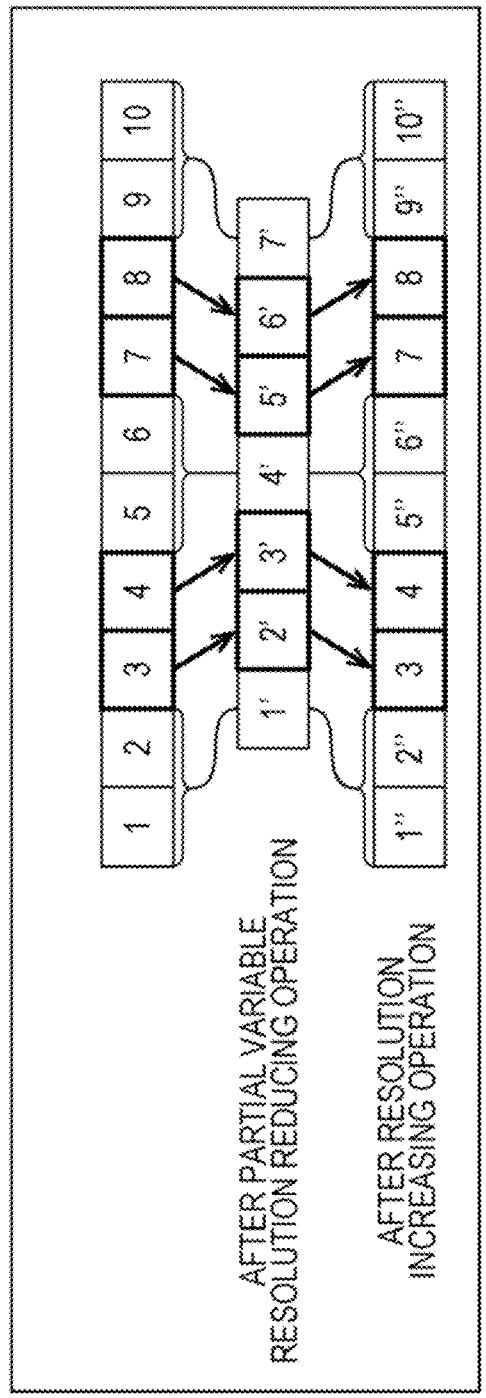
FIG. 23 is a diagram for explaining a partial variable resolution reducing operation.

FIGS. 22 and 23 are diagrams for explaining the partial variable resolution reducing operation by the partial variable resolution reducing unit 201 shown in FIG. 21.

In FIGS. 22 and 23, each square with a number i represents the ith macroblock.

In the example illustrated in FIG. 22, all of the first through tenth macroblocks aligned in the horizontal direction in a parallax image to be subjected to a partial variable resolution reducing operation are located in the extra-boundary region. In this case, when the horizontal resolution obtained after the partial variable resolution reducing operation in the extra-boundary region is half the resolution observed prior to the partial variable resolution reducing operation, one macroblock is generated from each two adjacent macroblocks among the first through tenth macroblocks. As a result, the number of macroblocks in the parallax image after the partial variable resolution reducing operation becomes 5. In the later described decoding device, the resolution of the parallax image subjected to the partial variable resolution reducing operation is increased, and the number of macroblocks after the resolution increase becomes 10, which is the same as the number counted prior to the partial variable resolution reducing operation.

In this case, if the base sampling factor is ½, for example, the sub-sampling factors of all the macroblocks in the parallax image after the partial variable resolution reducing operation are 1, and the sub-sampling flags are 0, which indicates that the horizontal resolution after the partial variable resolution reducing operation is the base resolution. Therefore, the sub-sampling factors are not included in the resolution information.

In the example illustrated in FIG. 23, on the other hand, of the first through tenth macroblocks aligned in the horizontal direction in a parallax image to be subjected to a partial variable resolution reducing operation, the third, fourth, seventh, and eighth macroblocks include regions adjacent to the boundary position, and the other macroblocks are located in the extra-boundary region. In this case, when the horizontal resolution obtained after the partial variable resolution reducing operation in the extra-boundary region is half the resolution observed prior to the partial variable resolution reducing operation, one macroblock is generated from each two adjacent macroblocks, except for the third, fourth, seventh, and eighth macroblocks. The third, fourth, seventh, and eighth macroblocks including regions adjacent to the boundary position are maintained. As a result, the number of macroblocks in the parallax image after the partial variable resolution reducing operation becomes 7. In the later described decoding device, the resolutions of the first, fourth, and seventh macroblocks corresponding to the extra-boundary region are increased in the parallax image subjected to the partial variable resolution reducing operation. As a result, the number of macroblocks after the resolution increase becomes 10, which is the same as the number counted prior to the partial variable resolution reducing operation.

In this case, if the base sampling factor is ½, the sub-sampling factors of the second, third, fifth, and sixth macroblocks in the parallax image subjected to the partial variable resolution reducing operation are 2. The sub-sampling flags of those macroblocks are 1, which indicates that the resolution after the partial variable resolution reducing operation is not the base resolution. Meanwhile, the sub-sampling factors of the first, fourth, and seventh macroblocks in the parallax image after the partial variable resolution reducing operation are 1, and the sub-sampling flags are 0. Therefore, the sub-sampling factors of the first, fourth, and seventh macroblocks are not included in the resolution information.

[Description of an Operation of the Encoding Device]

The encoding operation of the encoding device 200 shown in FIG. 20 is the same as the encoding operation shown in FIGS. 6 and 7, except that the partial resolution reducing operation in step S19 of FIG. 7 is replaced with a partial variable resolution reducing operation, and the parallax image information generated in step S20 includes resolution information. Therefore, only the partial variable resolution reducing operation is described below.

Figure 24:
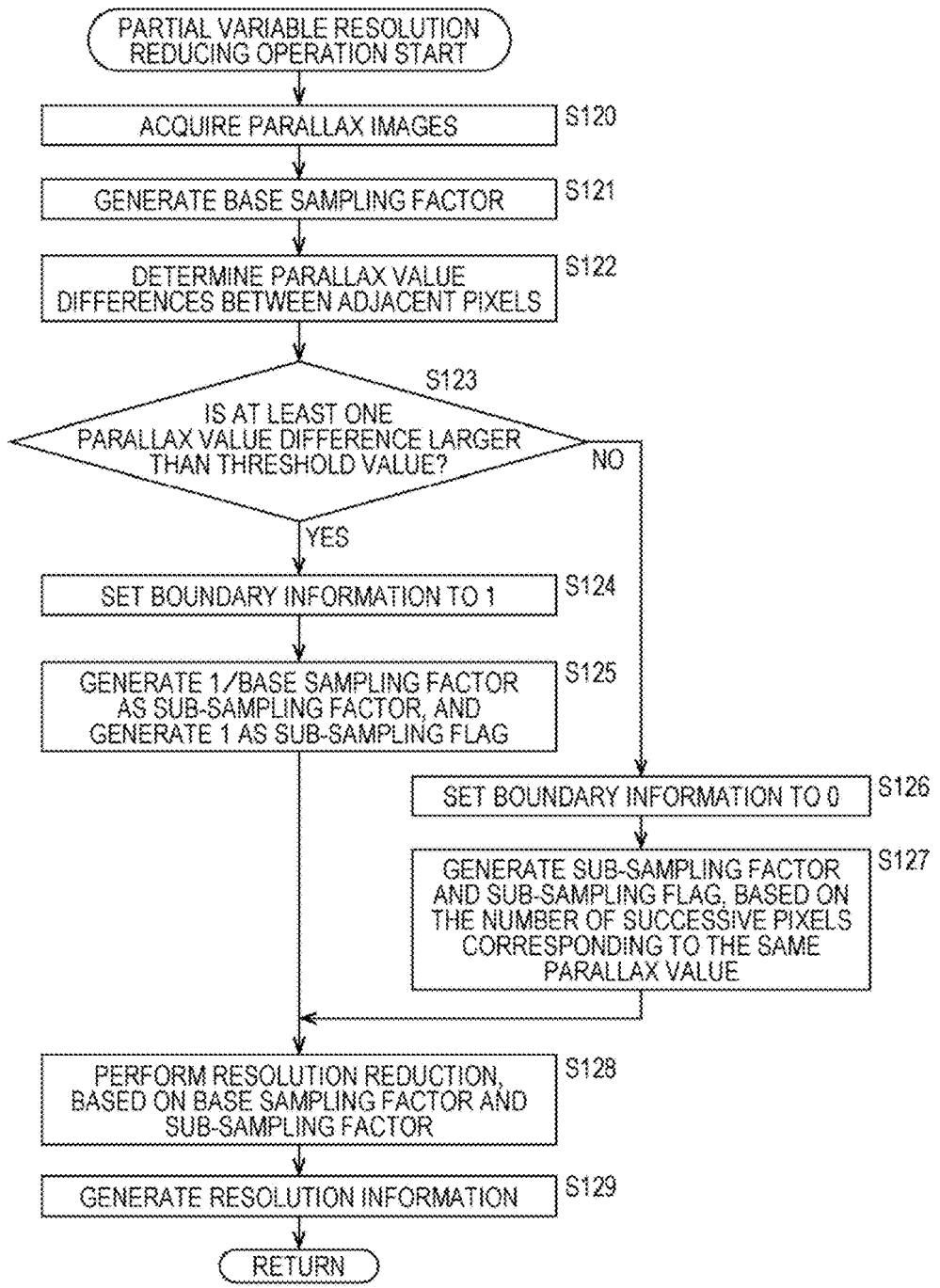
FIG. 24 is a flowchart for explaining the partial variable resolution reducing operation of the encoding device shown in FIG. 20.

FIG. 24 is a flowchart for explaining the partial variable resolution reducing operation of the encoding device 200 shown in FIG. 20. The partial variable resolution reducing operation shown in FIG. 24 is performed for each parallax image.

In step S120 of FIG. 24, the boundary position detecting unit 211, the resolution determining unit 213, and the partial resolution converting unit 214 of the partial variable resolution reducing unit 201 (FIG. 21) acquires a parallax image supplied from the parallax image generating unit 53 shown in FIG. 20.

In step S121, the resolution determining unit 213 generates the base sampling factor, and supplies the base sampling factor to the partial resolution converting unit 214 and the resolution information generating unit 215. The following procedures of steps S122 through S128 are carried out on a macroblock basis.

In step S122, the boundary position detecting unit 211 determines the parallax value difference between each two adjacent pixels aligned in the horizontal direction in the current target macroblock in the parallax image acquired in step S121.

In step S123, the boundary position detecting unit 211 determines whether at least one parallax difference among the parallax value differences calculated in step S122 is larger than a predetermined threshold value. If at least one parallax value difference is determined to be larger than the predetermined threshold value in step S123, the boundary position detecting unit 211 supplies a detection result to the boundary information generating unit 212, the detecting result indicting that a boundary position has been detected.

In step S124, based on the detection result supplied from the boundary position detecting unit 211, the boundary information generating unit 212 sets the boundary information to 1, and supplies the boundary information to the resolution determining unit 213.

In step S125, the resolution determining unit 213 generates 1/base sampling factor as the sub-sampling factor of the current target macroblock, and generates 1 as the sub-sampling flag. That is, the resolution determining unit 213 adjusts the horizontal resolution of the current target macroblock after the partial variable resolution reducing operation to the horizontal resolution observed prior to the partial variable resolution reducing operation. The resolution determining unit 213 then supplies the generated sub-sampling factor to the partial resolution converting unit 214, and supplies the sub-sampling factor and the sub-sampling flag to the resolution information generating unit 215. The operation then moves on to step S128.

If all the parallax value differences are determined not to be larger than the predetermined threshold value in step S123, on the other hand, the boundary position detecting unit 211 supplies a detection result to the boundary information generating unit 212, the detecting result indicting that a boundary position has not been detected.

In step S126, based on the detection result supplied from the boundary position detecting unit 211, the boundary information generating unit 212 sets the boundary information to 0, and supplies the boundary information to the resolution determining unit 213.

In step S127, based on the number of continuous pixels corresponding to identical parallax values among the pixels in the current target macroblock in the parallax image, the resolution determining unit 213 generates the sub-sampling factor and the sub-sampling flag of the macroblock.

Specifically, the larger the number of continuous pixels corresponding to identical parallax values among the pixels in the current target macroblock in the parallax image, the smaller value is set as the horizontal resolution after the partial variable resolution reducing operation in the macroblock by the resolution determining unit 213. The resolution determining unit 213 then calculates the sub-sampling factor that is the ratio of the determined resolution to the base resolution. The resolution determining unit 213 also generates 0 as the sub-sampling flag when the sub-sampling factor is 1, and generates 1 as the sub-sampling flag when the sub-sampling factor is not 1.

The resolution determining unit 213 then supplies the generated sub-sampling factor to the partial resolution converting unit 214, and supplies the sub-sampling factor and the sub-sampling flag to the resolution information generating unit 215. The operation then moves on to step S128.

In step S128, based on the base sampling factor and the sub-sampling factor supplied from the resolution determining unit 213, the partial resolution converting unit 214 reduces the resolution of the current target macroblock in the parallax image. The partial resolution converting unit 214 then supplies the parallax images having their resolutions reduced, to the encoder 203 (FIG. 20).

In step S129, based on the base sampling factor, the sub-sampling factor, and the sampling flag supplied from the resolution determining unit 213, the resolution information generating unit 215 generates the resolution information. The resolution information generating unit 215 supplies the generated resolution information to the parallax image information generating unit 202 (FIG. 20), and the partial variable resolution reducing operation then comes to an end.

In the above described manner, the encoding device 200 performs the partial variable resolution reducing operation on the parallax images of the auxiliary images. Accordingly, the encoding device 200 can reduce the amount of information about a parallax image having many identical parallax values in the extra-boundary region, by reducing the horizontal resolution in the extra-boundary region of the parallax image after the partial variable resolution reducing operation as the number of continuous pixels corresponding to the identical parallax values in the extra-boundary region becomes larger. In the region where identical parallax values are aligned, only a small error occurs during a resolution increasing operation even if the resolution is made relative low. Therefore, the influence on the image quality of the parallax image after the resolution increase in the later described decoding device is small.

The encoding device 200 also transmits the resolution information as well as the parallax image subjected to the partial variable resolution reducing operation. The later described decoding device increases the resolutions of parallax images subjected to the partial variable resolution reducing operation, based on the resolution information, so as to obtain parallax images that are more similar to the parallax images observed prior to the partial variable resolution reducing operation. Thus, the decoding device can perform warping operations on parallax images that are more similar to the parallax images not yet subjected to the partial variable resolution reducing operation. As a result, the decoding device can perform accurate parallax image warping operations.

[Example Structure of the Decoding Device]

Figure 25:
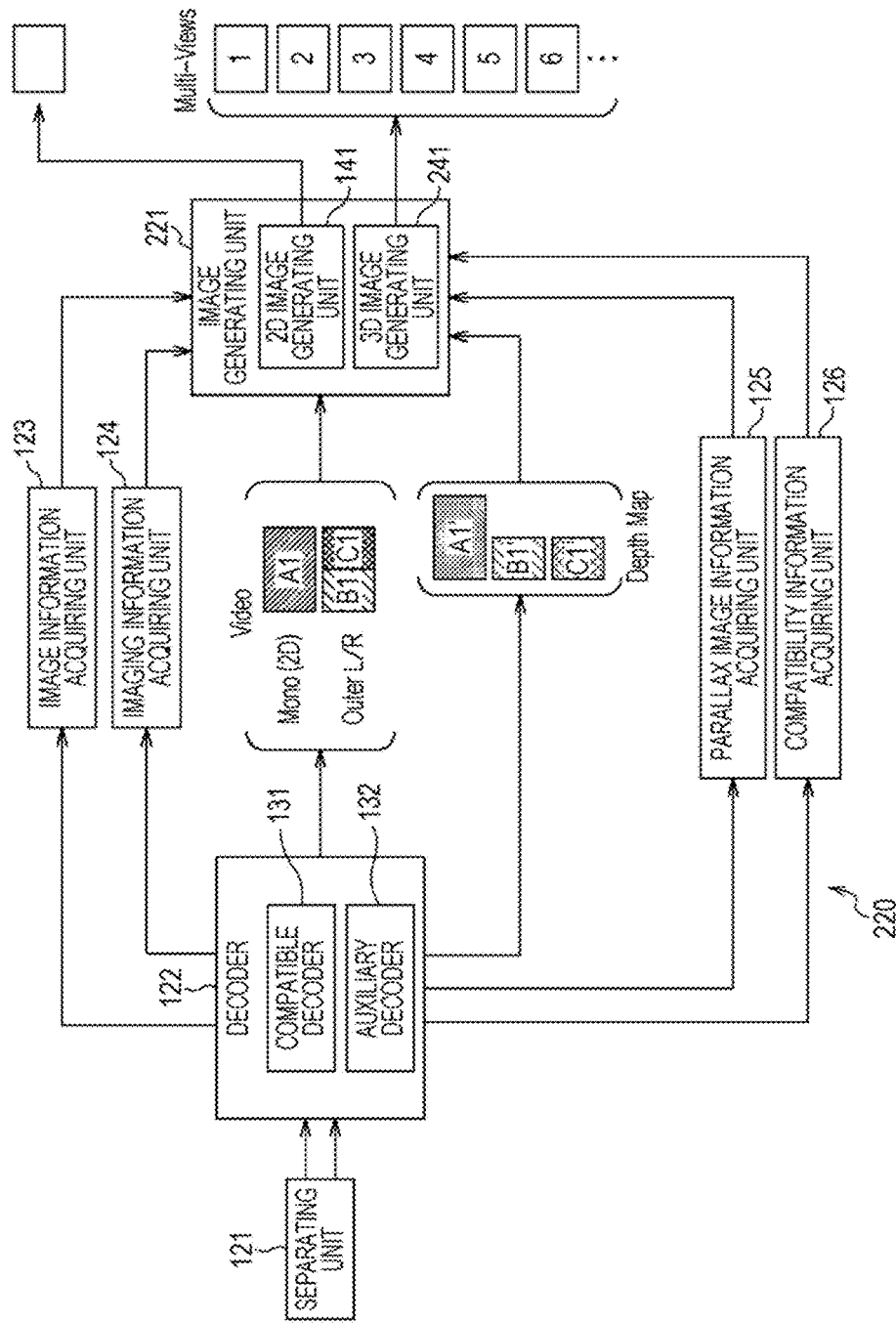
FIG. 25 is a diagram showing an example structure of a decoding device compatible with the encoding device shown in FIG. 20.

FIG. 25 is a diagram showing an example structure of the decoding device that decodes the multiplexed stream transmitted from the encoding device 200 shown in FIG. 20, the decoding device being an image processing device to which the present technique is applied.

In the structure illustrated in FIG. 25, the same components as those in FIG. 9 are denoted by the same reference numerals as those in FIG. 9. The explanations that have already been made will not be repeated.

The structure of the decoding device 220 shown in FIG. 25 differs from the structure shown in FIG. 9, mainly in that the image generating unit 127 is replaced with an image generating unit 221. The decoding device 220 decodes the multiplexed stream transmitted from the encoding device 200, and increases the resolutions of the parallax images of the auxiliary images, based on the resolution information. The decoding device 220 then performs warping operations, to generate multi-view images.

Specifically, the image generating unit 221 of the decoding device 220 is formed with a 2D image generating unit 141 and a 3D image generating unit 241. Using the viewpoint image A1, the multiplexed image of the auxiliary images, the parallax image A1' of the compatible image, and the parallax images of the auxiliary images subjected to the partial variable resolution reducing operation, which are supplied from the decoder 122, the 3D image generating unit 241 of the image generating unit 221 generates images that are of three or more viewpoints compatible with a display device (not shown) and have the same resolution as the compatible image, based on the image information, the imaging information, the parallax image information, the compatibility information, and the like. Like the 3D image generating unit 142 shown in FIG. 9, the 3D image generating unit 241 then converts the resolution of the generated multi-value images to the resolution calculated by dividing the resolution of the compatible image and the auxiliary images by the number of viewpoints, and combines the multi-view images. The resultant image is displayed on the display device (not shown).

At this point, the combined multi-view image is displayed, with viewable angle varying at the respective viewpoints. The viewer can view a 3D image without wearing glasses by seeing the images of any two viewpoints with the right and left eyes.

[Specific Example Structure of the 3D Image Generating Unit]

Figure 26:
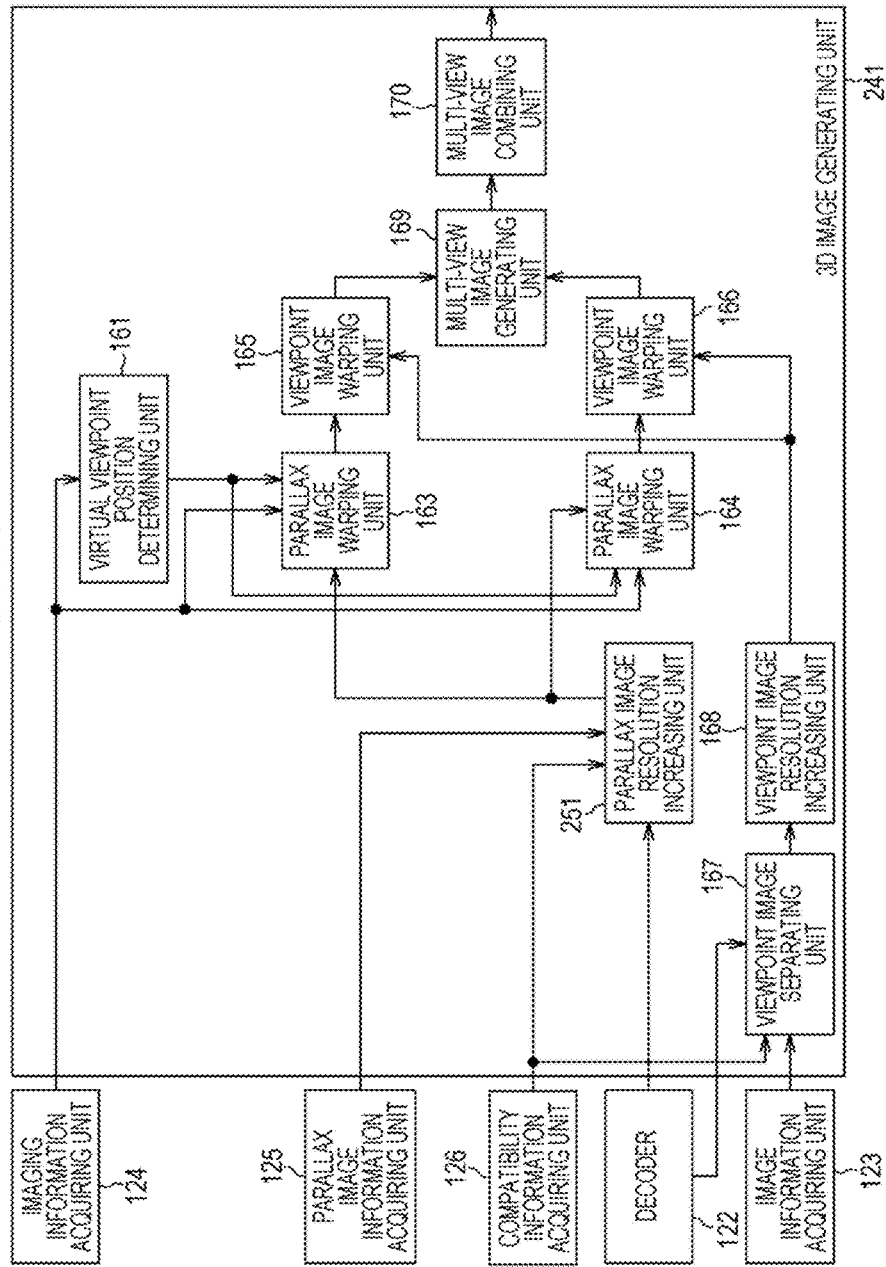
FIG. 26 is a block diagram showing a specific example structure of the 3D image generating unit shown in FIG. 25.

FIG. 26 is a block diagram showing a specific example structure of the 3D image generating unit 241 shown in FIG. 25.

In the structure illustrated in FIG. 26, the same components as those in FIG. 10 are denoted by the same reference numerals as those in FIG. 10. The explanations that have already been made will not be repeated.

The structure of the 3D image generating unit 241 shown in FIG. 26 differs from the structure shown in FIG. 10, in that the parallax image resolution increasing unit 162 is replaced with a parallax image resolution increasing unit 251.

Based on the compatibility information supplied from the compatibility information acquiring unit 126, the parallax image resolution increasing unit 251 supplies the parallax image A1' of the compatible image supplied from the decoder 122, directly to the parallax image warping unit 163 and the parallax image warping unit 164, like the parallax image resolution increasing unit 162 shown in FIG. 10.

The parallax image resolution increasing unit 251 also functions as a resolution increasing unit, and, based on the resolution information contained in the parallax image information supplied from the parallax image information acquiring unit 125, increases the resolutions of the parallax images of the auxiliary images that have been subjected to the partial variable resolution reducing operation and are supplied from the decoder 122.

Specifically, of the resolution information, the parallax image resolution increasing unit 251 stores a base sampling factor supplied for each slice, and a sub-sampling factor supplied for each unit higher than slices. When the sub-sampling flag supplied for each macroblock in the resolution information is 0, the parallax image resolution increasing unit 251 reads out the stored base sampling factor. The parallax image resolution increasing unit 251 then increases the resolution of the macroblock corresponding to the sub-sampling flag to a resolution that is calculated by multiplying the resolution of the macroblock by 1/base sampling factor. When the sub-sampling flag is 1, on the other hand, the stored base sampling factor and sub-sampling factor are read out, and the resolution of the macroblock corresponding to the sub-sampling flag is increased to a resolution calculated by multiplying the resolution of the macroblock by 1/(base sampling factor×sub-sampling factor).

As described above, in the partial variable resolution reducing operation, a resolution reduction is not performed on the parallax values that differ from those having the resolutions not yet reduced after a resolution increase due to the resolution reduction, and are located in the regions adjacent to the boundary position, as in the partial resolution reducing operation. The resolutions of parallax images subjected to the partial variable resolution reducing operation are increased based on the resolution information, so that parallax images after the resolution increase can be made similar to the parallax images observed prior to the partial variable resolution reducing operation. In view of this, the resolution information can be regarded as the information for restoring the parallax images not yet subjected to the partial variable resolution reducing operation from the parallax images subjected to the partial variable resolution reducing operation.

The parallax image resolution increasing unit 251 then supplies the parallax images of the viewpoint image B1 and the viewpoint image C1 that are obtained as a result of the resolution increase and have the same resolution as the compatible image, to the parallax image warping unit 163 and the parallax image warping unit 164.

[Description of an Operation of the Decoding Device]

A decoding operation of the decoding device 220 shown in FIG. 25 is the same as the decoding operation shown in FIG. 18, except for the multi-view image generating operation of step S70 shown in FIG. 18. Therefore, only the multi-view image generating operation is described below.

Figure 27:
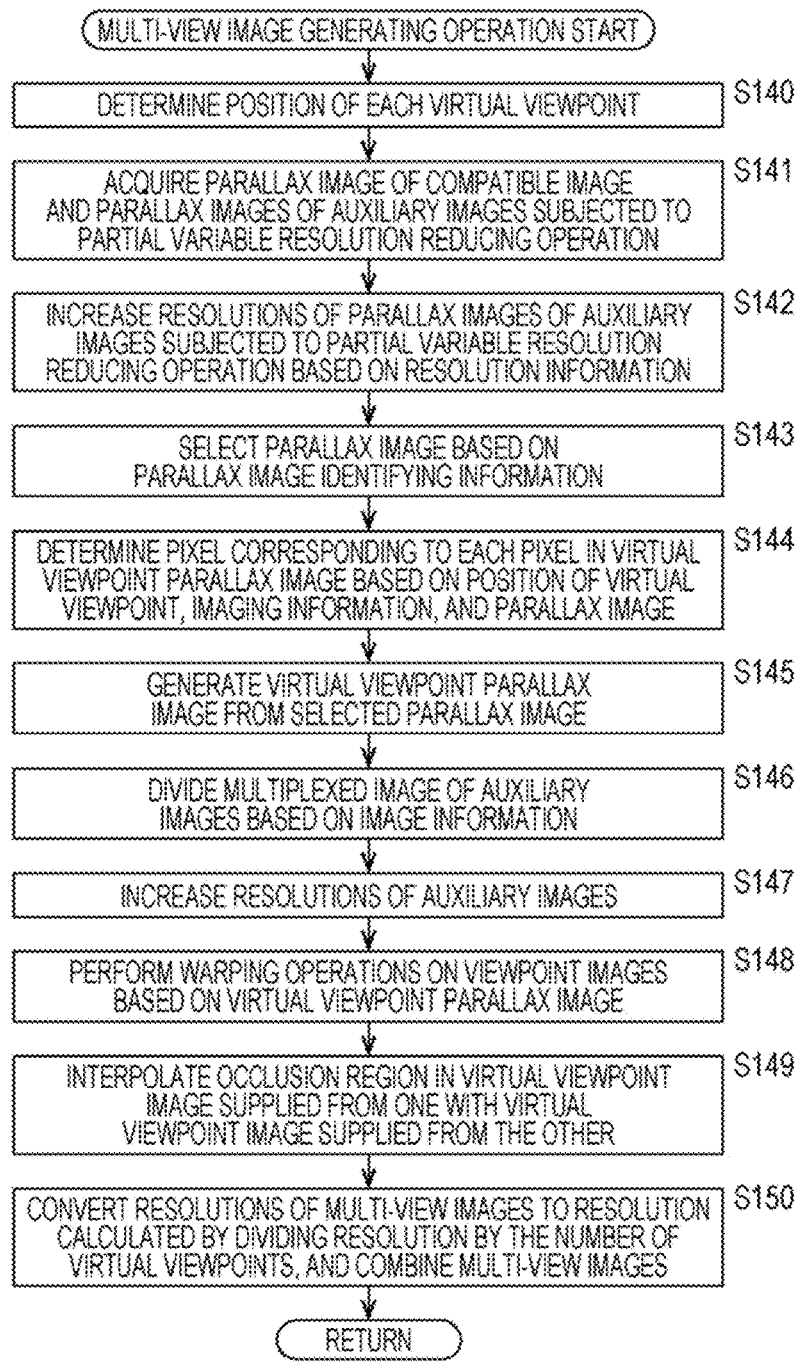
FIG. 27 is a flowchart for explaining a multi-view image generating operation of the decoding device shown in FIG. 25.

FIG. 27 is a flowchart for explaining a multi-view image generating operation of the decoding device 220 shown in FIG. 25.

In step S140 of FIG. 27, based on the inter-viewpoint distances and the number of viewpoints compatible with the display device (not shown), the virtual viewpoint position determining unit 161 (FIG. 26) of the 3D image generating unit 241 determines the positions of respective virtual viewpoints, as in step S90 of FIG. 19. Based on the positions of the respective virtual viewpoints, the virtual viewpoint position determining unit 161 generates parallax image identifying information for each of the parallax image warping unit 163 and the parallax image warping unit 164. The virtual viewpoint position determining unit 161 also supplies the positions of the respective virtual viewpoints and the corresponding parallax image identifying information to the parallax image warping unit 163 and the parallax image warping unit 164.

In step S141, the parallax image resolution increasing unit 251 acquires the parallax image A1' of the compatible image and the parallax images of the auxiliary images subjected to the partial variable resolution reducing operation, from the auxiliary decoder 132.

In step S142, based on the resolution information contained in the parallax image supplied from the parallax image information acquiring unit 125, the parallax image resolution increasing unit 251 increases the resolutions of the parallax images of the auxiliary images that have been subjected to the partial variable resolution reducing operation and have been acquired in step S141. As a result, the parallax image resolution increasing unit 251 obtains the parallax images of the viewpoint image B1 and the viewpoint image C1 with the same resolution as that of the compatible image. The parallax image resolution increasing unit 251 then supplies the obtained parallax images of the viewpoint image B1 and the viewpoint image C1, and the parallax image A1' supplied from the auxiliary decoder 132, to the parallax image warping unit 163 and the parallax image warping unit 164.

The procedures of steps S143 through S150 are the same as the procedures of steps S93 through S100 of FIG. 19, and therefore, explanation of them is not repeated herein.

As described above, based on the resolution information, the decoding device 220 increases the resolutions of the parallax images that have been subjected to the partial variable resolution reducing operation and have been transmitted from the encoding device 200, and then subjects those parallax images to warping operations. Accordingly, by the decoding device 220, the parallax images subjected to the warping operations can be made similar to the parallax images not yet subjected to the partial variable resolution reducing operation. As a result, more accurate warping operations can be performed on parallax images.

Although the resolutions after the partial variable resolution reducing operation are determined on a macroblock basis in the second embodiment, the resolutions may be determined on a sub-macroblock basis.

Although the parallax image B1' and the parallax image C1' of the auxiliary images are encoded independently of each other in the first and second embodiments, a multiplexed image of the parallax image B1' and the parallax image C1' may be encoded.

Third Embodiment

[Example Structure of a Third Embodiment of an Encoding Device]

Figure 28:
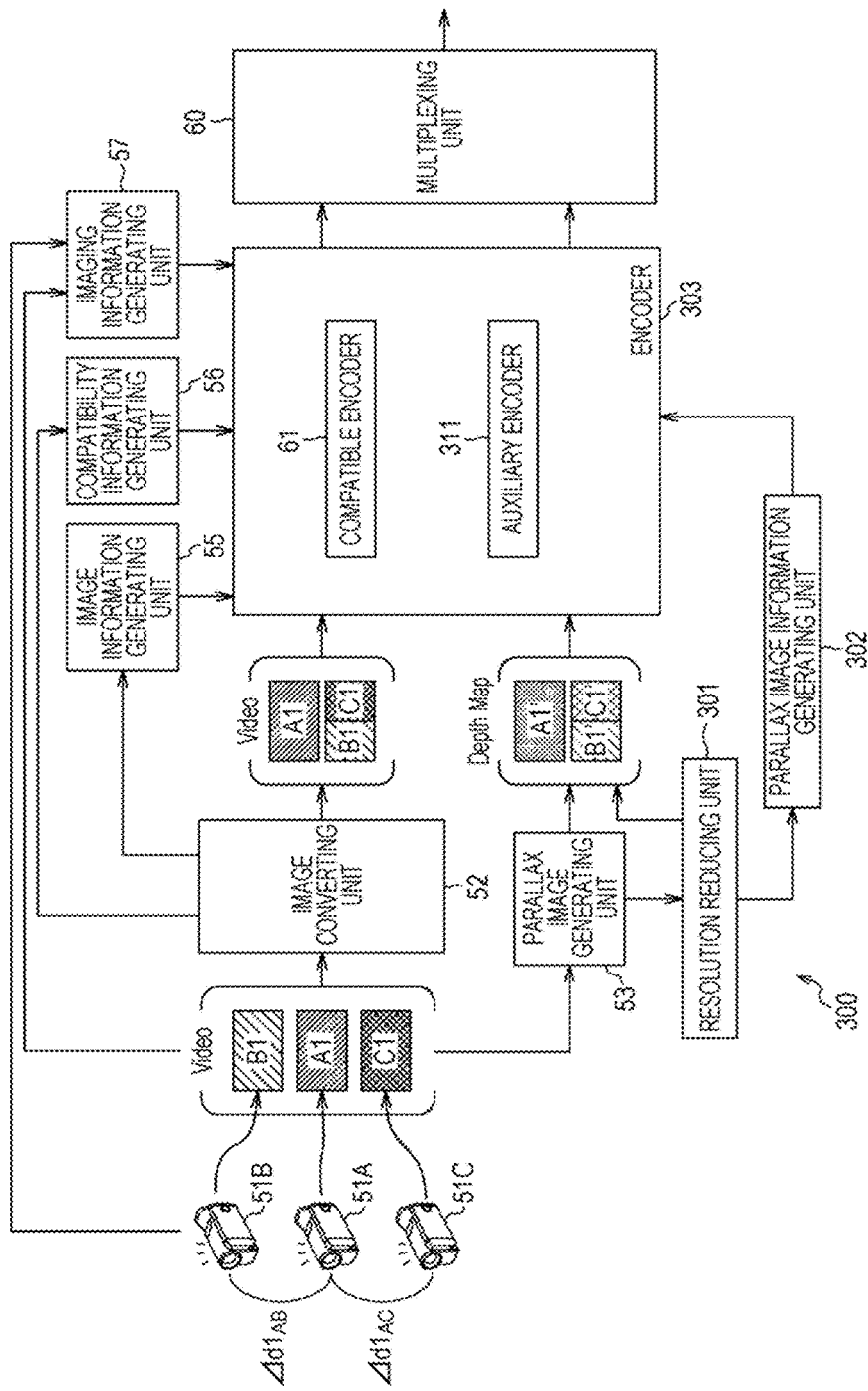
FIG. 28 is a block diagram showing an example structure of a third embodiment of an encoding device to which the present technique is applied.

FIG. 28 is a block diagram showing an example structure of a third embodiment of an encoding device as an image processing device to which the present technique is applied.

In the structure illustrated in FIG. 28, the same components as those in FIG. 1 are denoted by the same reference numerals as those in FIG. 1. The explanations that have already been made will not be repeated.

The structure of the encoding device 300 shown in FIG. 28 differs from the structure shown in FIG. 1, in that the partial resolution reducing unit 54, the parallax image information generating unit 58, and the encoder 59 are replaced with a resolution reducing unit 301, a parallax image information generating unit 302, and an encoder 303. The encoding device 300 reduces the resolution of a parallax image of an auxiliary image, and transmits interpolation information for restoring the parallax values of the regions adjacent to the boundary position in the parallax image not yet subjected to the resolution reduction, from the parallax image subjected to the resolution reduction.

Specifically, the resolution reducing unit 301 of the encoding device 300 reduces each of the horizontal resolutions of the parallax images B1' and C1' supplied from the parallax image generating unit 53 to a resolution calculated by multiplying the horizontal resolution by ½. Like the partial resolution reducing unit 54 of FIG. 1, the resolution reducing unit 301 detects a boundary position from each of the parallax images B1' and C1' supplied from the parallax image generating unit 53, on a pixel basis or macroblock basis. Based on the detected boundary position, the resolution reducing unit 301 generates boundary information on a pixel basis or macroblock basis, like the partial resolution reducing unit 54.

Based on the boundary information, the parallax image and the parallax image B1' having its resolution reduced, the resolution reducing unit 301 generates the interpolation information about the parallax image B1'. Likewise, based on the boundary information, the parallax image C1', and the parallax image C1' having its resolution reduced, the resolution reducing unit 301 generates the interpolation information about the parallax image C1'. The interpolation information may be the parallax value differences in the regions adjacent to the boundary position between the result of a resolution increase of a parallax image subjected to a resolution reduction and the parallax image not yet subjected to the resolution reduction, or factors to be used in the mathematical formula for calculating the parallax values in the regions adjacent to the boundary position in the parallax image not yet subjected to the resolution reduction from the result of the resolution increase of the parallax image subjected to the resolution reduction, for example. The resolution reducing unit 301 multiplexes the parallax image B1' and the parallax image C1' with the reduced resolutions by a predetermined multiplexing technique, and supplies the resultant multiplexed image to the encoder 303.

The resolution reducing unit 301 also supplies the interpolation information about the parallax images B1' and C1', and the information indicating the multiplexing technique, to the parallax image information generating unit 302.

The parallax image information generating unit 302 generates parallax image information that is the information about the parallax images, such as the interpolation information about the parallax images B1' and C1' supplied from the resolution reducing unit 301, and the information indicating the multiplexing technique. The parallax image information is supplied the parallax image information to the encoder 303.

The encoder 303 is formed with a compatible encoder 61 and an auxiliary encoder 311. The auxiliary encoder 311 functions as an encoding unit, and encodes, by a predetermined technique, the multiplexed image of the auxiliary images from the image converting unit 52, the parallax image A1' of the compatible image from the parallax image generating unit 53, and the multiplexed image of the parallax images of the auxiliary images from the resolution reducing unit 301. The encoding technique used by the auxiliary encoder 311 may be the AVC technique, the MVC technique, the MPEG2 technique, or the like.

The auxiliary encoder 311 adds the image information from the image information generating unit 55, the compatibility information from the compatibility information generating unit 56, the imaging information from the imaging information generating unit 57, the parallax image information from the parallax image information generating unit 302, and the like, to the encoded images obtained as a result of the encoding. The auxiliary encoder 311 supplies the resultant encoded stream as an auxiliary stream to the multiplexing unit 60.

[Example Structure of the Resolution Reducing Unit]

Figure 29:
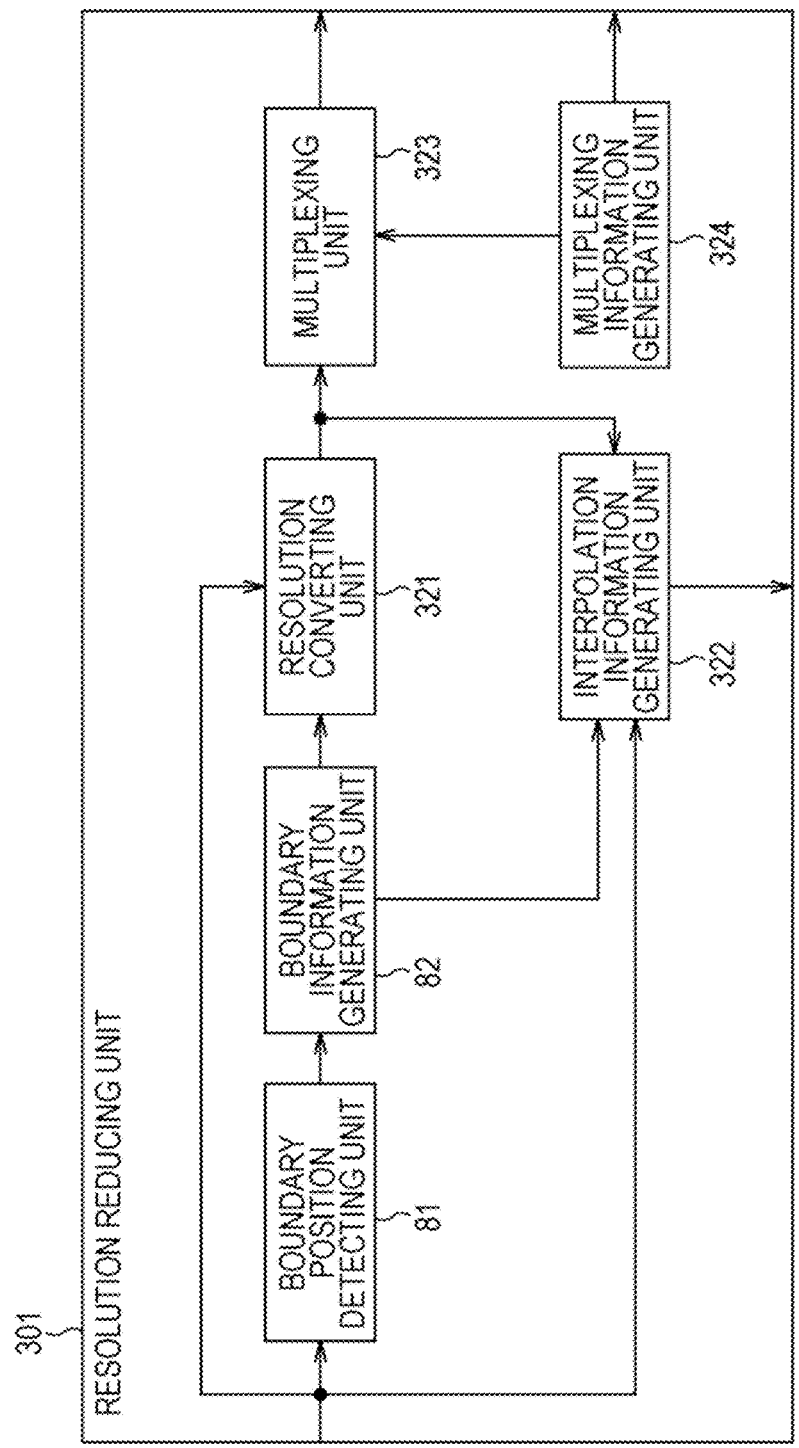
FIG. 29 is a block diagram showing a specific example structure of the resolution reducing unit shown in FIG. 28.

FIG. 29 is a block diagram showing a specific example structure of the resolution reducing unit 301 shown in FIG. 28.

In the structure illustrated in FIG. 29, the same components as those in FIG. 2 are denoted by the same reference numerals as those in FIG. 2. The explanations that have already been made will not be repeated.

The structure of the resolution reducing unit 301 of FIG. 29 differs from the structure shown in FIG. 2, in that the partial resolution converting unit 83 and the partial conversion information generating unit 84 are replaced with a resolution converting unit 321 and an interpolation information generating unit 322, and a multiplexing unit 323 and a multiplexing information generating unit 324 are added.

The resolution converting unit 321 of the resolution reducing unit 301 reduces each of the horizontal resolutions of the parallax images B1' and C1' supplied from the parallax image generating unit 53 shown in FIG. 28, to a resolution calculated by multiplying the horizontal resolution by ½. The resolution converting unit 321 supplies the parallax images B1' and C1' having the resolutions reduced, to the interpolation information generating unit 322 and the multiplexing unit 323.

The interpolation information generating unit 322 functions as a generating unit. Specifically, the interpolation information generating unit 322 generates the interpolation information about the parallax image B1', based on the boundary information generated by the boundary information generating unit 82, the parallax image B1' with the reduced resolution supplied from the resolution converting unit 321, and the parallax image B1' supplied from the parallax image generating unit 53. Likewise, the interpolation information generating unit 322 generates the interpolation information about the parallax image C1', based on the boundary information generated by the boundary information generating unit 82, the parallax image C1' with the reduced resolution supplied from the resolution converting unit 321, and the parallax image C1' supplied from the parallax image generating unit 53. The interpolation information generating unit 322 supplies the generated interpolation information about the parallax image B1' and the parallax image C1' to the parallax image information generating unit 302 shown in FIG. 28.

By a predetermined multiplexing technique supplied from the multiplexing information generating unit 324, the multiplexing unit 323 multiplexes the parallax images B1' and C1' that have the resolutions reduced and are supplied from the resolution converting unit 321, and supplies the resultant multiplexed image to the encoder 303 shown in FIG. 28.

Based on an input or the like from a user, the multiplexing information generating unit 324 determines the multiplexing technique for the multiplexing to be performed by the multiplexing unit 323. The multiplexing information generating unit 324 supplies the determined multiplexing technique to the multiplexing unit 323, and supplies the information indicating the multiplexing technique to the parallax image information generating unit 302.

[Description of an Operation of the Encoding Device]

The encoding operation of the encoding device 300 shown in FIG. 28 is the same as the encoding operation shown in FIGS. 6 and 7, except that the partial resolution reducing operation in step S19 of FIG. 7 is replaced with a resolution reducing operation, and the parallax image information generated in step S20 includes the interpolation information and the information indicating a multiplexing technique. Therefore, only the resolution reducing operation is described below.

Figure 30:
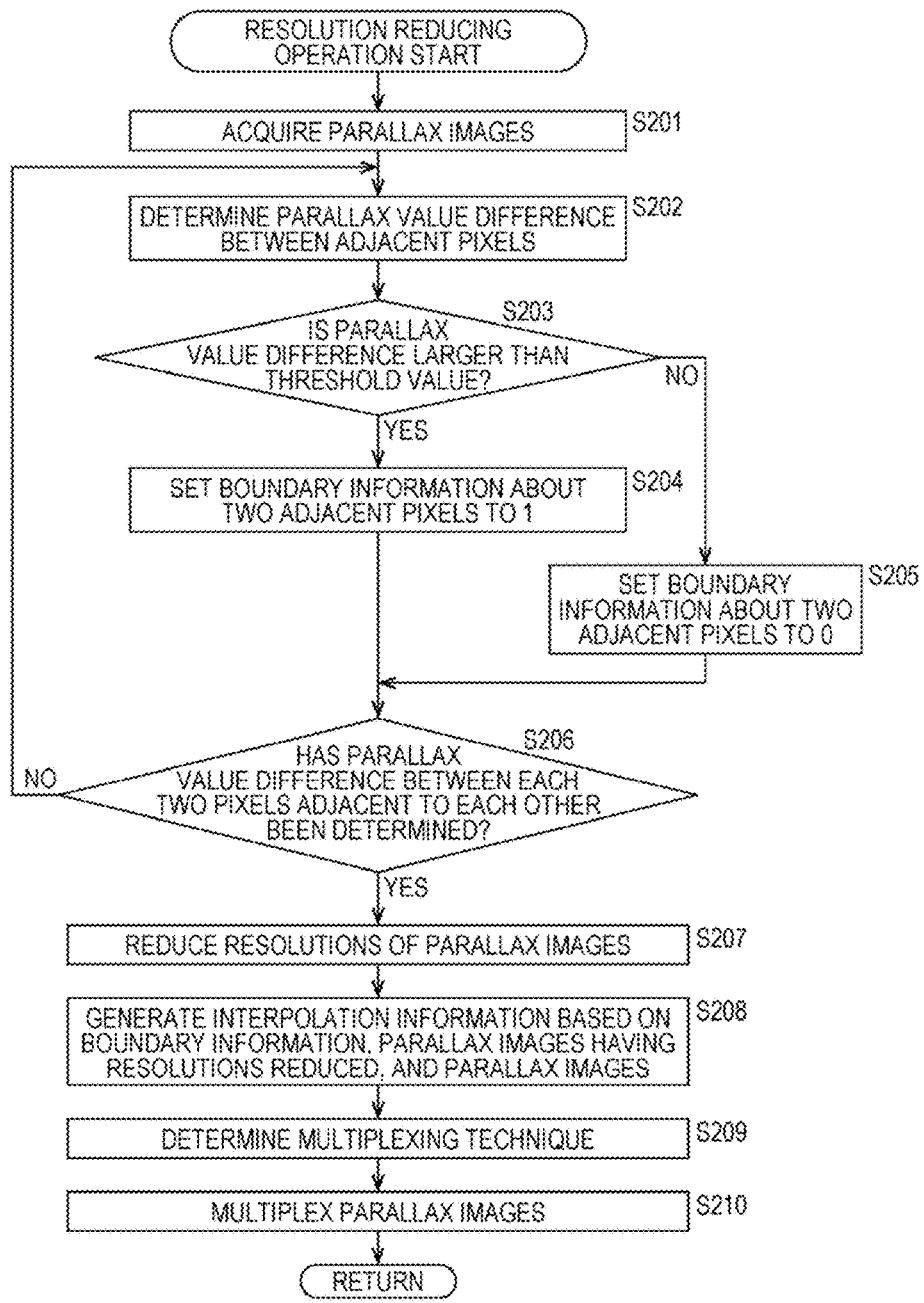
FIG. 30 is a flowchart for explaining a resolution reducing operation of the encoding device shown in FIG. 29.

FIG. 30 is a flowchart for explaining the resolution reducing operation of the encoding device 300 shown in FIG. 28. In FIG. 28, the resolution reducing operation to be performed to generate the boundary information on a pixel basis is described. The procedures of steps S201 through S209 of FIG. 28 are carried out for each parallax image.

In step S201 of FIG. 30, the boundary position detecting unit 81 and the resolution converting unit 321 of the resolution reducing unit 301 (FIG. 29) acquire a parallax image supplied from the parallax image generating unit 53 shown in FIG. 28.

The procedures of steps S202 through S206 are the same as the procedures of steps S42 through S46 of FIG. 8, and therefore, explanation of them is not repeated herein.

In step S207, the resolution converting unit 321 reduces the resolution of the parallax image acquired in step S201, and supplies the parallax image to the interpolation information generating unit 322 and the multiplexing unit 323.

In step S208, the interpolation information generating unit 322 generates the interpolation information, based on the boundary information supplied from the boundary information generating unit 82, the parallax image with the reduced resolution supplied from the resolution converting unit 321, and the parallax image acquired in step S201.

In step S209, the multiplexing information generating unit 324 determines the multiplexing technique for the parallax image B1' and the parallax image C1'. The multiplexing information generating unit 324 supplies the multiplexing technique to the multiplexing unit 323, and supplies the information indicating the multiplexing technique to the parallax image information generating unit 302 shown in FIG. 28.

In step S210, by the multiplexing technique supplied from the multiplexing information generating unit 324, the multiplexing unit 323 multiplexes the parallax images B1' and C1' that have the resolutions reduced and are supplied from the resolution converting unit 321. The multiplexing unit 323 supplies the resultant multiplexed image to the encoder 303 shown in FIG. 28, and the resolution reducing operation then comes to an end.

As described above, the encoding device 300 reduces the resolutions of parallax images of auxiliary images, and transmits the parallax images with the reduced resolutions and the interpolation information. Accordingly, based on the interpolation information, the later described decoding device can obtain parallax images more similar to the parallax images having their resolutions not yet reduced, by increasing the resolutions of the parallax images subjected to the resolution reduction. Based on the boundary information, the decoding device can then perform warping operations on parallax images more similar to the parallax images having their resolutions not yet reduced. As a result, the decoding device can perform more accurate parallax image warping operations.

[Example Structure of the Decoding Device]

Figure 31:
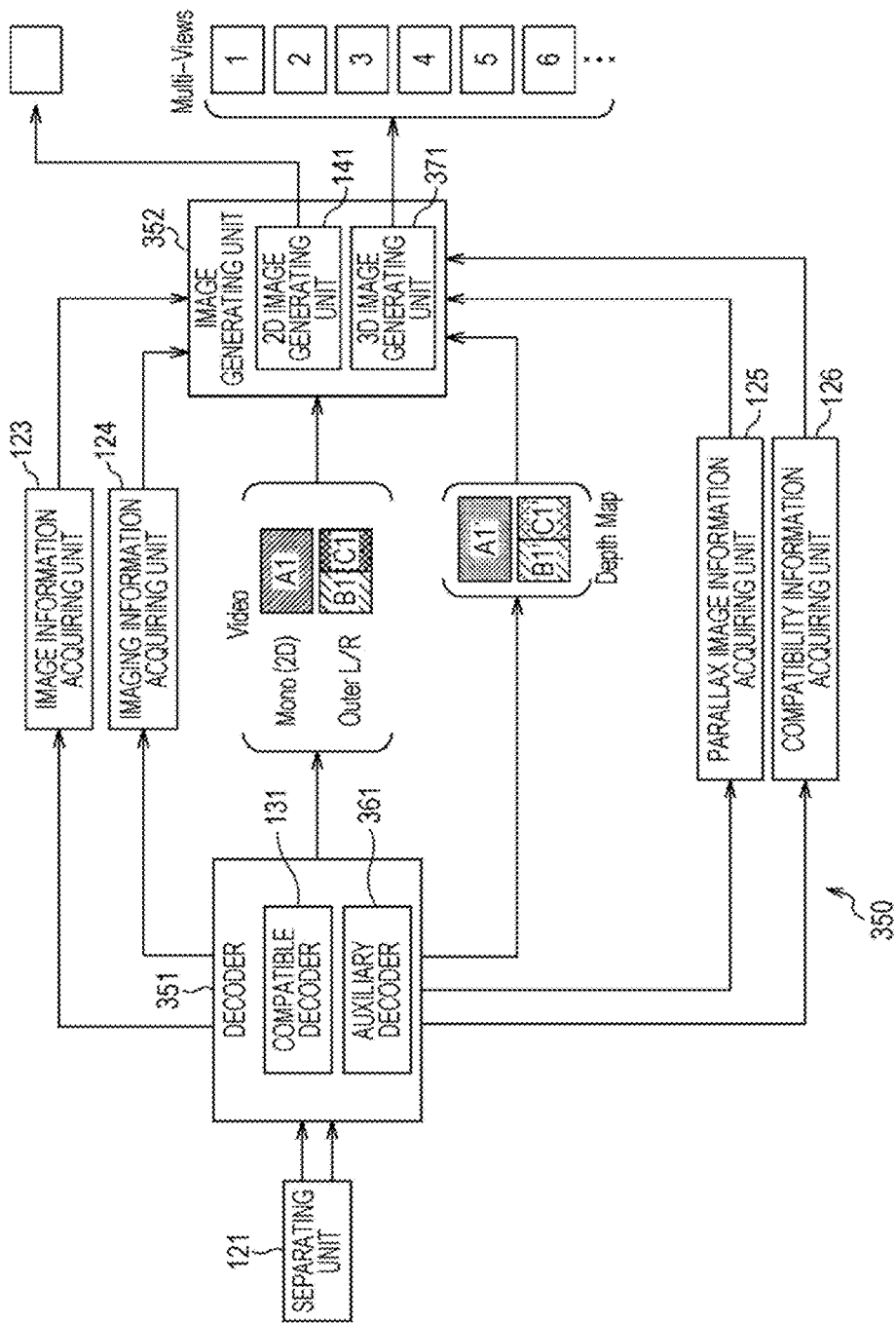
FIG. 31 is a diagram showing an example structure of a decoding device compatible with the encoding device shown in FIG. 28.

FIG. 31 is a diagram showing an example structure of the decoding device that decodes the multiplexed stream transmitted from the encoding device 300 shown in FIG. 28, the decoding device being an image processing device to which the present technique is applied.

In the structure illustrated in FIG. 31, the same components as those in FIG. 9 are denoted by the same reference numerals as those in FIG. 9. The explanations that have already been made will not be repeated.

The structure of the decoding device 350 shown in FIG. 31 differs from the structure shown in FIG. 9, in that the decoder 122 and the image generating unit 127 are replaced with a decoder 351 and an image generating unit 352. The decoding device 350 decodes the multiplexed stream transmitted from the encoding device 300, and increases the resolutions of the parallax images of the auxiliary images, based on the interpolation information. The decoding device 350 then performs warping operations, to generate multi-view images.

Specifically, the decoder 351 of the decoding device 350 is formed with a compatible decoder 131 and an auxiliary decoder 361. Like the auxiliary decoder 132 shown in FIG. 6, the auxiliary decoder 361 supplies the compatibility information contained in the auxiliary stream supplied from a separating unit 121, to the compatible decoder 131. Like the auxiliary decoder 132, the auxiliary decoder 361 identifies the auxiliary stream from the compatible and auxiliary streams supplied from the separating unit 121, based on the compatibility information. The auxiliary decoder 361 decodes, by a technique compatible with the auxiliary encoder 311 shown in FIG. 28, the multiplexed image of the auxiliary images, the parallax image of the compatible image, and the multiplexed image of the parallax images of the auxiliary images, which have been encoded and are contained in the auxiliary stream.

The auxiliary decoder 361 supplies the multiplexed image of the auxiliary images, the parallax image of the compatible image, and the multiplexed image of the parallax images of the auxiliary images, which are obtained as a result of the decoding, to the image generating unit 352. Also, like the auxiliary decoder 132, the auxiliary decoder 361 supplies the image information contained in the auxiliary stream to an image information acquiring unit 123, and supplies the imaging information to an imaging information acquiring unit 124. Further, like the auxiliary decoder 132, the auxiliary decoder 361 supplies the parallax image information contained in the auxiliary stream to the parallax image information acquiring unit 125, and supplies the compatibility information to the compatibility information acquiring unit 126.

The image generating unit 352 is formed with a 2D image generating unit 141 and a 3D image generating unit 371. Using the viewpoint image A1, the multiplexed image of the auxiliary images, the parallax image A1' of the compatible image, and the multiplexed image of the parallax images of the auxiliary images, which are supplied from the decoder 351, the 3D image generating unit 371 generates images that are of three or more viewpoints compatible with a display device (not shown) and have the same resolution as the compatible image, based on the image information, the imaging information, the parallax image information, the compatibility information, and the like. Like the 3D image generating unit 142 shown in FIG. 9, the 3D image generating unit 371 then converts the resolution of the generated multi-value images to the resolution calculated by dividing the resolution of the compatible image and the auxiliary images by the number of viewpoints, and combines the multi-view images. The resultant image is displayed on the display device (not shown).

At this point, the combined multi-view image is displayed, with viewable angle varying at the respective viewpoints. The viewer can view a 3D image without wearing glasses by seeing the images of any two viewpoints with the right and left eyes.

[Specific Example Structure of the 3D Image Generating Unit]

Figure 32:
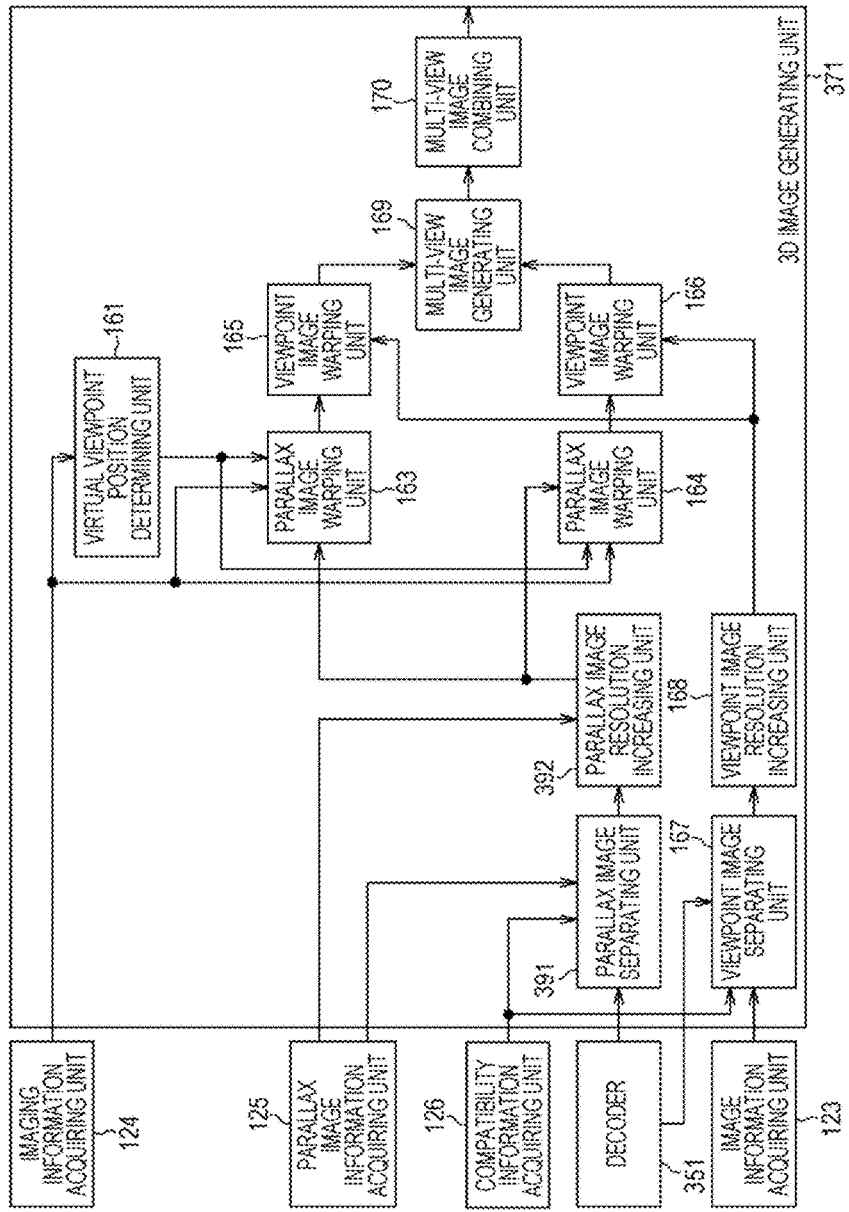
FIG. 32 is a block diagram showing a specific example structure of the 3D image generating unit shown in FIG. 31.

FIG. 32 is a block diagram showing a specific example structure of the 3D image generating unit 371 shown in FIG. 31.

In the structure illustrated in FIG. 32, the same components as those in FIG. 10 are denoted by the same reference numerals as those in FIG. 10. The explanations that have already been made will not be repeated.

The structure of the 3D image generating unit 371 shown in FIG. 32 differs from the structure shown in FIG. 10, in that the parallax image resolution increasing unit 162 is replaced with a parallax image resolution increasing unit 392, and a parallax image separating unit 391 is added.

Based on the compatibility information supplied from the compatibility information acquiring unit 126, the parallax image separating unit 391 of the 3D image generating unit 371 supplies the parallax image A1' of the compatible image supplied from the decoder 351, directly to the parallax image resolution increasing unit 392. The parallax image separating unit 391 also divides the multiplexed image of the parallax images of the auxiliary images supplied from the decoder 351, based on the information indicating a multiplexing technique contained in the parallax image information supplied from the parallax image information acquiring unit 125. The parallax image separating unit 391 then supplies the parallax images of the viewpoint image B1 and the viewpoint image C1 that are obtained as a result and have half the resolution of the compatible image, to the parallax image resolution increasing unit 392.

The parallax image resolution increasing unit 392 supplies the parallax image A1' of the compatible image supplied from the parallax image separating unit 391, directly to the parallax image warping unit 163 and the parallax image warping unit 164.

The parallax image resolution increasing unit 392 also functions as a resolution increasing unit, and, based on the interpolation information contained in the parallax image information supplied from the parallax image information acquiring unit 125, increases the resolutions of the respective parallax images of the viewpoint images B1 and C1 supplied from the parallax image separating unit 391.

Specifically, the parallax image resolution increasing unit 392 increases the horizontal resolution of a parallax image supplied from the parallax image separating unit 391, to a resolution calculated by multiplying the horizontal resolution by ½. Based on the interpolation information, the parallax image resolution increasing unit 392 corrects the parallax value of the regions adjacent to the boundary position in the parallax image subjected to the resolution increase. As a result, the parallax value of the regions adjacent to the boundary position in the corrected parallax image becomes the same as the parallax value observed prior to the resolution reduction.

The parallax image resolution increasing unit 392 then supplies the parallax images of the viewpoint images B1 and C1 subjected to the resolution increase, to the parallax image warping unit 163 and the parallax image warping unit 164.

[Description of an Operation of the Decoding Device]

A decoding operation of the decoding device 350 shown in FIG. 31 is the same as the decoding operation shown in FIG. 18, except for the multi-view image generating operation of step S70 shown in FIG. 18. Therefore, only the multi-view image generating operation is described below.

Figure 33:
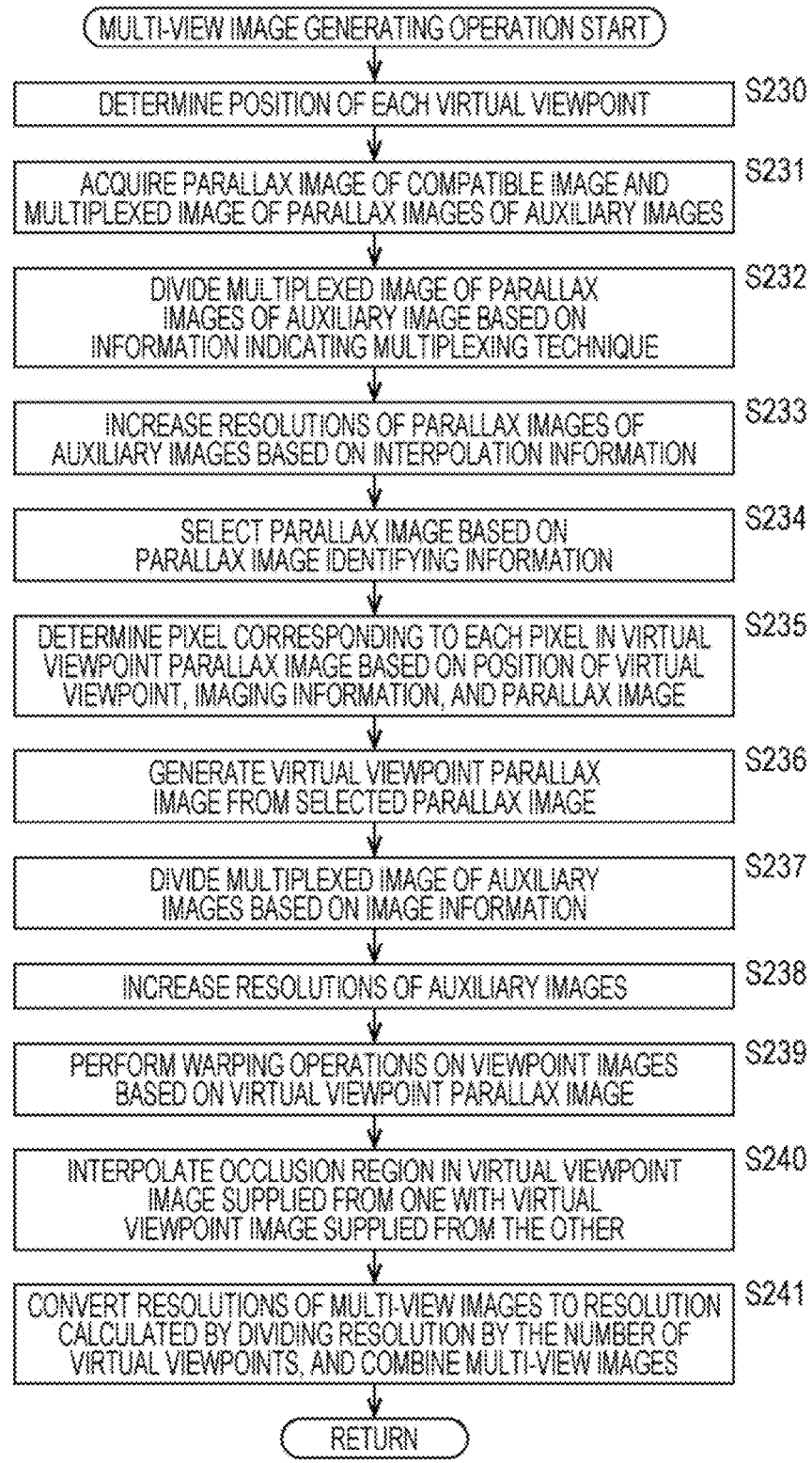
FIG. 33 is a flowchart for explaining in detail the multi-view image generating operation of the encoding device shown in FIG. 28.

FIG. 33 is a flowchart for explaining in detail the multi-view image generating operation of the decoding device 350 shown in FIG. 31.

In step S230 of FIG. 33, based on the inter-viewpoint distances and the number of viewpoints compatible with the display device (not shown), the virtual viewpoint position determining unit 161 (FIG. 32) of the 3D image generating unit 371 determines the positions of respective virtual viewpoints, as in step S90 of FIG. 19. Based on the positions of the respective virtual viewpoints, the virtual viewpoint position determining unit 161 generates parallax image identifying information for each of the parallax image warping unit 163 and the parallax image warping unit 164. The virtual viewpoint position determining unit 161 also supplies the positions of the respective virtual viewpoints and the corresponding parallax image identifying information to the parallax image warping unit 163 and the parallax image warping unit 164.

In step S231, the parallax image separating unit 391 acquires the parallax image A1' of the compatible image and the multiplexed image of the parallax images of the auxiliary images supplied from the auxiliary decoder 361. Based on the compatibility information supplied from the compatibility information acquiring unit 126, the parallax image separating unit 391 supplies the parallax image A1' of the compatible image directly to the parallax image resolution increasing unit 392.

In step S232, the parallax image separating unit 391 divides the multiplexed image of the parallax images of the auxiliary images acquired in step S231, based on the information indicating a multiplexing technique contained in the parallax image information supplied from the parallax image information acquiring unit 125. The parallax image separating unit 391 then supplies the resultant parallax images of the viewpoint image B1 and the viewpoint image C1, which as the auxiliary images, to the parallax image resolution increasing unit 392, the parallax images having half the resolution of the compatible image.

In step S233, the parallax image resolution increasing unit 392 increases the resolutions of the respective parallax images of the auxiliary images supplied from the parallax image separating unit 391, based on the interpolation information contained in the parallax image information supplied from the parallax image information acquiring unit 125. The parallax image resolution increasing unit 392 also supplies the parallax image A1' of the compatible image supplied from the parallax image separating unit 391, directly to the parallax image warping unit 163 and the parallax image warping unit 164.

The procedures of steps S234 through S241 of FIG. 33 are the same as the procedures of steps S93 through S100 of FIG. 19, and therefore, explanation of them is not repeated herein.

As described above, based on the interpolation information, the decoding device 350 increases the resolutions of the parallax images that have been subjected to the resolution reduction and are transmitted from the encoding device 300, and then subjects those parallax images to warping operations. Accordingly, by the decoding device 350, the parallax images subjected to the warping operations can be made similar to the parallax images not yet subjected to the resolution reduction. As a result, more accurate warping operations can be performed on parallax images.

The interpolation information may be information for recovering the parallax value of the regions adjacent to the boundary position in parallax images not yet subjected to the resolution reduction, from the parallax value in parallax images subjected to the resolution reduction. In this case, the parallax image resolution increasing unit 392 increases resolutions only in the regions on the extra-boundary region, and generates parallax values after the resolution increase in the regions adjacent to the boundary position, based on the parallax values obtained after the resolution reduction and the interpolation information.

Also, in the first through third embodiments, the number of viewpoints of viewpoint images to be captured is three, but the number of viewpoints is not limited to that. Although inter-viewpoint distances are detected by the imaging information generating unit 57, inter-viewpoint distances may be acquired from the imaging units 51A through 51C.

Further, an image processing device of the present technique can be applied to a display device or a reproducing device such as a television receiver. In the present technique, the number of pixels adjacent to the boundary position is not limited to two, and the pixels adjacent to the boundary position may include pixels that are adjacent to and are located on the left side of the boundary position, and pixels that are adjacent to and are located on the right side of the boundary position.

The image information, the imaging information, the parallax image information, and the compatibility information may not be encoded, and may be transmitted through a different route from encoded streams. The image information, the imaging information, the parallax image information, and the compatibility information may be encoded, and then be transmitted through a different route from encoded streams.

Also, the image information, the imaging information, the parallax image information, and the compatibility information may not be encoded, and may be written in a predetermined area in an encoded stream, or may be encoded and be written in a predetermined area in an encoded stream.

Fourth Embodiment

[Description of a Computer to which the Present Technique is Applied]

The above described series of operations can be performed with hardware, and can also be performed with software. Where the series of operations are performed with software, the program that forms the software is installed into a general-purpose computer or the like.

Figure 35:
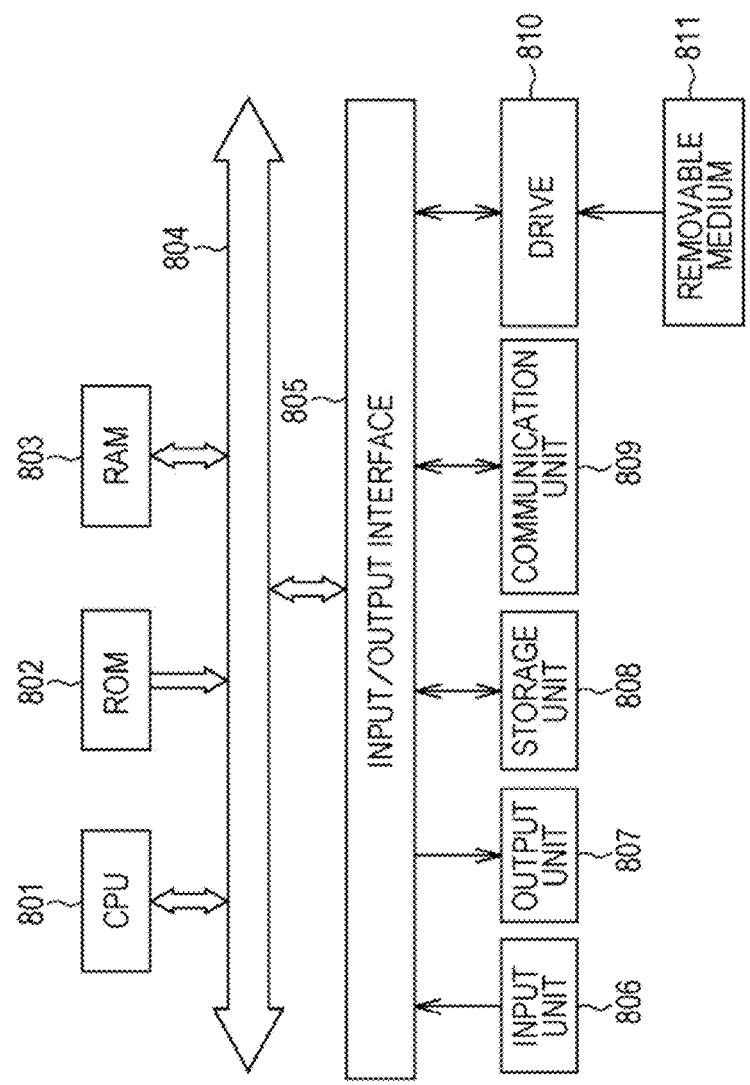
FIG. 35 is a diagram showing an example structure of an embodiment of a computer.

In view of this, FIG. 35 shows an example structure of an embodiment of a computer into which the program for performing the above described series of operations is installed.

The program can be recorded beforehand in a storage unit 808 or a ROM (Read Only Memory) 802 provided as a recording medium in the computer.

Alternatively, the program can be stored (recorded) in a removable medium 811. Such a removable medium 811 can be provided as so-called packaged software. Here, the removable medium 811 may be a flexible disk, a CD-ROM (Compact Disc Read Only Memory), an MO (Magneto Optical) disk, a DVD (Digital Versatile Disc), a magnetic disk, or a semiconductor memory, for example.

The program can be installed into the computer from the above described removable medium 811 via a drive 810, but can also be downloaded into the computer via a communication network or a broadcasting network and be installed into the internal storage unit 808. That is, the program can be wirelessly transferred from a download site, for example, to the computer via an artificial satellite for digital satellite broadcasting, or can be transferred by cable to the computer via a network such as a LAN (Local Area Network) or the Internet.

The computer includes a CPU (Central Processing Unit) 801, and an input/output interface 805 is connected to the CPU 801 via a bus 804.

When an instruction is input by a user operating an input unit 806 or the like via the input/output interface 805, the CPU 801 executes the program stored in the ROM 802 accordingly. Alternatively, the CPU 801 loads the program stored in the storage unit 808 into a RAM (Random Access Memory) 803, and executes the program.

By doing so, the CPU 801 performs the operations according to the above described flowcharts, or performs the operations with the structures illustrated in the above described block diagrams. Where necessary, the CPU 801 outputs the operation results from an output unit 807 or transmit the operation results from a communication unit 809, via the input/output interface 805, for example, and further stores the operation results into the storage unit 808.

The input unit 806 is formed with a keyboard, a mouse, a microphone, and the like. The output unit 807 is formed with a LCD (Liquid Crystal Display), a speaker, and the like.

In this specification, the operations performed by the computer in accordance with the program are not necessarily performed in chronological order compliant with the sequences shown in the flowcharts. That is, the operations to be performed by the computer in accordance with the program include operations to be performed in parallel or independently of one another (such as parallel operations or object-based operations).

The program may be executed by one computer (processor), or may be executed in a distributive manner by more than one computer. Further, the program may be transferred to a remote computer, and be executed therein.

The present technique can be applied to an encoding device and a decoding device that are used for reception via a network medium such as satellite broadcasting, cable TV (television), the Internet, or a portable telephone device, or for processing in a storage medium such as an optical or magnetic disk or a flash memory.

The above described encoding device and decoding device can also be applied to any electronic apparatuses. The following is a description of such examples.

Fifth Embodiment

[Example Structure of a Television Apparatus]

Figure 36:
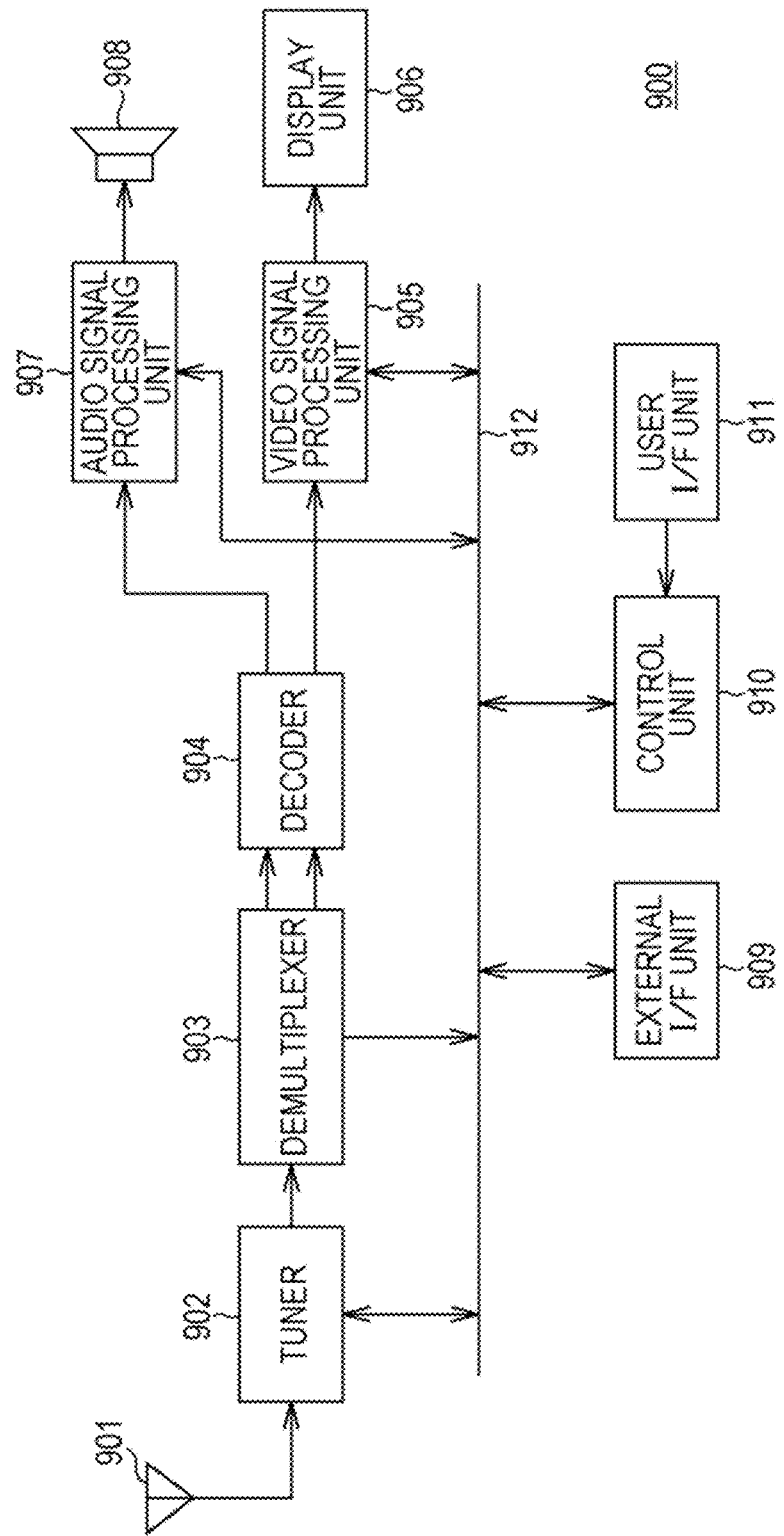
FIG. 36 is a diagram schematically showing the structure of a television apparatus to which the present technique is applied.

FIG. 36 schematically shows an example structure of a television apparatus to which the present technique is applied. The television apparatus 900 includes an antenna 901, a tuner 902, a demultiplexer 903, a decoder 904, a video signal processing unit 905, a display unit 906, an audio signal processing unit 907, a speaker 908, and an external interface unit 909. The television apparatus 900 further includes a control unit 910, a user interface unit 911, and the like.

The tuner 902 selects a desired channel from broadcast wave signals received at the antenna 901, and performs demodulation. The resultant encoded bit stream is output to the demultiplexer 903.

The demultiplexer 903 extracts the video and audio packets of the show to be viewed from the encoded bit stream, and outputs the data of the extracted packets to the decoder 904. The demultiplexer 903 also supplies a packet of data such as EPG (Electronic Program Guide) to the control unit 910. Where scrambling is performed, the demultiplexer or the like cancels the scrambling.

The decoder 904 performs a packet decoding operation, and outputs the video data generated through the decoding operation to the video signal processing unit 905, and the audio data to the audio signal processing unit 907.

The video signal processing unit 905 subjects the video data to a noise removal and video processing or the like in accordance with user settings. The video signal processing unit 905 generates video data of the show to be displayed on the display unit 906, or generates image data or the like through an operation based on an application supplied via a network. The video signal processing unit 905 also generates video data for displaying a menu screen or the like for item selection, and superimposes the video data on the video data of the show. Based on the video data generated in this manner, the video signal processing unit 905 generates a drive signal to drive the display unit 906.

Based on the drive signal from the video signal processing unit 905, the display unit 906 drives a display device (a liquid crystal display element, for example) to display the video of the show.

The audio signal processing unit 907 subjects the audio data to predetermined processing such as a noise removal, and performs a D/A conversion operation and an amplification operation on the processed audio data. The resultant audio data is supplied as an audio output to the speaker 908.

The external interface unit 909 is an interface for a connection with an external device or a network, and transmits and receives data such as video data and audio data.

The user interface unit 911 is connected to the control unit 910. The user interface unit 911 is formed with operation switches, a remote control signal reception unit, and the like, and supplies an operating signal according to a user operation to the control unit 910.

The control unit 910 is formed with a CPU (Central Processing Unit), a memory, and the like. The memory stores the program to be executed by the CPU, various kinds of data necessary for the CPU to perform operations, the EPG data, data obtained via a network, and the like. The program stored in the memory is read and executed by the CPU at a predetermined time such as the time of activation of the television apparatus 900. The CPU executes the program to control the respective components so that the television apparatus 900 operates in accordance with a user operation.

In the television apparatus 900, a bus 912 is provided for connecting the tuner 902, the demultiplexer 903, the video signal processing unit 905, the audio signal processing unit 907, the external interface unit 909, and the like, to the control unit 910.

In the television apparatus having such a structure, the function of an image processing device (an image processing method) of the present invention is provided in the decoder 904. Accordingly, when multi-view images are generated by decoding an encoded bit stream containing a parallax image having its resolution reduced, accurate parallax image warping operations can be performed.

Sixth Embodiment

[Example Structure of a Portable Telephone Device]

Figure 37:
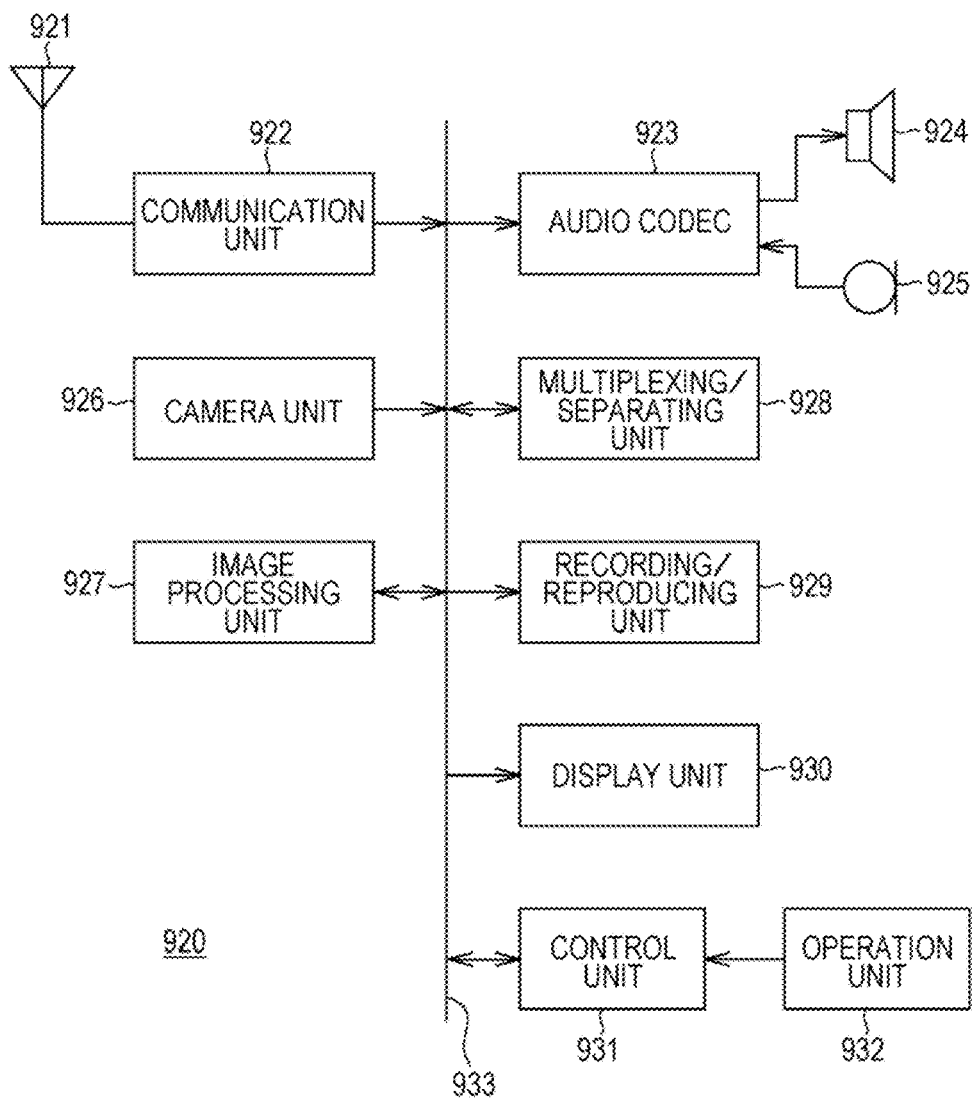
FIG. 37 is a diagram schematically showing the structure of a portable telephone device to which the present technique is applied.

FIG. 37 schematically shows an example structure of a portable telephone device to which the present technique is applied. The portable telephone device 920 includes a communication unit 922, an audio codec 923, a camera unit 926, an image processing unit 927, a multiplexing/separating unit 928, a recording/reproducing unit 929, a display unit 930, and a control unit 931. Those components are connected to one another via a bus 933.

Also, an antenna 921 is connected to the communication unit 922, and a speaker 924 and a microphone 925 are connected to the audio codec 923. Further, an operation unit 932 is connected to the control unit 931.

The portable telephone device 920 performs various kinds of operations such as transmission and reception of audio signals, transmission and reception of electronic mail and image data, image capturing, and data recording, in various kinds of modes such as an audio communication mode and a data communication mode.

In the audio communication mode, an audio signal generated at the microphone 925 is converted into audio data, and the data is compressed at the audio codec 923. The compressed data is supplied to the communication unit 922. The communication unit 922 performs a modulation operation, a frequency conversion operation, and the like on the audio data, to generate a transmission signal. The communication unit 922 also supplies the transmission signal to the antenna 921, and the transmission signal is transmitted to a base station (not shown). The communication unit 922 also amplifies a signal received at the antenna 921, and performs a frequency conversion operation, a demodulation operation, and the like. The resultant audio data is supplied to the audio codec 923. The audio codec 923 decompresses audio data, and converts the audio data into an analog audio signal to be output to the speaker 924.

When mail transmission is performed in the data communication mode, the control unit 931 receives text data that is input by operating the operation unit 932, and the input text is displayed on the display unit 930. In accordance with a user instruction or the like through the operation unit 932, the control unit 931 generates and supplies mail data to the communication unit 922. The communication unit 922 performs a modulation operation, a frequency conversion operation, and the like on the mail data, and transmits the resultant transmission signal from the antenna 921. The communication unit 922 also amplifies a signal received at the antenna 921, and performs a frequency conversion operation, a demodulation operation, and the like, to restore the mail data. This mail data is supplied to the display unit 930, and the content of the mail is displayed.

The portable telephone device 920 can cause the recording/reproducing unit 929 to store received mail data into a storage medium. The storage medium is a rewritable storage medium. For example, the storage medium may be a semiconductor memory such as a RAM or an internal flash memory, a hard disk, or a removable medium such as a magnetic disk, a magnetooptical disk, an optical disk, a USB memory, or a memory card.

When image data is transmitted in the data communication mode, image data generated at the camera unit 926 is supplied to the image processing unit 927. The image processing unit 927 performs an encoding operation on the image data, to generate encoded data.

The multiplexing/separating unit 928 multiplexes the encoded data generated at the image processing unit 927 and the audio data supplied from the audio codec 923 by a predetermined technique, and supplies the multiplexed data to the communication unit 922. The communication unit 922 performs a modulation operation, a frequency conversion operation, and the like on the multiplexed data, and transmits the resultant transmission signal from the antenna 921. The communication unit 922 also amplifies a signal received at the antenna 921, and performs a frequency conversion operation, a demodulation operation, and the like, to restore the multiplexed data. This multiplexed data is supplied to the multiplexing/separating unit 928. The multiplexing/separating unit 928 divides the multiplexed data, and supplies the encoded data to the image processing unit 927, and the audio data to the audio codec 923. The image processing unit 927 performs a decoding operation on the encoded data, to generate image data. This image data is supplied to the display unit 930, to display the received images. The audio codec 923 converts the audio data into an analog audio signal, and supplies the analog audio signal to the speaker 924, so that the received sound is output.

In the portable telephone device having such a structure, the function of an image processing device (an image processing method) of the present invention is provided in the image processing unit 927. Accordingly, when multiview images are generated by decoding encoded data containing a parallax image having its resolution reduced in image data communication, accurate parallax image warping operations can be performed.

Seventh Embodiment

[Example Structure of a Recording/Reproducing Device]

Figure 38:
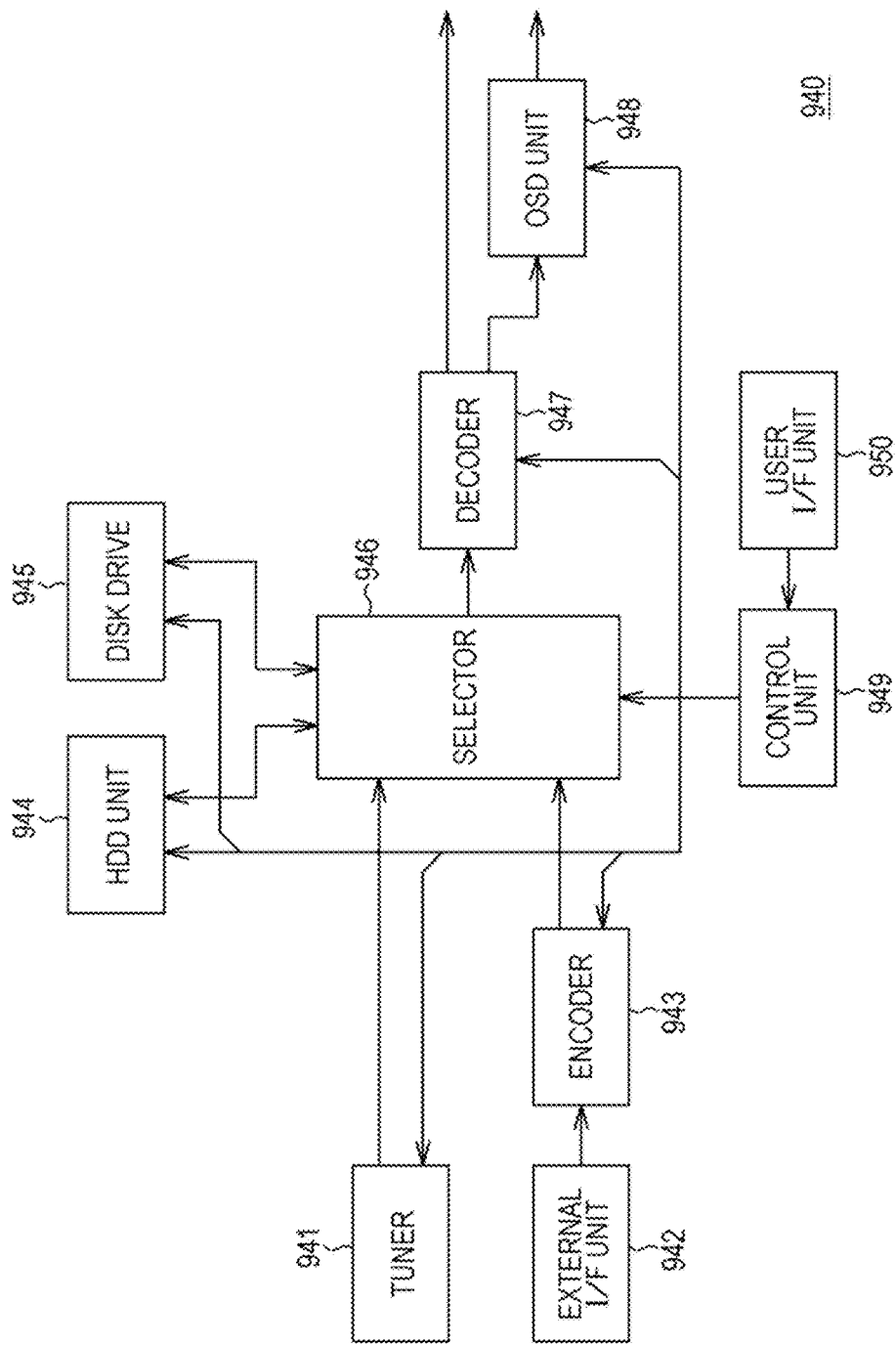
FIG. 38 is a diagram schematically showing the structure of a recording/reproducing device to which the present technique is applied.

FIG. 38 schematically shows an example structure of a recording/reproducing device to which the present technique is applied. The recording/reproducing device 940 records the audio data and video data of a received broadcast show on a recording medium, for example, and provides the recorded data to a user at the time according to an instruction from the user. The recording/reproducing device 940 can also obtain audio data and video data from another device, for example, and record the data on a recording medium. Further, the recording/reproducing device 940 decodes and outputs audio data and video data recorded on a recording medium, so that a monitor device or the like can display images and outputs sound.

The recording/reproducing device 940 includes a tuner 941, an external interface unit 942, an encoder 943, a HDD (Hard Disk Drive) unit 944, a disk drive 945, a selector 946, a decoder 947, an OSD (On-Screen Display) unit 948, a control unit 949, and a user interface unit 950.

The tuner 941 selects a desired channel from broadcast signals received at an antenna (not shown). The tuner 941 demodulates the received signal of the desired channel, and outputs the resultant encoded bit stream to the selector 946.

The external interface unit 942 is formed with at least one of an IEEE1394 interface, a network interface unit, a USB interface, a flash memory interface, and the like. The external interface unit 942 is an interface for a connection with an external device, a network, a memory card, or the like, and receives data such as video data and audio data to be recorded and the like.

The encoder 943 performs predetermined encoding on video data and audio data that are supplied from the external interface unit 942 and are not encoded, and outputs an encoded bit stream to the selector 946.

The HDD unit 944 records content data such as videos and sound, various kinds of programs, other data, and the like on an internal hard disk, and reads the data from the hard disk at the time of reproduction or the like.

The disk drive 945 performs signal recording and reproduction on a mounted optical disk. The optical disk may be a DVD disk (such as a DVD-Video, a DVD-RAM, a DVD-R, a DVD-RW, a DVD+R, or a DVD+RW) or a Blu-ray disc, for example.

The selector 946 selects an encoded bit stream from the tuner 941 or the encoder 943 at the time of video and audio recording, and supplies the encoded bit stream to either the HDD unit 944 or the disk drive 945. The selector 946 also supplies an encoded bit stream output from the HDD unit 944 or the disk drive 945 to the decoder 947 at the time of video and audio reproduction.

The decoder 947 performs a decoding operation on an encoded bit stream. The decoder 947 supplies the video data generated by performing the decoding to the OSD unit 948. The decoder 947 also outputs the audio data generated by performing the decoding.

The OSD unit 948 generates video data for displaying a menu screen or the like for item selection, and superimposes the video data on video data output from the decoder 947.

The user interface unit 950 is connected to the control unit 949. The user interface unit 950 is formed with operation switches, a remote control signal reception unit, and the like, and supplies an operating signal according to a user operation to the control unit 949.

The control unit 949 is formed with a CPU, a memory, and the like. The memory stores the program to be executed by the CPU, and various kinds of data necessary for the CPU to perform operations. The program stored in the memory is read and executed by the CPU at a predetermined time such as the time of activation of the recording/reproducing device 940. The CPU executes the program to control the respective components so that the recording/reproducing device 940 operates in accordance with a user operation.

In the recording/reproducing device having the above structure, the encoder 943 has the functions of an image processing device (an image processing method) of the present invention. Accordingly, an encoded bit stream containing parallax images with reduced resolutions can be output so that accurate parallax image warping operations can be performed on the decoding side.

Eighth Embodiment

[Example Structure of an Imaging Device]

FIG. 39 schematically shows an example structure of an imaging device to which the present technique is applied. An imaging device 960 captures an image of an object, and causes a display unit to display the image of the object or records the image as image data on a recording medium.

The imaging device 960 includes an optical block 961, an imaging unit 962, a camera signal processing unit 963, an image data processing unit 964, a display unit 965, an external interface unit 966, a memory unit 967, a media drive 968, an OSD unit 969, and a control unit 970. A user interface unit 971 is connected to the control unit 970. Further, the image data processing unit 964, the external interface unit 966, the memory unit 967, the media drive 968, the OSD unit 969, the control unit 970, and the like are connected via a bus 972.

The optical block 961 is formed with a focus lens, a diaphragm, and the like. The optical block 961 forms an optical image of an object on the imaging surface of the imaging unit 962. Formed with a CCD or a CMOS image sensor, the imaging unit 962 generates an electrical signal in accordance with the optical image through a photoelectric conversion, and supplies the electrical signal to the camera signal processing unit 963.

The camera signal processing unit 963 performs various kinds of camera signal processing such as a knee correction, a gamma correction, and a color correction on the electrical signal supplied from the imaging unit 962. The camera signal processing unit 963 supplies the image data subjected to the camera signal processing to the image data processing unit 964.

The image data processing unit 964 performs an encoding operation on the image data supplied from the camera signal processing unit 963. The image data processing unit 964 supplies the encoded data generated by performing the encoding operation, to the external interface unit 966 and the media drive 968. The image data processing unit 964 also performs a decoding operation on the encoded data supplied from the external interface unit 966 and the media drive 968. The image data processing unit 964 supplies the image data generated by performing the decoding operation to the display unit 965. The image data processing unit 964 also performs an operation to supply the image data supplied from the camera signal processing unit 963 to the display unit 965, or superimposes display data obtained from the OSD unit 969 on the image data and supplies the image data to the display unit 965.

The OSD unit 969 generates display data of a menu screen and icons formed with symbols, characters, or figures, and outputs the data to the image data processing unit 964.

The external interface unit 966 is formed with a USB input/output terminal and the like, for example, and is connected to a printer when image printing is performed. A drive is also connected to the external interface unit 966 where necessary, and a removable medium such as a magnetic disk or an optical disk is mounted on the drive as appropriate. A computer program read from such a removable disk is installed where necessary. Further, the external interface unit 966 includes a network interface connected to a predetermined network such as a LAN or the Internet. The control unit 970 reads encoded data from the memory unit 967 in accordance with an instruction from the user interface unit 971, for example, and can supply the encoded data from the external interface unit 966 to another device connected thereto via a network. The control unit 970 can also obtain, via the external interface unit 966, encoded data or image data supplied from another device via a network, and supply the encoded data or image data to the image data processing unit 964.

A recording medium to be driven by the media drive 968 may be a readable/rewritable removable medium such as a magnetic disk, a magnetooptical disk, an optical disk, or a semiconductor memory. The recording medium may be any type of removable medium, and may be a tape device, a disk, or a memory card. The recording medium may of course be a non-contact IC card or the like.

Alternatively, the media drive 968 and a recording medium may be integrated, and may be formed with an immobile storage medium such as an internal hard disk drive or a SSD (Solid State Drive).

The control unit 970 is formed with a CPU, a memory, and the like. The memory stores the program to be executed by the CPU, various kinds of data necessary for the CPU to perform operations, and the like. The program stored in the memory is read and executed by the CPU at a predetermined time such as the time of activation of the imaging device 960. The CPU executes the program to control the respective components so that the imaging device 960 operates in accordance with a user operation.

In the imaging apparatus having the above structure, the image data processing unit 964 has the functions of an image processing device (an image processing method) of the present invention. Accordingly, when multi-view images are generated by decoding encoded data that is recorded in the memory unit 967, a recording medium, or the like and contain parallax images with reduced resolutions in image data communication, accurate parallax image warping operations can be performed.

It should be noted that embodiments of the present technique are not limited to the above described embodiments, and various modifications may be made to them without departing from the scope of the present technique.

REFERENCE SIGNS LIST

50 Encoding device, 60 Multiplexing unit, 62 Auxiliary encoder, 83 Partial resolution converting unit, 84 Partial conversion information generating unit, 120 Decoding device, 121 Separating unit, 122 Decoder, 162 Parallax image resolution increasing unit, 163, 164 Parallax image warping units, 165, 166 Viewpoint image warping units, 200 Encoding device, 210 Auxiliary encoder, 214 Partial resolution converting unit, 215 Resolution information generating unit, 220 Decoding device, 251 Parallax image resolution increasing unit, 300 Encoding device, 311 Auxiliary encoder, 321 Resolution converting unit, 322 Interpolation information generating unit, 350 Decoding device, 351 Decoder, 392 Parallax image resolution increasing unit

The invention claimed is:

1. An image processing device, comprising:
a central processing unit (CPU) configured to:
receive a low-resolution depth image and restoration information, wherein the restoration information is resolution information indicating a resolution of the low-resolution depth image,
wherein the resolution information includes at least one of base resolution information indicating a base resolution, ratio information indicating a ratio of the resolution of the low-resolution depth image to the base resolution, or resolution identification information indicating whether the resolution of the low-resolution depth image is the base resolution, and
wherein the low-resolution depth image is a depth image having the resolution reduced, and the restoration information is used to restore the depth image from the low-resolution depth image;
increase the resolution of the low-resolution depth image based on the restoration information,
wherein based on the resolution identification information which indicates that the resolution of the low-resolution depth image is the base resolution, the resolution of the low-resolution depth image is increased based on the base resolution information, and
based on the resolution identification information which indicates that the resolution of the low-resolution depth image is different from the base resolution, the resolution of the low-resolution depth image is increased based on the base resolution information and the ratio information; and
restore the depth image based on the increased resolution.

2. The image processing device according to claim 1, wherein
the low-resolution depth image is an image including an extra-boundary region that has a resolution reduced,
the extra-boundary region is a first region other than a second region adjacent to a boundary position where pixel values of the depth image vary,
the restoration information is information indicating pixels with the resolution not reduced in the low-resolution depth image, and
the CPU is further configured to increase the resolution of the extra-boundary region in the low-resolution depth image based on the restoration information.

3. The image processing device according to claim 1, wherein
the low-resolution depth image is an image including an extra-boundary region that has a resolution reduced to variable resolution, and
the extra-boundary region is a first region other than a second region adjacent to a boundary position where pixel values of the depth image vary.

4. The image processing device according to claim 3, wherein
the extra-boundary region that has the resolution reduced, based on the reduced resolution, the resolution of the extra-boundary region vary, and
the resolution of the extra-boundary region is associated with a number of continuous identical pixel values in the extra-boundary region.

5. The image processing device according to claim 1,
wherein the CPU is further configured to decode the low-resolution depth image on a block basis, and
wherein each of the low-resolution depth image, the base resolution information, the ratio information, and the resolution identification information are encoded on a block basis.

6. The image processing device according to claim 5, wherein the CPU is further configured to receive the resolution identification information on a block basis.

7. The image processing device according to claim 1, wherein the low-resolution depth image is an image obtained by reduction of a resolution of an entire region or part of the depth image.

8. The image processing device according to claim 1, wherein the CPU is further configured to:
generate the depth image of a virtual viewpoint based on a first warping operation on the low-resolution depth image,
wherein the low-resolution depth image has the resolution increased based on a location of the virtual viewpoint; and
generate a viewpoint image of the virtual viewpoint based on a second warping operation, wherein the second warping operation is based on the depth image of the virtual viewpoint.

9. The image processing device according to claim 1, wherein the resolution of the depth image is reduced based on the resolution information.

10. An image processing method, comprising:
receiving a low-resolution depth image and restoration information, wherein the restoration information is resolution information indicating a resolution of the low-resolution depth image,
wherein the resolution information includes at least one of base resolution information indicating base resolution, ratio information indicating a ratio of the resolution of the low-resolution depth image to the base resolution, or resolution identification information indicating whether the resolution of the low-resolution depth image is the base resolution, and
wherein the low-resolution depth image is a depth image having the resolution reduced, and the restoration information is used to restore the depth image from the low-resolution depth image; and
increasing the resolution of the low-resolution depth image based on the restoration information,
based on the resolution identification information which indicates that the resolution of the low-resolution depth image is the base resolution, the resolution of the low-resolution depth image is increased based on the base resolution information, and
based on the resolution identification information which indicates that the resolution of the low-resolution depth image is different from the base resolution, the resolution of the low-resolution depth image is increased based on the base resolution information and the ratio information; and
restoring the depth image based on the increased resolution.

* * * * *